(12) United States Patent
Park et al.

(10) Patent No.: US 12,009,713 B2
(45) Date of Patent: Jun. 11, 2024

(54) STATOR FOR ELECTRIC MOTOR

(71) Applicant: LG Magna e-Powertrain Co., Ltd., Incheon (KR)

(72) Inventors: Gyeongjae Park, Seoul (KR); Hojun Shin, Seoul (KR); Wonjung Sung, Seoul (KR); Hyunsoo Seol, Seoul (KR); Jeongmin Lee, Seoul (KR); Kyeonghwan Kim, Seoul (KR); Jaemin Kim, Seoul (KR)

(73) Assignee: LG Magna e-Powertrain Co., Ltd., Incheon (KR)

( * ) Notice: Subject to any disclaimer, the term of this patent is extended or adjusted under 35 U.S.C. 154(b) by 508 days.

(21) Appl. No.: 17/423,347

(22) PCT Filed: Jun. 3, 2020

(86) PCT No.: PCT/KR2020/007182
§ 371 (c)(1),
(2) Date: Jul. 15, 2021

(87) PCT Pub. No.: WO2021/215577
PCT Pub. Date: Oct. 28, 2021

(65) Prior Publication Data
US 2022/0344993 A1  Oct. 27, 2022

(30) Foreign Application Priority Data

Apr. 20, 2020  (KR) ........................ 10-2020-0047462

(51) Int. Cl.
*H02K 3/12* (2006.01)
*H02K 1/16* (2006.01)
*H02K 3/28* (2006.01)

(52) U.S. Cl.
CPC ................. *H02K 3/12* (2013.01); *H02K 1/16* (2013.01); *H02K 3/28* (2013.01)

(58) Field of Classification Search
CPC ............... H02K 1/16; H02K 3/12; H02K 3/28
See application file for complete search history.

(56) References Cited

U.S. PATENT DOCUMENTS 8,749,107 B2     6/2014   Trammell et al.
9,847,683 B2 *  12/2017   Jung .................. H02K 11/0094
(Continued)

FOREIGN PATENT DOCUMENTS

JP      2012095488       5/2012
KR    1020160028548      3/2016
(Continued)

*Primary Examiner* — Gary A Nash
(74) *Attorney, Agent, or Firm* — Fish & Richardson P.C.

(57) ABSTRACT

A stator for an electric motor according to the present disclosure includes a stator core having a plurality of slots and teeth, and a stator coil wound via the plurality of slots, wherein the stator coil includes a plurality of hairpins inserted into the plurality of slots and connected in series with one another, wherein the plurality of hairpins is spaced apart from one another by a partial discharge suppression distance to suppress partial discharge between adjacent hairpins, wherein a partial discharge suppression distance between hairpins with a high voltage distribution ratio is farther than a partial discharge suppression distance between hairpins with a low voltage distribution ratio when power is applied to the stator coil. This may result in suppressing reduction of lifespan of the stator coil due to the partial discharge of the hairpins.

22 Claims, 33 Drawing Sheets

(56) References Cited

U.S. PATENT DOCUMENTS

| | | |
|---|---|---|
| 2011/0109188 A1 | 5/2011 | Shaver et al. |
| 2015/0214820 A1* | 7/2015 | Geoffrion ............ B23K 11/002 |
| | | 219/78.16 |
| 2017/0317565 A1* | 11/2017 | Hatch .................. H02K 15/066 |
| 2018/0006516 A1 | 1/2018 | Tachikawa et al. |
| 2020/0076261 A1 | 3/2020 | Fritsch et al. |

FOREIGN PATENT DOCUMENTS

| | | |
|---|---|---|
| KR | 101655147 | 9/2016 |
| KR | 1020190101647 | 9/2019 |

* cited by examiner

STATOR FOR ELECTRIC MOTOR

CROSS-REFERENCE TO RELATED APPLICATIONS

This application is a National Stage application under 35 U.S.C. § 371 of International Application No. PCT/KR2020/007182, filed on Jun. 3, 2020, which claims the benefit of Koran Application No. 10-2020-0047462, filed on Apr. 20, 2020. The disclosures of the prior applications are incorporated by reference in their entirety.

TECHNICAL FIELD

The present disclosure relates to a stator for an electric motor.

BACKGROUND

As is well known, an electric motor is a device that converts electrical energy into mechanical energy.

Such electric motor typically includes a stator and a rotor disposed to be rotatable relative to the stator.

The stator includes a stator core having a plurality of slots, and a stator coil wound around the stator core via the plurality of slots.

The stator coil is configured as a conductor having a circular cross-section or a rectangular cross-section.

The conductor having the circular cross-section has a relatively small cross-sectional area and is wound with a relatively large number of turns.

The conductor having the rectangular cross-section (hereinafter, referred to as "hairpin") has a relatively large cross-sectional area and is manufactured in an approximately "U" shape.

The hairpin includes insertion parts inserted into different slots, a crown part connecting the two insertion parts, and extension parts extending from the insertion parts.

Each slot of the stator core into which the hairpins are inserted is configured to have a width and a length such that the insertion parts of the hairpins are received and disposed to be spaced apart from one another in a radial direction.

The conductors (insertion parts) of the hairpins inserted into the slots of the stator core form a plurality of layers.

With this configuration, the insertion parts of the hairpins are inserted into the slot at one side of the slot along an axial direction of the stator core. An end portion of each insertion part of the hairpin protrudes to another side of the slot along the axial direction of the stator core. The end portion of the insertion part of the hairpin protruding to the another side of the stator core is plastically deformed into a predesigned shape, and then electrically connected in a welding manner to an end portion of an insertion part of another hairpin in a preset pattern.

Meanwhile, the stator coil includes a plurality of phase-parallel coils (phase-parallel circuits) connected in parallel to one another.

Each of the plurality of phase-parallel coils is provided with a plurality of hairpins connected in series with one another.

However, in the related art stator for the electric motor with the plurality of phase-parallel coils (phase-parallel circuits), when each phase-parallel circuit has the same pattern, a circulating current (eddy current) is caused and a loss is increased.

In addition, in the related art stator for the electric motor having the plurality of phase-parallel coils (phase-parallel circuits), when a slot pitch of each phase-parallel circuit is configured differently in consideration of the generation of circulating current, shape, arrangement, and connection of the hairpins are all changed.

To manufacture, arrange, and connect new types of hairpins, creative efforts and researches (research personnel) are required and even a financial burden is increased.

In addition, when two insertion parts of the hairpin are disposed in the same layers of different slots, there is a problem that interference between the hairpins occurs during assembly.

To avoid the interference caused upon assembling the hairpins, the two insertion parts of each hairpin should be disposed in different layers. This causes a limitation on the arrangement of the hairpins of the stator coil or a connection pattern of the hairpins.

In consideration of such a problem, when the two insertion parts of each hairpin are disposed in different layers, there is a problem that the connection pattern of the hairpins of the stator coil becomes complicated and an axial length of the stator is increased.

On the other hand, in the related art electric motor having the stator coil provided with the plurality of hairpins, as the capacity of the electric motor increases, a high voltage surge of the plurality of hairpins is caused. This increases the probability of an occurrence of partial discharge which is a phenomenon that a gap between two adjacent conductors is not completely bridged and a dielectric is partially discharged.

When an occurrence of partial discharge between two adjacent hairpins increases, not only the deterioration of the hairpins is accelerated but also an insulation breakdown of an insulating material of the hairpins is caused, thereby shortening the lifespan of the hairpins.

In addition, in the related art electric motor having the stator coil provided with the plurality of hairpins, when a distance or gap (slot pitch) between the insertion parts of the hairpin is larger than a distance or gap (slot pitch) between phase coils connected to different phases of a power source, an intersection (or intersection region) between hairpins connected to different phases is generated. The intersection between the hairpins connected to the different phases much more increases the probability of the occurrence of the partial discharge than other regions.

In particular, among a plurality of hairpins having a plurality of phase coils (U-phase coil, V-phase coil, W-phase coil) connected to different phases (U-phase, V-phase, W-phase) of the power source, respectively, partial discharge may be much likely to occur at an intersection between hairpins which are connected to the power source and have a relatively high voltage distribution ratio, which may cause the lifespan of the hairpins to be drastically shortened.

A stator for an electric motor having a spacer, which is configured as an insulating member and coupled to one end portion of a stator core such that conductors of hairpins connected to terminals of a power source are supported by being spaced from one another, has been introduced.

However, in the stator for the electric motor having such a spacer, there is a problem in that a material cost is increased because the separate spacer as the insulating member is coupled to support the conductors of the hairpins in the spacing manner.

In addition, there are problems in that it is not easy to manufacture the spacer due to a complicated configuration and takes a lot of time and efforts to couple the terminals and the hairpins to the structure of the spacer.

PRIOR ART LITERATURE

Patent Literature (Patent Literature 1) KR1020160028548 A
(Patent Literature 2) KR101655147 B1
(Patent Literature 3) U.S. Pat. No. 8,749,107 B2

SUMMARY

Therefore, one aspect of the present disclosure is to provide a stator for an electric motor, capable of preventing a lifespan of a stator coil from being shortened due to partial discharge of hairpins.

Another aspect of the present disclosure is to provide a stator for an electric motor, capable of suppressing an occurrence of interference and partial discharge of hairpins, even without using a separate member, when the hairpins are coupled to a stator core.

Still another aspect of the present disclosure is to provide a stator for an electric motor, capable of increasing an occupied area of a crown part of a hairpin, compared with a cross-sectional area of a slot.

Still another aspect of the present disclosure is to provide a stator for an electric motor, capable of suppressing an occurrence of partial discharge of hairpins whose two insertion parts are disposed in the same layers.

Still another aspect of the present disclosure is to provide a stator for an electric motor, capable of suppressing an occurrence of partial discharge of outermost hairpins having a high voltage distribution ratio when power is applied.

A stator for an electric motor according to the present disclosure for solving those aspects may include a plurality of hairpins constituting a stator coil, and the plurality of hairpins may be disposed to be spaced apart by different partial discharge suppression distances according to voltage distribution ratios of the plurality of hairpins.

Specifically, in the plurality of hairpins constituting the stator coil, a partial discharge suppression distance between hairpins having a relatively high voltage distribution ratio when power is applied to the stator coil may be farther than a partial discharge suppression distance between hairpins having a relatively low voltage distribution ratio, thereby reducing the probability of partial discharge of hairpins when power is applied to the stator coil.

In particular, when power of a high voltage of 800V or higher is applied, the occurrence of the partial discharge of the hairpins can be significantly suppressed.

This may result in suppressing reduction of lifespan of the stator coil due to the partial discharge of the hairpins.

The stator for the electric motor may include a stator core having a plurality of slots, and a stator coil wound on the stator core.

The stator coil may be wound via the plurality of slots.

The stator coil may include a plurality of hairpins connected in series with one another.

The plurality of hairpins may be inserted with being spaced apart from one another into the plurality of slots of the stator core along a radial direction.

A power source may be connected to some of outermost hairpins disposed at outermost sides of the plurality of slots among the plurality of hairpins.

The stator coil may have a different voltage distribution ratio when power is applied. Typically, a voltage distribution ratio of a hairpin connected to a power source may be higher than a voltage distribution ratio of a hairpin spaced far apart from the hairpin connected to the power source.

The plurality of hairpins may be spaced apart from one another by the partial discharge suppression distance to suppress the partial discharge when power is applied to the stator coil, thereby remarkably reducing the probability of the partial discharge.

A partial discharge suppression distance between hairpins having a high voltage distribution ratio when power is applied to the stator coil may be farther than a partial discharge suppression distance between hairpins having a low voltage distribution ratio.

This may result in remarkably reducing the probability of the partial discharge of the hairpins having the high voltage distribution ratio, which have the relatively high probability of the partial discharge.

The stator for the electric motor may include a stator core having a rotor receiving hole, and a plurality of slots and teeth formed around the rotor receiving hole, and a stator coil wound via the plurality of slots. The stator coil may include a plurality of hairpins inserted into the plurality of slots and connected in series with one another. The plurality of hairpins may be disposed to be spaced apart by a partial discharge suppression distance to suppress partial discharge between adjacent hairpins. A partial discharge suppression distance between hairpins having a high voltage distribution ratio when power is applied to the stator coil is greater than a partial discharge suppression distance between hairpins having a low voltage distribution ratio.

A power source may be connected to some of outermost hairpins disposed at outermost sides in the plurality of slots along the radial direction of the stator core.

The partial discharge suppression distance may include a first partial discharge suppression distance formed between the outermost hairpin and a conductor and a second partial discharge suppression distance formed between a hairpin disposed at an inner side of the outermost hairpin and a conductor.

The first partial discharge suppression distance may be greater than the second partial discharge suppression distance.

The first partial discharge suppression distance may be set to 1.2 mm or longer.

Accordingly, even when power of a high voltage (800V or higher) is applied to the outermost hairpin having a relatively high probability of an occurrence of partial discharge, the probability of the occurrence of the partial discharge at the outermost hairpin can be remarkably reduced.

The second partial discharge suppression distance may be set to 0.2 mm or longer.

Accordingly, a partial discharge suppression distance between hairpins having a relatively low probability of partial discharge can be maintained to be relatively short, thereby reducing an occupied space of crown parts of the hairpins when the hairpins are installed.

In one implementation, the outermost hairpin may include a first insertion part and a second insertion part respectively inserted into outermost layers of different slots, a first crown part having one side connected to the first insertion part, and a second crown part having one side connected to the first crown part and another side connected to the second insertion part.

The first crown part of one outermost hairpin and the second crown part of another outermost hairpin may be spaced apart from each other by the first partial discharge suppression distance, that is, 1.2 mm as described above, so that the probability of the partial discharge between the outermost hairpins can be suppressed even when power of a high voltage (e.g., 800 V or higher) is applied to the stator coil.

In one implementation, the first crown part of the outermost hairpin may be formed to be spaced outwardly, compared to the first insertion part, along radial direction of the stator core.

Accordingly, the first insertion part and the first crown part of the outermost hairpin can be spaced apart from each other, which may result in suppressing interference between different outermost hairpins and facilitating assembling (coupling) of the outermost hairpins.

In one implementation, the outermost hairpin may be provided with a first radially-bent part bent outwardly from the first insertion part in the radial direction of the stator core and connected to the first crown part.

Accordingly, an occupied space of the crown parts of the outermost hairpin may expand along the radial direction, compared to a cross-sectional area of the plurality of slots.

With the configuration, the partial discharge between the hairpins which may occur when the hairpins are coupled to the stator core can be suppressed even without using a separate support member for supporting the hairpins in a spaced manner.

Also, when the outermost hairpins are coupled, interference between different outermost hairpins can be suppressed, which may facilitate assembling of the outermost hairpins.

The second crown part of the outermost hairpin may be disposed at an inner side of the first crown part in a spaced manner along the radial direction of the stator core.

Accordingly, when coupling different outermost hairpins to the stator core, the first crown part of the outermost hairpin and the second crown part of another outermost hairpin can be spaced apart from each other by a preset distance (first partial discharge suppression distance) along the radial direction of the stator core.

Accordingly, when power is applied to the stator coil, the partial discharge which may occur between the first and second crown parts of the different outermost hairpins can be suppressed.

In one implementation, the outermost hairpin may be provided with a second radially-bent part that is bent outwardly from the second insertion part along the radial direction of the stator core.

With the configuration, the second crown part of the outermost hairpin can be spaced apart outwardly from another hairpin, which is disposed at the inner side of the outermost hairpin, in the radial direction even without using a separate support member for supporting the hairpins.

Accordingly, an occupied space by the crown parts of the outermost hairpin can expand outwardly in the radial direction, compared to the cross-sectional area of the plurality of slots.

With the configuration, the partial discharge, which may occur between the second crown part of the outermost hairpin and a crown part of a hairpin disposed at the inner side of the outermost hairpin, can be significantly suppressed.

Here, the first radially-bent part and the second radially-bent part each may have a minimum radius of curvature.

The minimum radius of curvature may be set to 2.0 mm or greater.

Accordingly, stress which may be caused when manufacturing the first radially-bent part and the second radially-bent part of the outermost hairpin can be suppressed, and the probability of the occurrence of the partial discharge due to the stress can be significantly reduced.

The first crown part and the second crown part may form minimum interior angles with respect to a first extension line and a second extension line which are in parallel to the first insertion part and the second insertion part.

The minimum interior angle may be set to 110 degrees or greater.

Accordingly, stress which may be caused when manufacturing the first radially-bent part and the second radially-bent part of the outermost hairpin can be suppressed, and the probability of the occurrence of the partial discharge due to the stress can be significantly reduced.

In one implementation of the present disclosure, the outermost hairpin may be configured such that the first radially-bent part protrudes from the first insertion part by a first protrusion length and the second radially-bent part protrudes from the second insertion part by a second protrusion length along the radial direction of the stator core.

The first protrusion length may be greater than or equal to a value obtained by adding the first partial discharge suppression distance to the second protrusion length.

With the configuration, when different outermost hairpins are coupled to the stator core, the first crown part of one outermost hairpin and the second crown part of another outermost hairpin can secure the first partial discharge suppression distance between them.

Accordingly, when power is applied to the stator coil, the partial discharge which may occur between the crown parts of the outermost hairpins having two insertion parts disposed in the same layers can be suppressed.

Meanwhile, the stator coil may include a plurality of phase coils connected to phases (U-phase, V-phase, W-phase) of a power source, respectively.

The plurality of phase coils may include a U-phase coil, a V-phase coil, and a W-phase coil.

The U-phase coil, the V-phase coil, and the W-phase coil may be spaced apart from one another by a preset slot pitch along the circumferential direction of the stator core.

In one implementation of the present disclosure, the U-phase coil, the V-phase coil, and the W-phase coil may be spaced apart from one another by an 8-slot pitch along the circumferential direction of the stator core.

Each of the plurality of phase coils may be provided with a plurality of phase-parallel coils connected in parallel to one another.

In one implementation of the present disclosure, each of the plurality of phase-parallel coils may be provided with first to fourth phase-parallel coils.

The U-phase coil may include a first U-phase-parallel coil, a second U-phase-parallel coil, a third U-phase-parallel coil, and a fourth U-phase-parallel coil.

The V-phase coil may include a first V-phase-parallel coil, a second V-phase-parallel coil, a third V-phase-parallel coil, and a fourth V-phase-parallel coil.

The W-phase coil may include a first W-phase-parallel coil, a second W-phase-parallel coil, a third W-phase-parallel coil, and a fourth W-phase-parallel coil.

In one implementation of the present disclosure, the outermost hairpin may be configured such that two insertion parts are spaced apart by different slot pitches.

In one implementation of the present disclosure, the outermost hairpins may include a first outermost hairpin having two insertion parts spaced apart by a 13-slot pitch along the circumferential direction of the stator core, and a second outermost hairpin having two insertion parts spaced apart by a 9-slot pitch along the circumferential direction of the stator core.

With the configuration, by differently arranging the second outermost hairpins of the plurality of phase-parallel coils, current phases of the plurality of phase coils can become different from one another, thereby preventing the generation of circulating current of the phase-parallel coils.

This may result in preventing operation efficiency of the electric motor from being lowered due to the generation of the circulating current of the plurality of phase-parallel coils.

The first outermost hairpin and the second outermost hairpin may have different protrusion lengths from an end portion of the stator core along the axial direction of the stator core.

In one implementation of the present disclosure, the second outermost hairpin may have a protrusion length which is shorter than that of the first outermost hairpin, so as to be disposed at the inner side of the first outermost hairpin.

In one implementation of the present disclosure, the U-phase coil and the V-phase coil may be configured such that the second crown part of the first outermost hairpin of each phase-parallel coil of the U-phase coil and the first crown part of the first outermost hairpin of each phase-parallel coil of the V-phase coil are spaced apart from each other by the first partial discharge suppression distance.

Accordingly, when power is applied to the stator coil, the partial discharge which may occur between the U-phase coil and the V-phase coil, which have different phases, can be suppressed.

In one implementation of the present disclosure, the V-phase coil and the W-phase coil may be configured such that the second crown part of the first outermost hairpin of each phase-parallel coil of the V-phase coil and the first crown part of the first outermost hairpin of each phase-parallel coil of the W-phase coil are spaced apart from each other by the first partial discharge suppression distance.

Accordingly, when power is applied to the stator coil, the occurrence of partial discharge between the V-phase coil and the W-phase coil can be suppressed.

In one implementation of the present disclosure, the W-phase coil and the U-phase coil may be configured such that the second crown part of the first outermost hairpin of each phase-parallel coil of the W-phase coil and the first crown part of the first outermost hairpin of each phase-parallel coil of the U-phase coil are spaced apart from each other by the first partial discharge suppression distance.

Accordingly, when power is applied to the stator coil, the occurrence of partial discharge between the W-phase coil and the U-phase coil can be suppressed.

On the other hand, in one implementation of the present disclosure, the plurality of hairpins may further include innermost hairpins disposed at the innermost sides in the plurality of slots, and middle hairpins disposed between the innermost hairpins and the outermost hairpins in the plurality of slots.

Here, the innermost hairpin and the middle hairpin may be configured such that two insertion parts are spaced apart from each other by a 12-slot pitch along the circumferential direction of the stator core.

In one implementation of the present disclosure, the innermost hairpin may be provided with a first insertion part and a second insertion part disposed in innermost layers of different slots, respectively, a first crown part connected to the first insertion part, and a second crown part connected to the second insertion part.

The second crown part may be disposed at an inner side of the first crown part along the radial direction of the stator core.

With the configuration, the occurrence of interference can be suppressed when the innermost hairpin is coupled.

In one implementation of the present disclosure, the second crown part of the innermost hairpin may be disposed at the inner side of the second insertion part along the radial direction of the stator core.

With the configuration, the crown part of the innermost hairpin and the crown part of the middle hairpin disposed at an outer side of the innermost hairpin may be spaced apart from each other along the radial direction.

Accordingly, the occurrence of partial discharge between the crown part of the innermost hairpin and the crown part of the middle hairpin disposed at the outer side of the innermost hairpin can be suppressed.

In one implementation of the present disclosure, the innermost hairpin may be provided with a radially-bent part bent inwardly from the second insertion part along the radial direction of the stator core and connected to the second crown part.

This may result in suppressing the occurrence of partial discharge between the crown part of the innermost hairpin and the crown part of the middle hairpin without using a separate member for supporting the hairpins.

As described above, according to one implementation of the present disclosure, hairpins can be spaced apart from one another by a partial discharge suppression distance, thereby preventing lifespan of a stator coil from being shortened due to the partial discharge between the hairpins.

Particularly, a partial discharge suppression distance between hairpins having a high voltage distribution ratio may be greater than a partial discharge suppression distance between hairpins having a low voltage distribution ratio, thereby remarkably reducing the probability of partial discharge of the stator coil.

Since each hairpin has radially-bent parts bent along the radial direction, the use of a separate support member for supporting the hairpins can be suppressed.

Since each hairpin has the radially-bent parts bent along the radial direction, interference between hairpins can be suppressed when the hairpins are coupled to the stator core.

In addition, since each hairpin has the radially-bent parts bent outermost hairpin along the radial direction, the occurrence of partial discharge between the hairpins can be significantly reduced.

Since the outermost hairpin, which has two insertion parts disposed at outermost sides of the plurality of slots, has the radially-bent parts, an area occupied by the crown parts of the hairpin can increase, compared to a cross-sectional area of the slots.

This may result in suppressing the occurrence of partial discharge between hairpins having two insertion parts disposed in the same layers.

In addition, some of the outermost hairpins can be connected to a power source, so as to prevent the occurrence of partial discharge between outermost hairpins having a high voltage distribution ratio when power is applied.

In particular, the probability of partial discharge, which may occur in the stator coil when power of a high voltage is applied, can be remarkably reduced.

DETAILED DESCRIPTION

Hereinafter, implementations of the present disclosure will be described in detail with reference to the accompanying drawings. For the sake of brief description with reference to the drawings, the same or equivalent components will be provided with the same reference numbers, and description thereof will not be repeated. A singular representation used herein may include a plural representation unless it represents a definitely different meaning from the context. In describing the present invention, if a detailed explanation for a related known technology or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings.

Figure 1:
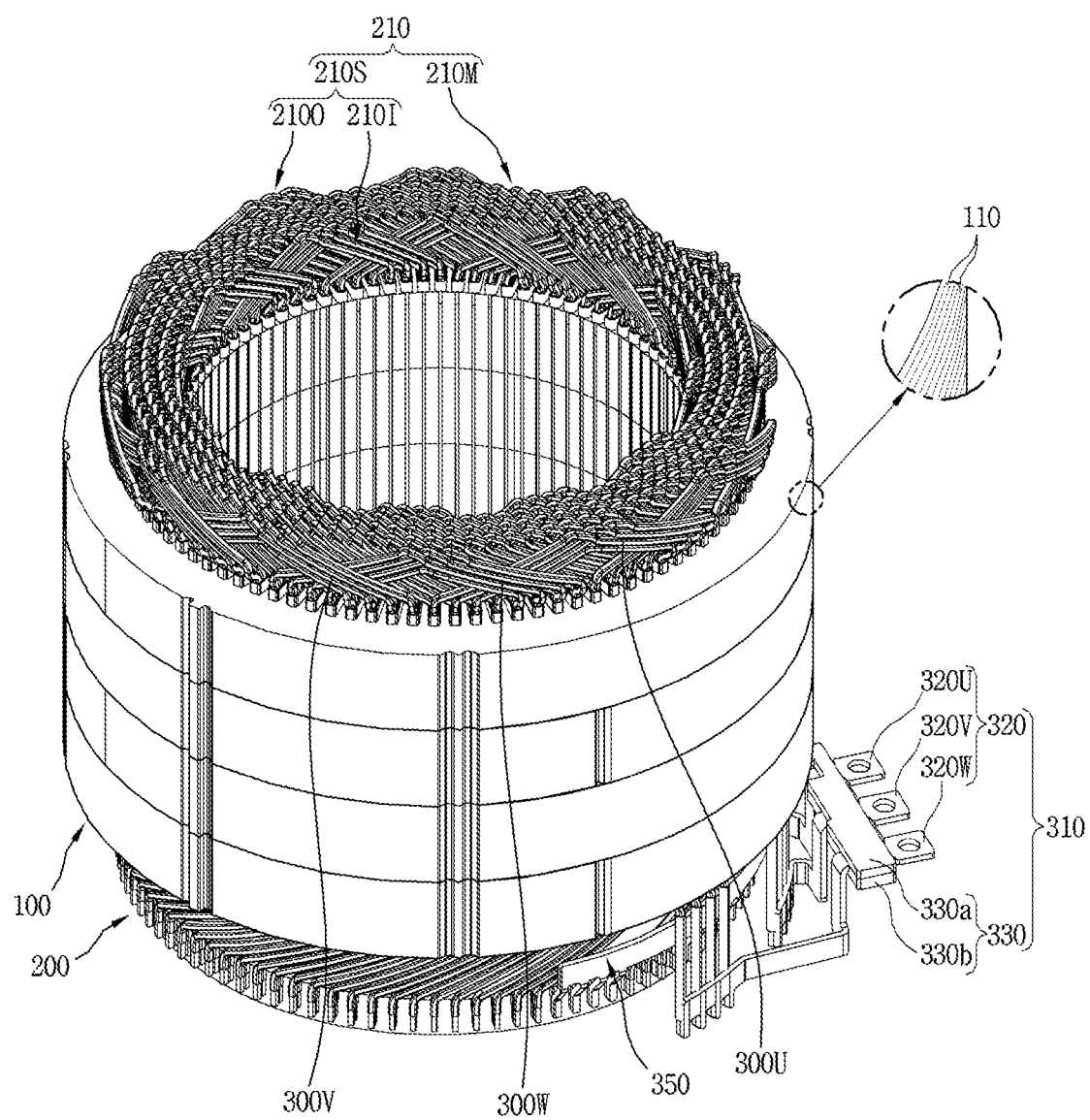
FIG. 1 is a perspective view of a stator for an electric motor in accordance with one embodiment of the present disclosure.
Figure 2:
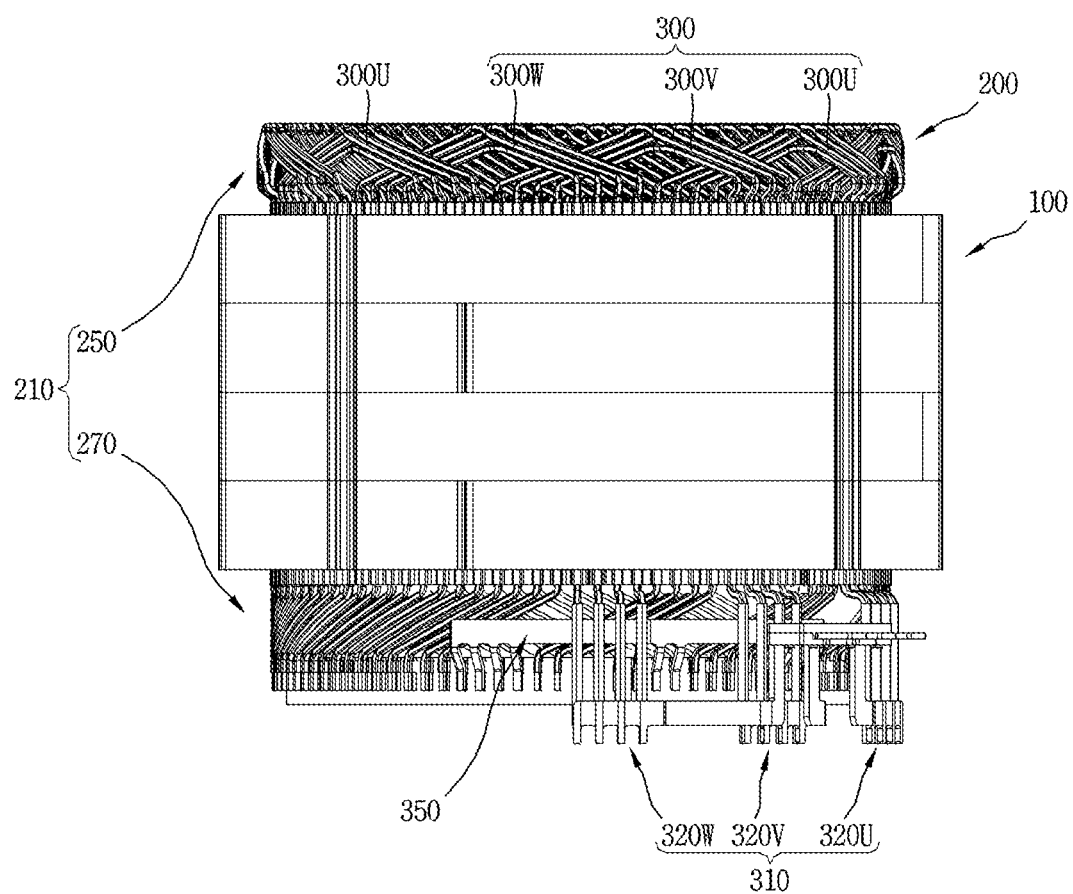
FIG. 2 is a front view of the stator of FIG. 1.
Figure 3:
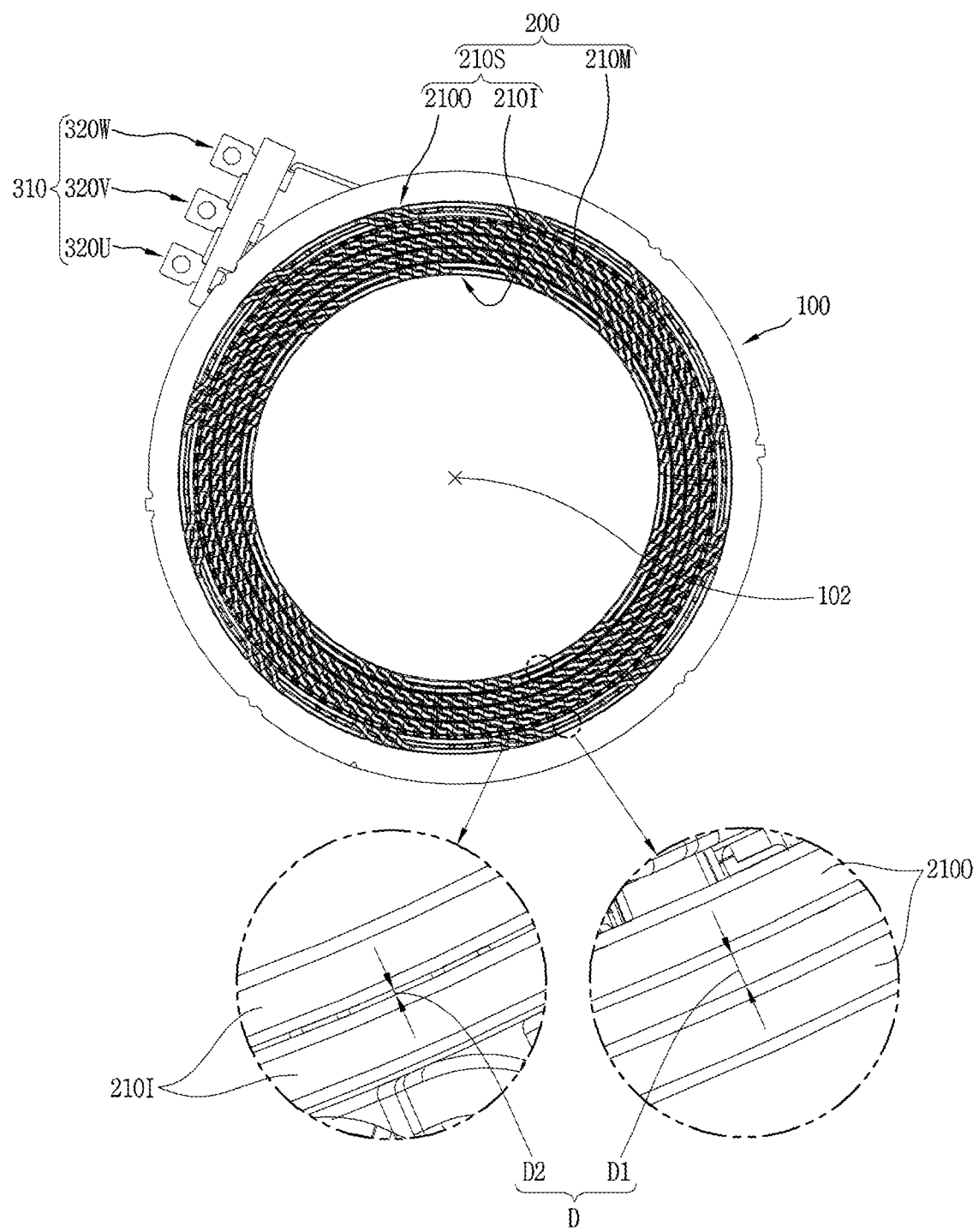
FIG. 3 is a planar view of the stator of FIG. 2.

FIG. 1 is a perspective view of a stator for an electric motor in accordance with one embodiment of the present disclosure, FIG. 2 is a front view of the stator of FIG. 1, and FIG. 3 is a planar view of the stator of FIG. 2. As illustrated in FIGS. 1 to 3, a stator for an electric motor according to the present disclosure may include a stator core 100 and a stator coil 200.

The stator, for example, may be configured to receive a rotor (not illustrated) with a predetermined air gap such that the rotor is rotatable inside it.

The stator core 100 may be formed in a cylindrical shape.

The electric motor according to this implementation may be implemented as a traction motor of an electric vehicle or a hybrid vehicle.

The stator may receive power of a high voltage of 800V or higher, for example.

The stator core 100 may be configured by stacking in an insulating manner a plurality of electrical steel sheets 110.

The stator core 100 may be provided with a rotor receiving hole 102 to accommodate the rotor therein.

The stator core 100 may be provided with a plurality of slots 120 and a plurality of teeth 130 formed on a circumference of the rotor receiving hole 102 in an alternating manner.

The plurality of slots 120 may be, for example, 96 in number.

The plurality of teeth 130 may be, for example, 96 in number.

The stator coil 200 may be wound via the plurality of slots 120.

The stator coil 200, for example, may be configured such that eight different magnetic poles (N pole and S pole) are formed along a circumferential direction.

The stator coil 200 may include a plurality of hairpins 210 connected in series with one another. The stator coil 200 (the plurality of hairpins 210) may be configured such that a relatively high voltage (high voltage) can flow.

The stator for the electric motor according to the implementation may be configured to receive power of a voltage of 700V to 900V, for example.

The stator for the electric motor according to the implementation may be configured to receive power of a voltage of 800V, for example.

In the implementation, as illustrated in FIG. 3, the plurality of hairpins 210 may be spaced apart from one another by a partial discharge suppression distance D so that an occurrence of partial discharge can be suppressed when power is applied to the stator coil 200.

As is well known, the partial discharge refers to a local electrical discharge phenomenon that occurs in a part of a dielectric without completely bridging a gap between electrodes in an insulation system.

When partial discharge occurs at the hairpins 210, the hairpins 210 may be deformed chemically and/or physically and thereby forcibly deteriorated.

In this implementation, the partial discharge suppression distance D may be set such that a partial discharge suppression distance (first partial discharge suppression distance D1) between hairpins 210O having a high voltage distribution ratio when power is applied is longer than a partial discharge suppression distance (second partial discharge suppression distance D2) between hairpins 210I and 210M having a low voltage distribution ratio.

Accordingly, when power is applied to the stator coil 200, the probability of partial discharge of the hairpins 210O which have a relatively high probability of partial discharge due to the high voltage distribution ratio can be remarkably reduced.

Figure 4:
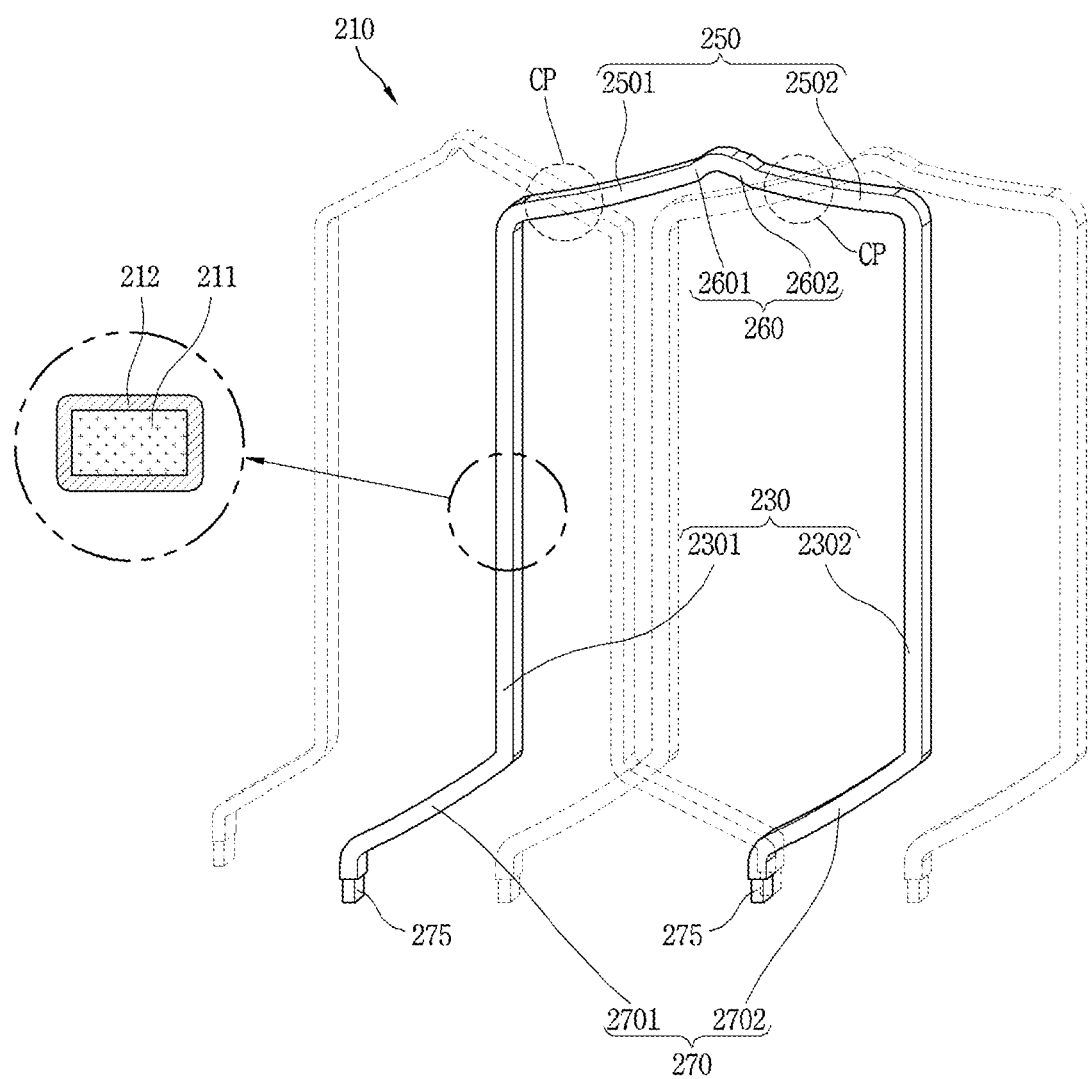
FIG. 4 is a conceptual view illustrating a hairpin of FIG. 1.

FIG. 4 is a conceptual view illustrating the hairpin of FIG. 1. As illustrated in FIG. 4, each of the plurality of hairpins 210 may include, for example, insertion parts 230 inserted into the plurality of slots 120, a crown part 250 connecting the two insertion parts 230, and extension parts 270 extending from the insertion parts 230.

More specifically, the hairpin 210 may include two insertion parts 230 respectively inserted into the slots 120 spaced apart from each other, a crown part 250 connecting end portions of the two insertion parts 230 at one end portion of the stator core 100 in an axial direction, and two extension parts 270 extending from the insertion parts 230 at another end portion of the stator core 100 in the axial direction.

The two insertion parts 230 may be spaced apart from each other by a preset gap along a circumferential direction of the stator core 100.

The plurality of hairpins 210 may be implemented in an approximately "U" shape before the stator core 100 is coupled.

In each of the plurality of hairpins 210, the insertion parts 230 and the extension parts 270 may be formed in a linear shape before the stator core 100 is coupled, and the extension parts 270 may be bent in a preset shape (pattern) from the insertion parts 230 after the stator core 100 is coupled.

Each of the plurality of hairpins 210 may include a conductor 211 and a coating material (coating film) 212 that covers a surface of the conductor 211.

The conductor 211 may be made, for example, of copper.

The coating material 212 may be implemented as an insulating member 150 having insulating properties for insulating the conductor 211.

Each of the plurality of hairpins 210 may be configured, for example, by bending the conductor 211, which is a so-called angular copper wire having a rectangular cross-section, into an approximately "U" shape.

The hairpin 210, for example, may have an approximately "U" shape defined by the two insertion parts 230 and the crown part 250 before coupling the stator core 100.

The two insertion parts 230 of the hairpin 210 implemented in the "U" shape may be inserted into the corresponding slots 120 in the axial direction at one side of the stator core 100.

After the two insertion parts 230 of the hairpin 210 are inserted into the corresponding slots 120 of the stator core 100, the insertion parts 230 may be bent in a preset pattern (shape) at points, which have a preset length from end portions of the insertion parts 230, to form the extension parts 270 and connection end portions 275 to be explained later.

Here, the extension parts 270 of the plurality of hairpins 210 may be bent clockwise and/or counterclockwise with respect to the respective insertion parts 230.

That is, the two extension parts 270 may be bent in the same direction or in opposite directions.

Each of the extension parts 270 may be bent in a curved shape from the corresponding insertion parts 230 so as to be disposed along the circumferential direction of the stator core 100.

Each of the extension parts 270, for example, may have a length, which is long enough for the end portion (connection end portion 275) to be located at a position spaced apart from the insertion part 230 by an approximately half (6-slot pitch) of the gap between the two insertion parts 230.

More specifically, for example, since the two insertion parts 230 of each of the hairpins 210 are spaced apart from each other by a gap of an approximately 12-slot pitch, the extension parts 270 each may have a length corresponding to a gap of a 6-slot pitch from the insertion parts 230.

Each of the extension parts 270 may have the connection end portion 275 which is bent at its end to be disposed in the axial direction.

The connection end portions 275 may be formed to overlap the connection end portions 275 of another hairpin 210 in a radial direction.

Each of the connection end portions 275 may include, for example, a stripped section 277 formed by stripping the coating material 212 from the end portion of the extension part 270 by a preset length.

The connection end portion 275 may be arranged along the axial direction of the stator core 100 and provided with a non-stripped section 276 excluding the stripped section 277.

Accordingly, the different hairpins 210 may be electrically connected in series with each other.

The plurality of hairpins 210 may be electrically connected to each other by bringing the connection end portions 275 of the different hairpins 210 into contact with each other and integrally welding the two stripped sections 277 in contact with each other.

Figure 5:
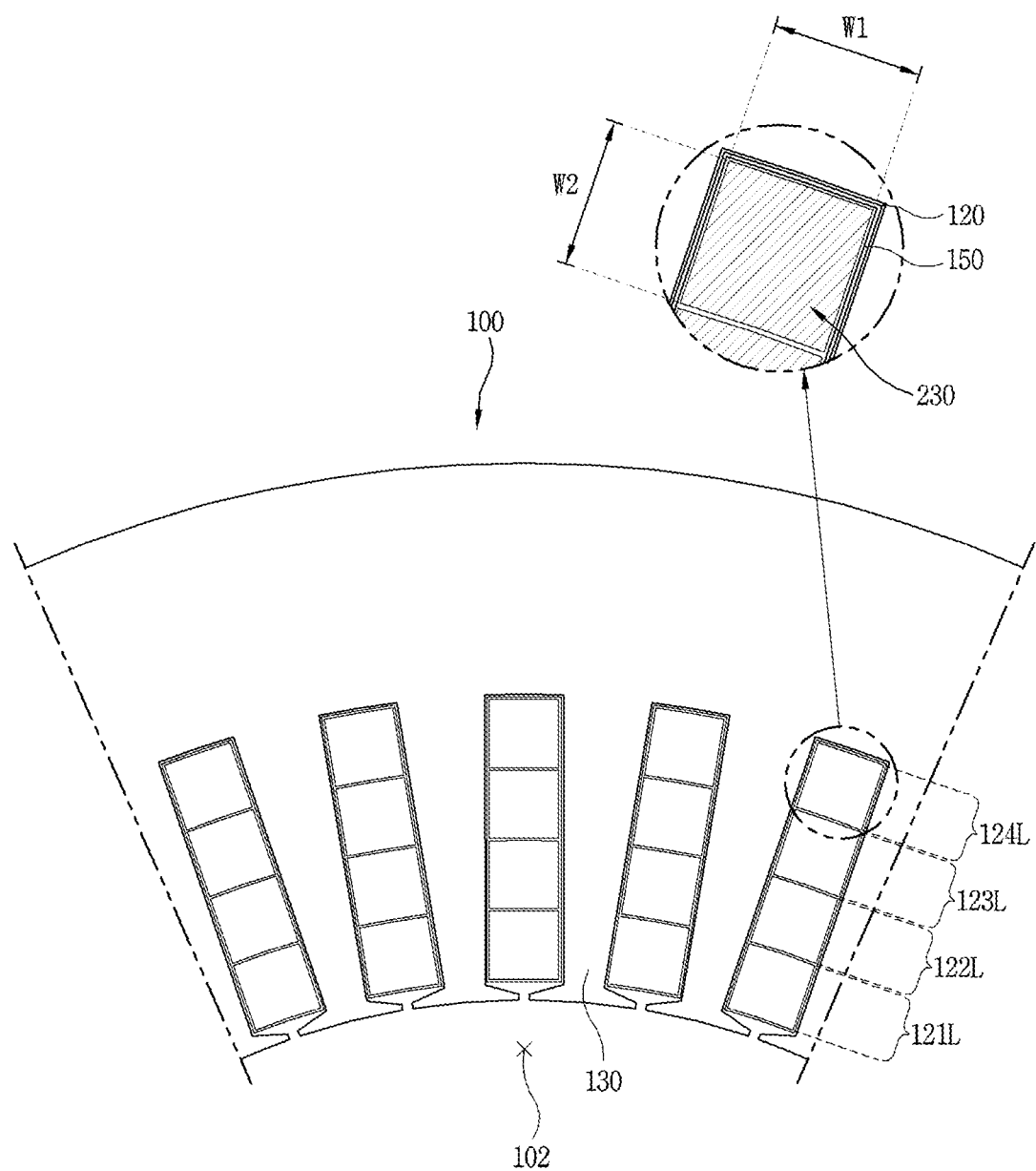
FIGS. 5 and 6 are views illustrating a coupled state of the hairpins of FIG. 4 and slots.
Figure 6:
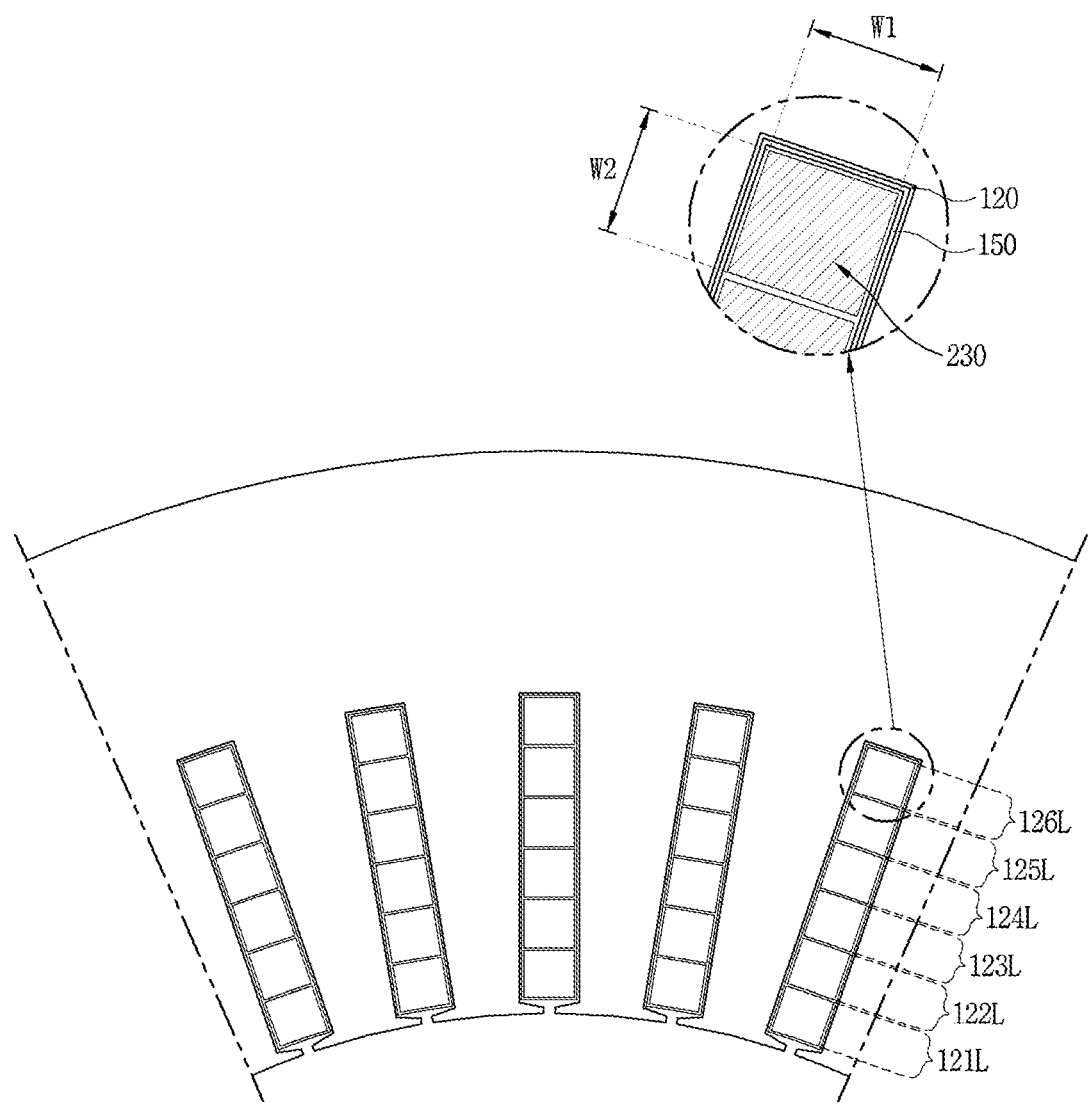

FIGS. 5 and 6 are views illustrating a coupled state of the hairpins of FIG. 4 and slots. As illustrated in FIG. 5, the insertion parts 230 of the hairpins 210 may be inserted into the plurality of slots 120, respectively.

The plurality of slots 120 of the stator core 100 may each have one side (inner side in the drawing) communicating with the rotor receiving hole 102.

The insertion parts 230 of the hairpins 210 may be disposed inside the plurality of slots 120 to be spaced apart from one another along the radial direction.

The hairpin 210, for example, may be configured such that a first width W1 in the circumferential direction of the stator core 100 is larger than a second width W2 in the radial direction of the stator core 100.

The insertion parts 230 of the plurality of hairpins 210 may form a plurality of layers in the plurality of slots 120 of the stator core 100.

The plurality of layers may be implemented as, for example, a first layer 121L to a fourth layer 124L.

The first layer 121L may be defined as an innermost layer because it is located at the innermost side among of the plurality layers inside the slot 120.

The fourth layer 124L may be defined as an outermost layer because it is located at the outermost side among the plurality of slots 116 inside the slot 120.

The stator coil 200 may include, for example, a plurality of hairpins 210 which is disposed in the plurality of slots 120 to form the first to fourth layers 121L to 124L.

On the other hand, as illustrated in FIG. 6, the stator coil 200, for example, may alternatively include a plurality of hairpins 210 which is disposed in the plurality of slots to form first to sixth layers 121L to 126L.

Here, as described above, the first layer 121L may be defined as an innermost layer because it is disposed at the innermost side among the plurality of layers in the slot 120.

The sixth layer 126L may be defined as an outermost layer because it is located at the outermost side among the plurality of slots 116 in the slot 120.

Referring back to FIG. 4, the plurality of hairpins 210 may have the "U" shape defined by the two insertion parts 230 and the crown part 250 before the stator core 100 is coupled. After the stator core 100 is coupled, the two insertion parts 230 may be bent in a preset pattern to form the extension parts 270 and the connection end portions 275.

The extension parts 270 may be bent in the same direction in some of the plurality of hairpins 210, and may be bent in opposite directions in some other hairpins 210.

At this time, a cross point CP where the crown parts 250 of the plurality of hairpins 210 cross with each other may be generated. The probability of an occurrence of partial discharge at the cross point CP may increase when power is applied to the stator coil 200.

Since the related art stator coil receives power of a relatively low voltage, the probability that the partial discharge occurs may increase, of course, when power of a relatively high voltage is applied to the stator coil. In particular, when power of a high voltage of 800V or higher is applied, the probability of the partial discharge at the cross point CP of the hairpins 210 may be drastically increased.

Figure 7:
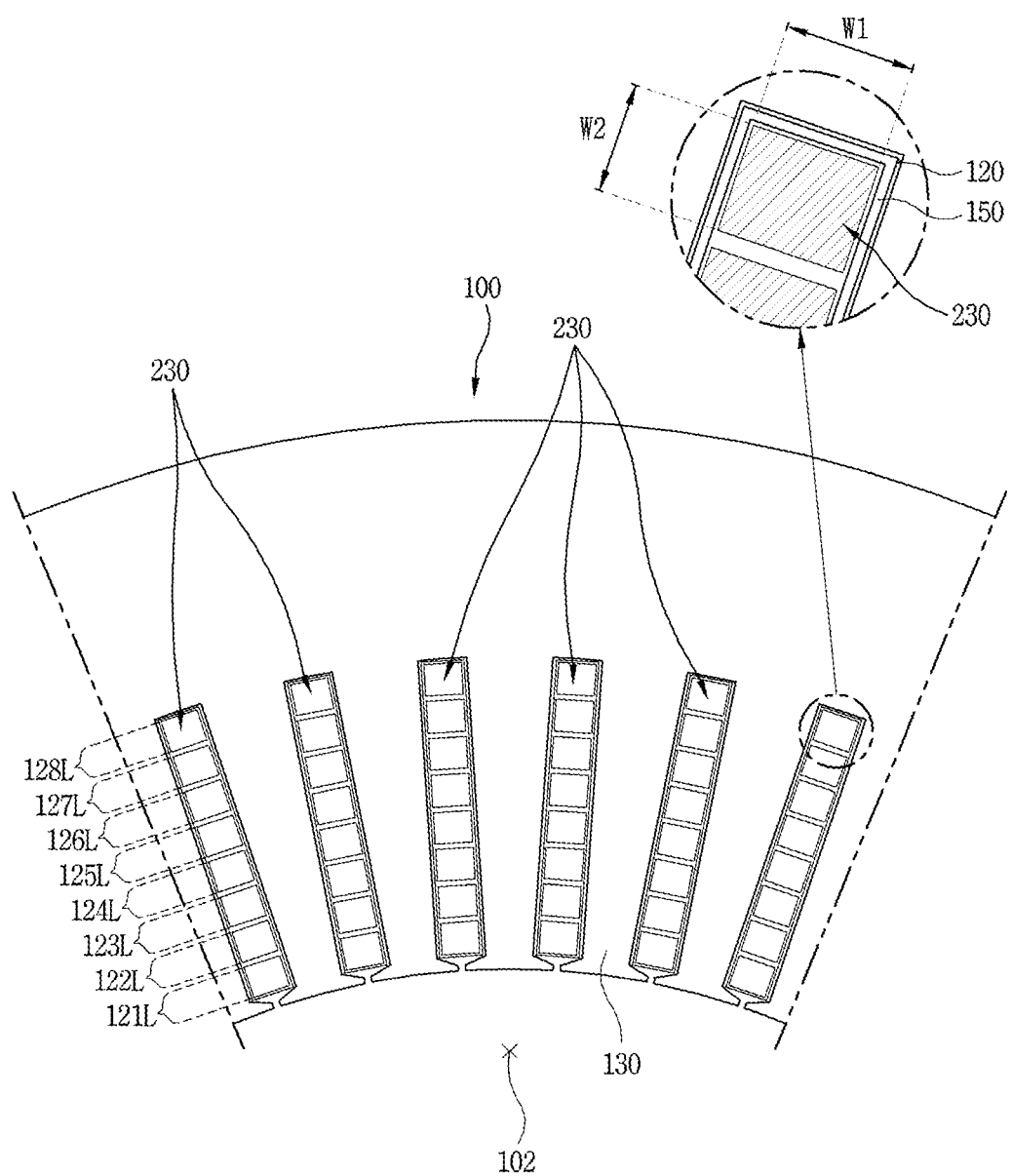
FIG. 7 is a view illustrating a coupled state of the slots and the hairpins of FIG. 1.

FIG. 7 is a view illustrating a coupled state of the slots and the hairpins of FIG. 1. As illustrated in FIG. 7, the stator coil 200 of the stator for the electric motor according to the implementation may include a plurality of hairpins 210 disposed to form a first layer 121L to an eighth layer 128L.

The insertion parts 230 of the hairpins 210 may be disposed inside the plurality of slots 120.

The slots 120 may each have a width corresponding to a cross-sectional shape of the hairpin 210, for example.

The slot 120 may have a width corresponding to a width of the cross-section of the hairpin 210 in the circumferential direction.

In this implementation, the hairpin 210, for example, may be configured such that a first width W1 in the circumferential direction of the stator core 100 is larger than a second width W2 in the radial direction of the stator core 100.

The slot 120 may be configured to have a width corresponding to the first width W1 (the width along the circumferential direction) of the hairpin 210.

The slot 120 may have a length, for example, capable of receiving the insertion parts 230 of eight hairpins 210 in the radial direction of the stator core 100.

Inside each of the slots 120, eight insertion parts 230 of different hairpins 210 may be spaced apart from one another in the radial direction.

An insulating member 150 may be inserted into the slot 120 to insulate between the hairpins 210 (insertion parts 230) and the stator core 100.

The insulating member 150 may be configured to insulate both sidewalls, an inner wall, and an outer wall of the slot 120, for example.

The insulating member 150 may be configured to surround the insertion parts 230 inside the corresponding slot 120 in all four directions, for example.

The insertion parts 230 of the hairpins 210 inserted in the slot 120 may form a plurality of layers 121L to 128L.

On the other hand, the plurality of hairpins 210 according to this implementation may be configured such that the two insertion parts 230 are disposed in the same inner layers of the plurality of slots 120, respectively, or may be disposed in different inner layers of the plurality of slots 120.

The hairpins 210 may include same-layer hairpins 210S having two insertion parts 230 inserted into the same layers of different slots, respectively.

The hairpins 210 may include different-layer hairpins having two insertion parts 230 inserted in different layers of different slots, respectively.

The same-layer hairpins 210S may include, for example, outermost hairpins 210O having two insertion parts 230 disposed in the outermost layers, respectively.

The same-layer hairpins 210S may include, for example, innermost hairpins 210I having two insertion parts 230 disposed in the innermost layers, respectively.

The plurality of hairpins 210 may include the innermost hairpins 210I each having two insertion parts 230 disposed in the innermost layers of the plurality of slots 120, respectively.

The plurality of hairpins 210 may include middle hairpins 210M each having two insertion parts 230 disposed in different layers among middle layers located between the innermost layer and the outermost layer of the plurality of slots 120.

The middle hairpin 210M may also be referred to as the different-layer hairpin in that its two insertion parts 230 are disposed in different layers of different slots.

The plurality of layers may include, for example, eight layers 121L to 128L.

The eight layers 121L to 128L may be disposed from inside to outside along the radial direction of the stator core 100.

The first layer 121L may be disposed at the innermost side in each of the plurality of slots 120.

The eighth layer 128L may be disposed at the outermost side in each of the plurality of slots 120.

In this implementation, the innermost layer may refer to the first layer 121L, and the outermost layer may refer to the eighth layer 128L.

The second layer 122L, the third layer 123L, the fourth layer 124L, the fifth layer 125L, the sixth layer, and the seventh layer 127L which are respectively disposed between the first layer 121L and the eighth layer 128L may be referred to as middle layers.

The plurality of hairpins 210 may be electrically connected to one another in a preset pattern.

The stator coil 200 may include a plurality of phase coils 300 connected to respective phases (U-phase, V-phase, W-phase) of the power source.

Each of the plurality of hairpins 210 of the stator coil 200 may be configured such that a current of a high voltage (e.g., 800V) flows.

Figure 8:
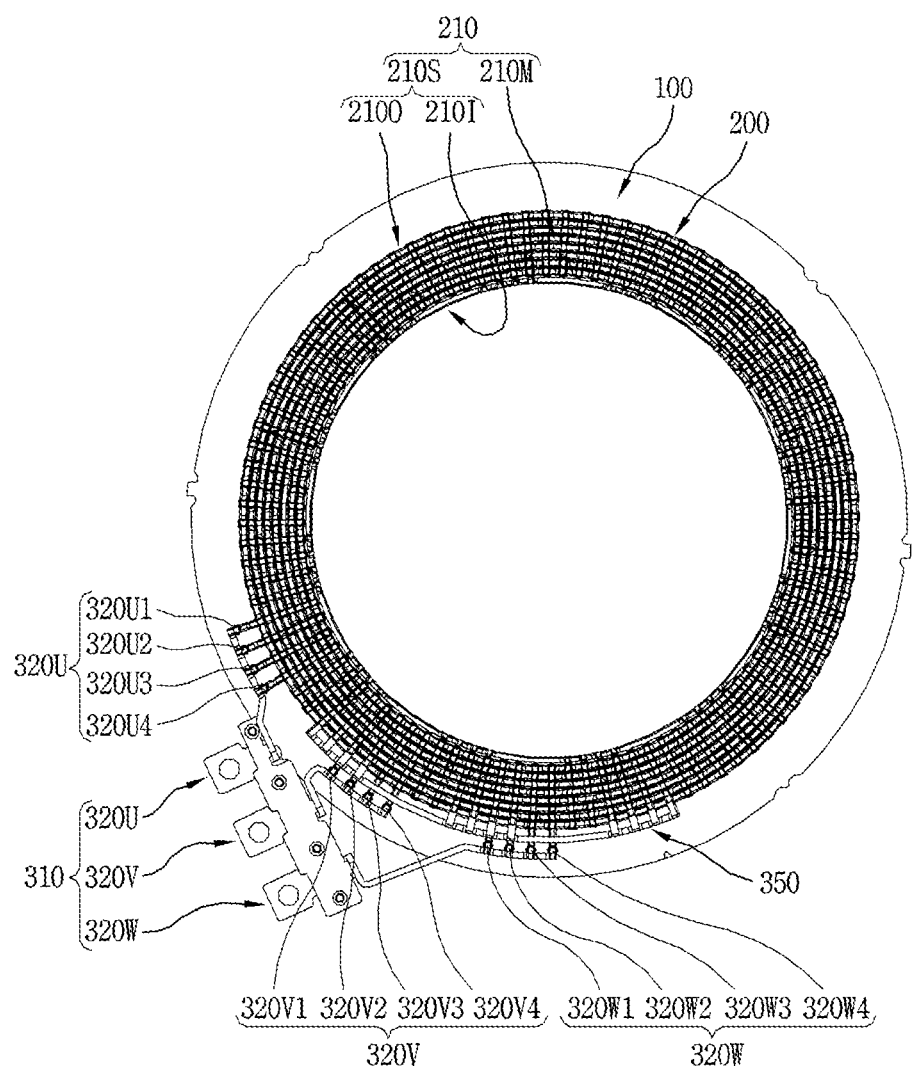
FIG. 8 is a bottom view of the stator of FIG. 2.
Figure 9:
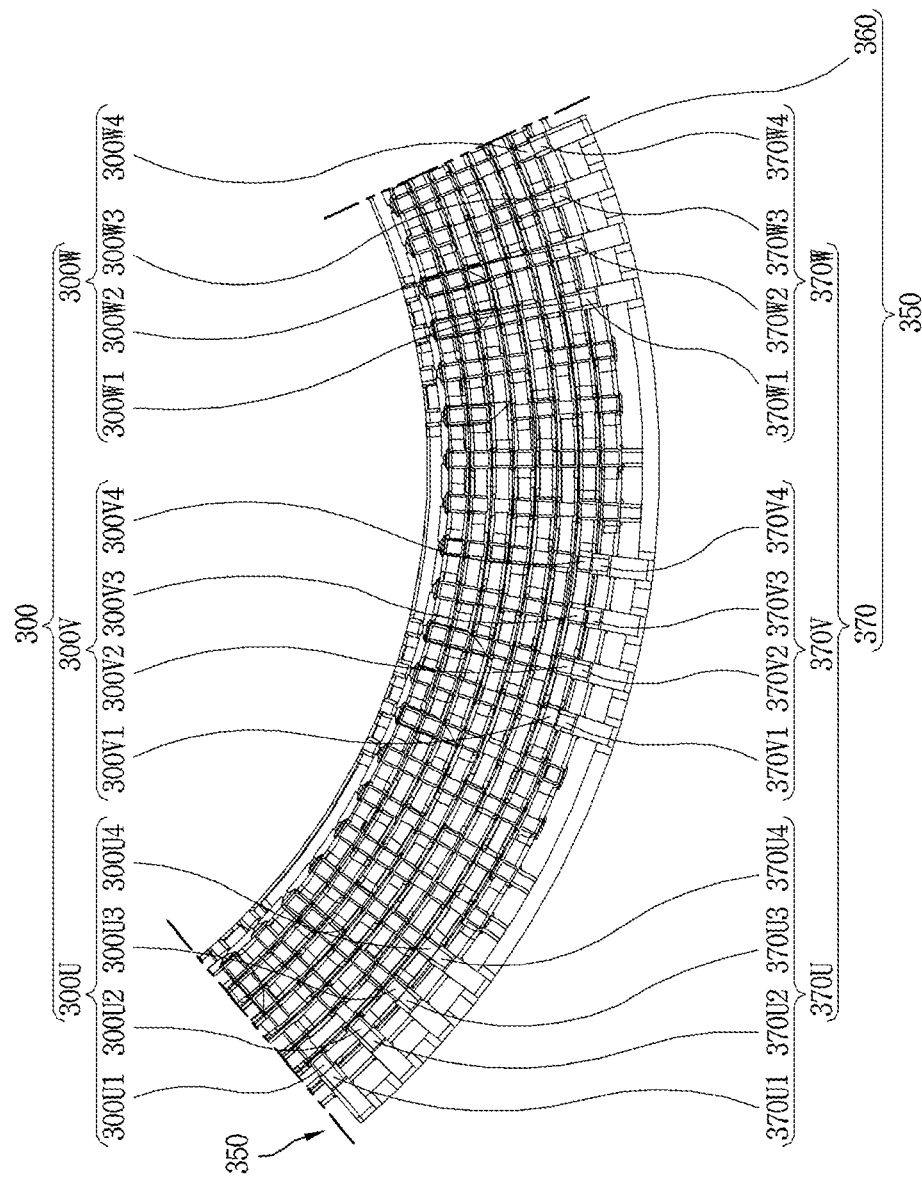
FIG. 9 is an enlarged view of a neutral wire of FIG. 6.

FIG. 8 is a bottom view of the stator of FIG. 2 and FIG. 9 is an enlarged view of the neutral wire of FIG. 6. First, referring to FIG. 9, the plurality of phase coils 300 may include, for example, a U-phase coil 300U, a V-phase coil 300V, and a W-phase coil 300W.

The plurality of phase coils 300 may include a plurality of phase-parallel coils connected in parallel to one another.

The plurality of phase-parallel coils may be, for example, 4 in number.

More specifically, the plurality of phase-parallel coils may include, for each phase, first phase-parallel coils 300U1, 300V1, 300W1, second phase-parallel coils 300U2, 300V2, 300W2, third phase-parallel coils 300U3, 300V3, 300W3, and fourth phase-parallel coils 300U4, 300V4, 300W4, respectively.

A power connection terminal 310 for supplying power may be connected to each of the plurality of phase coils 300.

The power connection terminal 310 for supplying power may be provided on one side of the stator core 100.

The plurality of phase coils 300 may be spaced apart from one another at predetermined gaps (distances) along the circumferential direction of the stator core 100.

The plurality of phase coils 300 may include a U-phase coil 300U, a V-phase coil 300V, and a W-phase coil 300W.

Referring to FIG. 8, the U-phase coil 300U, the V-phase coil 300V, and the W-phase coil 300W may be spaced apart from one another in a counterclockwise direction of the stator core 100.

For reference, the U-phase coil 300U, the V-phase coil 300V, and the W-phase coil 300W may be spaced apart from one another in the clockwise direction of the stator core 100 based on FIG. 1.

The phase-parallel coils of the plurality of phase coils 300, for example, may be spaced apart from one another at predetermined distances along the circumferential direction of the stator core 100.

Referring to FIG. 8, the power connection terminal 310 may include, for example, a plurality of phase coil connection terminals 320 connected to the respective phase coils 300, and a support member 330 supporting the phase coil connection terminals 320.

The plurality of phase coil connection terminals 320 may include a U-phase coil connection terminal 320U, a V-phase coil connection terminal 320V, and a W-phase coil connection terminal 320W.

The U-phase coil connection terminal 320U may include a first U-phase-parallel coil connection terminal 320U1, a second U-phase-parallel coil connection terminal 320U2, a third U-phase-parallel coil connection terminal 320U3, and a fourth U-phase-parallel coil connection terminal 320U4, which are disposed in parallel to one another with being spaced apart along the circumferential direction.

The V-phase coil connection terminal 320V may include a first V-phase-parallel coil connection terminal 320V1, a second V-phase-parallel coil connection terminal 320V2, a third V-phase-parallel coil connection terminal 320V3, and a fourth V-phase-parallel coil connection terminal 320V4, which are disposed in parallel to one another with being spaced apart along the circumferential direction.

The W-phase coil connection terminal 320W may include a first W-phase-parallel coil connection terminal 320W1, a second W-phase-parallel coil connection terminal 320W2, a third W-phase-parallel coil connection terminal 320W3, and a fourth W-phase-parallel coil connection terminal 320W4, which are disposed in parallel to one another with being spaced apart along the circumferential direction.

The support member 330 of the power connection terminal 310 may include a first support member 330a and a second support member 330b which are separately formed to partially accommodate the plurality of phase coil connection terminals 320 in a spaced manner along a transverse direction.

The first support member 330a and the second support member 330b, for example, may be formed separately as upper and lower members, which are to be coupled to each other in a contact manner and integrally fixed by coupling members 340.

The plurality of coupling members 340 may be coupled such that the first support member 330a and the second support member 330b are pressed in a direction of being brought into close contact with each other after the plurality of phase coil connection terminals 320 is inserted between the support members 330.

The last conductor of each phase coil 300 may be connected to a neutral wire 350.

Referring back to FIG. 9, the neutral wire 350 may be formed of an electric conductor such that a current can flow. The neutral wire 350 may include a body 360 in an arcuate shape, and a plurality of phase coil connection portions 370 connected to the body 360. The body 360 may extend along the circumferential direction of the stator core 100. The plurality of phase coil connection portions 370 may be spaced apart from one another at a preset gap (e.g., 8-slot pitch).

The plurality of phase coil connection portions 370 may include first to fourth phase-parallel coil connection portions 370U1, 370U2, 370U3, 370U4, 370V1, 370V2, 370V3, 370V4, 370W1, 370W2, 370W3, 370W4, to which the first to fourth phase-parallel coils 300U1, 300U2, 300U3, 300U4, 300V1, 300V2, 300V3, 300V4, 300W1, 300W2, 300W3, 300W4 are connected in parallel, respectively.

Of the first to fourth phase-parallel coil connection portions 370U1, 370U2, 370U3, 370U4, 370V1, 370V2, 370V3, 370V4, 370W1, 370W2, 370W3, 370W4, the coil connection portions of the same phase may be spaced apart from one another by a 1-slot pitch, and the coil connection portions of different phases may be spaced apart from one another by a 4-slot pitch.

Figure 10:
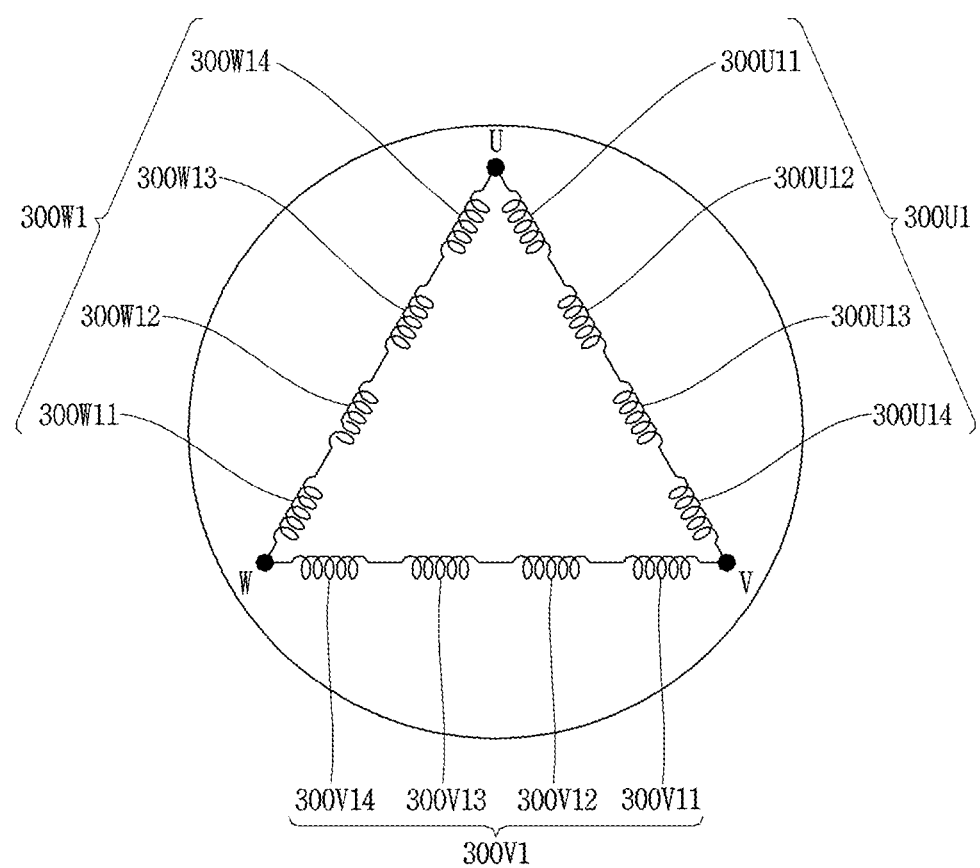
FIG. 10 is a view illustrating a connection relationship of a stator coil of FIG. 1.
Figure 11:
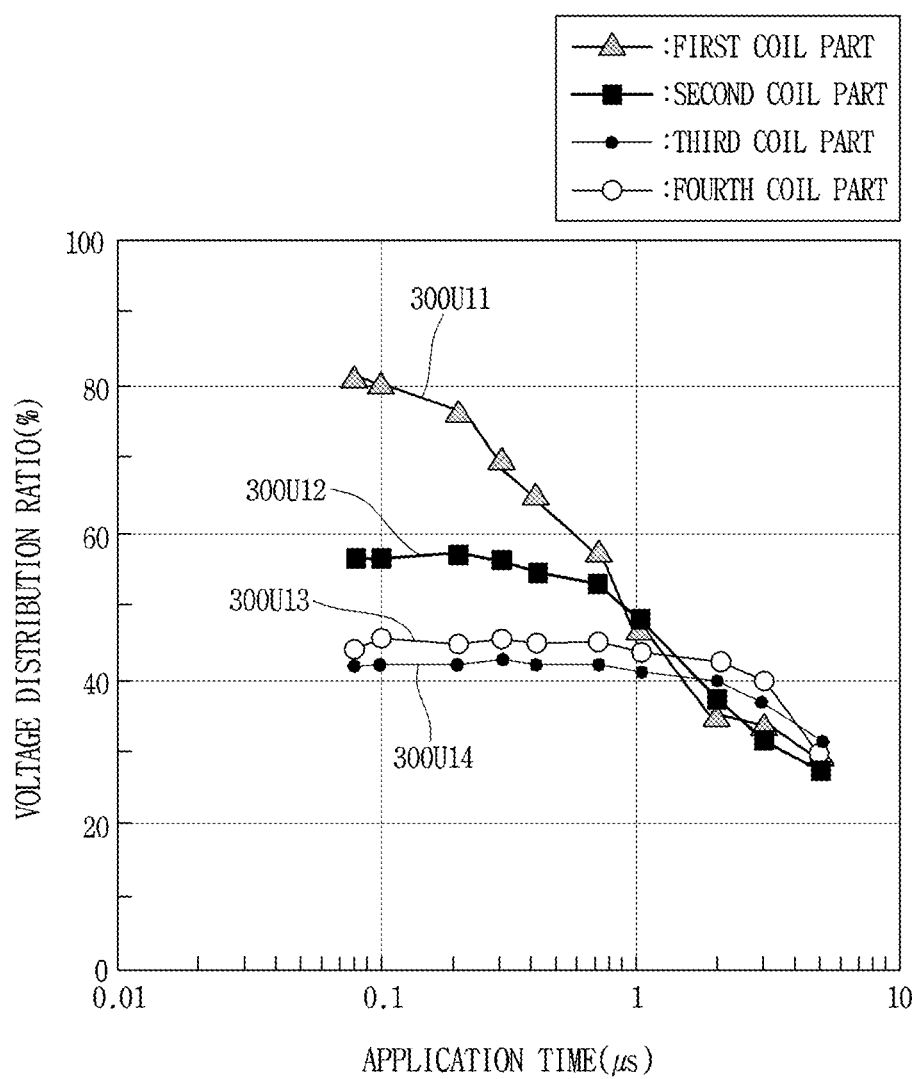
FIG. 11 is a view illustrating a voltage distribution ratio of each coil part of FIG. 10.

FIG. 10 is a view illustrating a connection relationship of the stator coil of FIG. 1 and FIG. 11 is a view illustrating a voltage distribution ratio of each coil part of FIG. 10. As illustrated in FIG. 10, the U-phase coil 300U, the V-phase coil 300V, and the W-phase coil 300W of the stator coil 200, for example, may be connected through a so-called triangular connection or delta connection.

The stator coil 200, for example, may be started by a delta connection, and may be operated by a wye connection.

Each of the U-phase coil 300U, the V-phase coil 300V, and the W-phase coil 300W of the stator coil 200 may include a plurality of coil parts connected in series with one another.

In this implementation, each of the U-phase coil 300U, the V-phase coil 300V, and the W-phase coil 300W is provided with the first to fourth phase-parallel coils, but for the sake of explanation, FIG. 10 merely illustrates only one coil (the first U-phase coil 300U1, the first V-phase coil 300V1, and the first W-phase coil 300W1.

Each of the first U-phase coil 300U1, the first V-phase coil 300V1, and the first W-phase coil 300W1 may include first to fourth coil parts (e.g., 300U11, 300U12, 300U13, 300U14; 300V11, 300V12, 300V13, 300V14; 300W11, 300W12, 300W13, 300W14).

Here, power sources for phase (U-phase, V-phase, W-phase) may be connected to the first coil parts (e.g., 300U11, 300V11, 300W11) of the first U-phase coil 300U1, the first V-phase coil 300V1, and the first W-phase coil 300W1, respectively.

As illustrated in FIG. 11, when power is applied to the stator coil 200, the first coil part 300U11, which is closest to the power source, of the first to fourth coil parts 300U11 to 300U14, may have the highest voltage distribution ratio, and the second coil part 300U12 connected to the first coil part 300U11 may have the next highest voltage distribution ratio. The third coil part 300U13 and the fourth coil part 300U14 relatively far from the power source may have relatively low voltage distribution ratios.

The voltage distribution ratio of the first coil part 300U11 may be, for example, 60% or higher, and the voltage distribution ratio of the second coil part 300U12 may be higher than or equal to 50% and less than 60%. The third coil part 300U13 and the fourth coil part 300U14 may have voltage distribution ratios which are higher than or equal to 40% and less than 50%, for example.

Among the plurality of hairpins 210 of the first coil part 300U11, a hairpin 210 directly connected to the power source may have the highest voltage distribution ratio.

In this implementation, the power source (power connection terminal 310) may be connected to the outermost hairpin 210O of each phase coil (U-phase coil, V-phase coil, W-phase coil).

The plurality of hairpins 210 according to the present disclosure may be configured to be spaced apart from one another with different partial discharge suppression distances D according to the voltage distribution ratios.

The partial discharge suppression distance D may include a first partial discharge suppression distance D1 (see FIGS. 14 and 16) set between the outermost hairpin 210O and a conductor, and a second partial discharge suppression distance D2 (see FIGS. 24 and 29) set between hairpins (e.g., middle hairpin 210M and the innermost hairpin 210I) disposed at the inner side of the outermost hairpin 210O and a conductor.

Here, the first partial discharge suppression distance D1 may be set to, for example, 1.2 mm or longer.

Accordingly, even when power of a high voltage (800V or higher) is applied to the outermost hairpins 210 having a relatively high probability of an occurrence of partial discharge, the probability of the occurrence of the partial discharge at the outermost hairpins 210O can be remarkably reduced.

The second partial discharge suppression distance D2 may be set to 0.2 mm or longer, for example.

Accordingly, the partial discharge suppression distance of the hairpins 210 (the middle hairpin 210M, the innermost hairpin 210I) having a relatively low probability of an occurrence of partial discharge may preferably be maintained to be relatively short, in view of reducing an occupied space of the crown parts 250 of the hairpin 210 when installing the hairpin 210.

Here, when the occupied space of the crown parts 250 of the hairpin 210 is increased, the probability of partial discharge between conductors may be reduced but it may be difficult to secure an insulating distance between the crown part 250 of the hairpin 210 and other adjacent conductors (e.g., a case of an electric motor). In consideration of this, since the size of the case of the electric motor according to the implementation and the outer diameter (outer width) of the stator core 100 must be increased, it may not be preferable.

Hereinafter, the plurality of hairpins 210 of the stator for the electric motor in accordance with the one implementation of the present disclosure will be described with reference to FIGS. 12 to 33.

Figure 12:
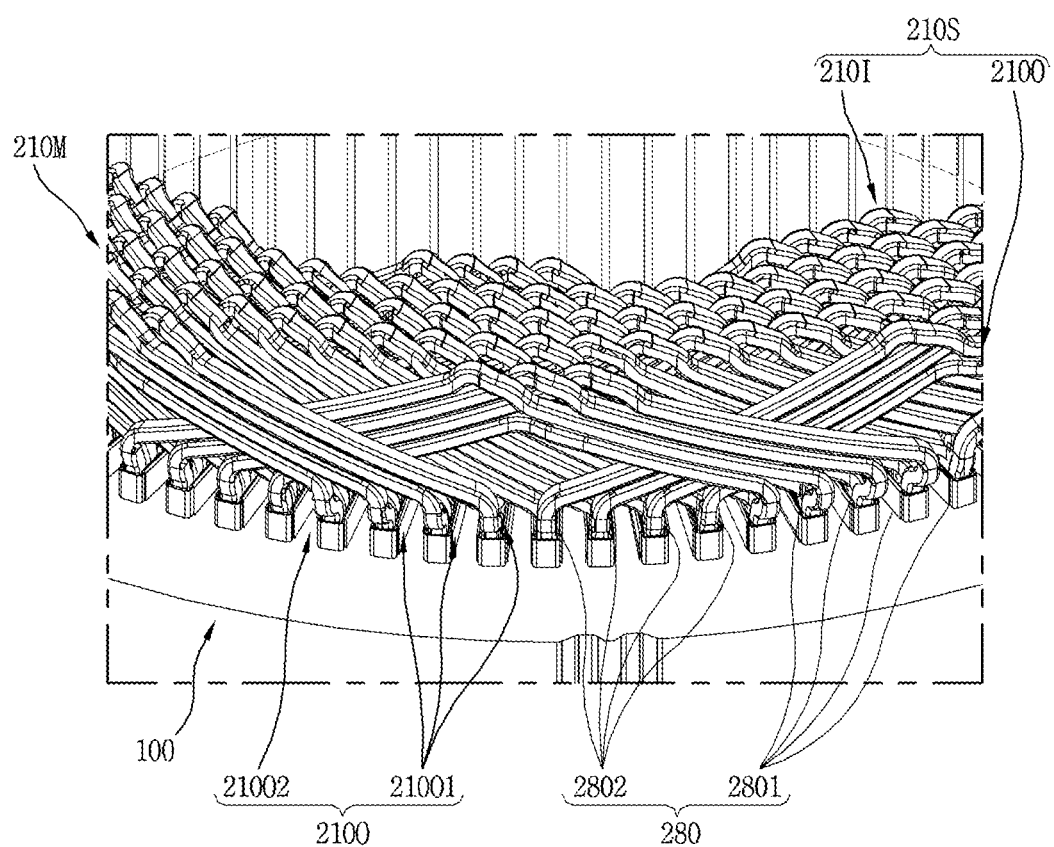
FIG. 12 is an enlarged view of a main part of outermost hairpins of FIG. 1.

FIG. 12 is an enlarged view of a main part of an outermost hairpin of FIG. 1. As illustrated in FIG. 12, the outermost hairpin 210O, for example, may include two insertion parts 230 disposed in outermost layers of the slots 120 spaced apart from each other, and a crown part 250 connecting the two insertion parts 230.

The outermost hairpin 210O may include two radially-bent parts 280 that are bent from the two insertion parts 230 in the radial direction, respectively.

Accordingly, an occupied space of the crown parts 250 of the outermost hairpin 210O may expand along the radial direction, compared to the cross-sectional area of the plurality of slots 120.

According to this configuration, partial discharge which may occur between hairpins 210 when the hairpins 210 and the stator core 100 are coupled to each other can be suppressed even without use of a separate support member for supporting the hairpins 210 in a spaced manner.

Also, when the outermost hairpins 210O are coupled, interference between different outermost hairpins 210O can be suppressed, which may facilitate assembling of the outermost hairpins 210O.

In addition, the crown part 250 of the outermost hairpin 210O can be spaced outwardly from the inner middle hairpin 210M, thereby improving insulation performance.

On the other hand, the outermost hairpins 210O may include, for example, a first outermost hairpin 210O1 and a second outermost hairpin 210O2 each having a different gap between the first insertion part 230I and the second insertion part 230II.

The first outermost hairpin 210O1 may have the two insertion parts 230 spaced apart from each other by a 13-slot pitch.

The second outermost hairpin 210O2 may have the two insertion parts 230 spaced apart from each other by a 9-slot pitch.

Figure 13:
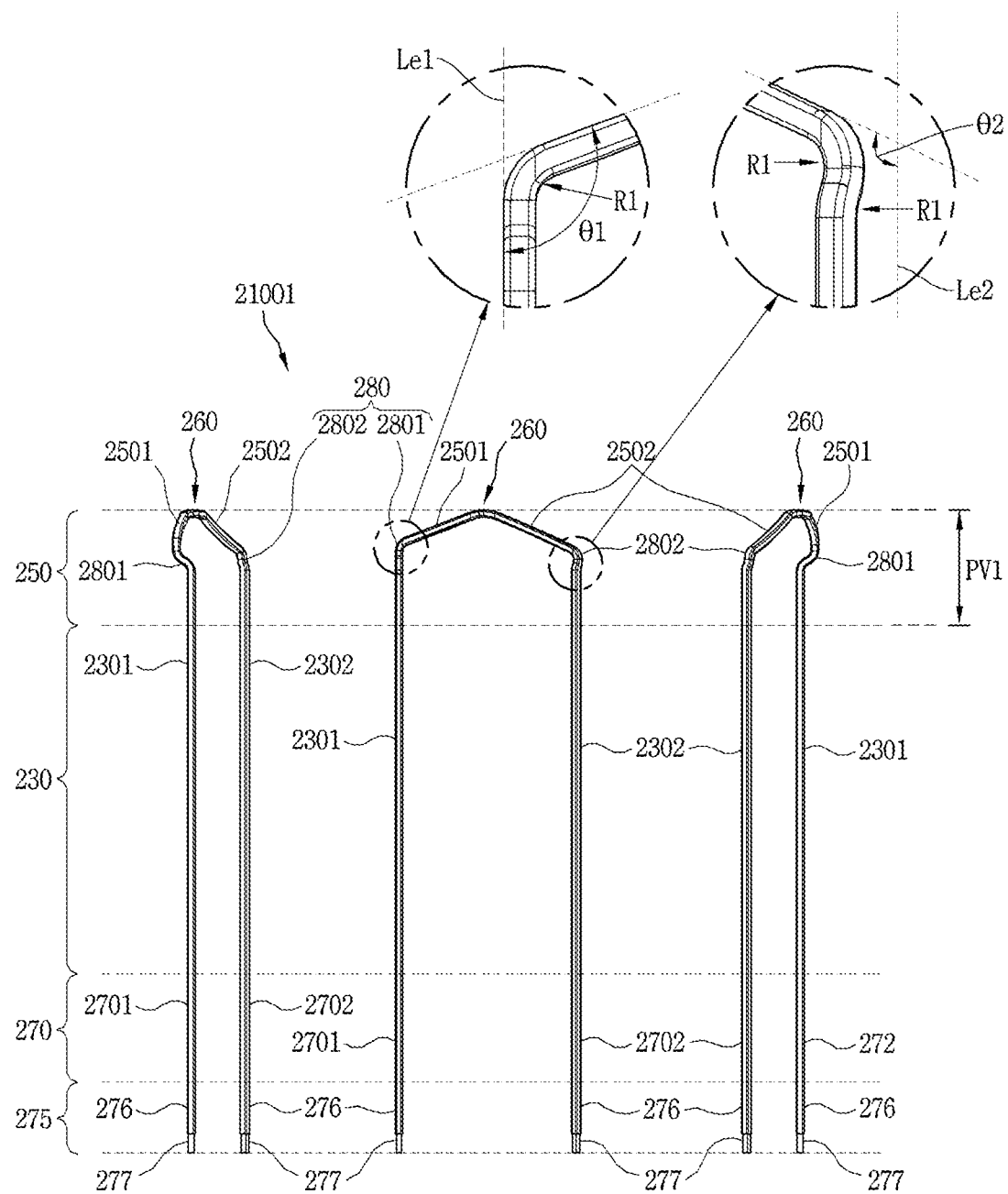
FIG. 13 is a perspective view before coupling a first outermost hairpin of FIG. 12.
Figure 14:
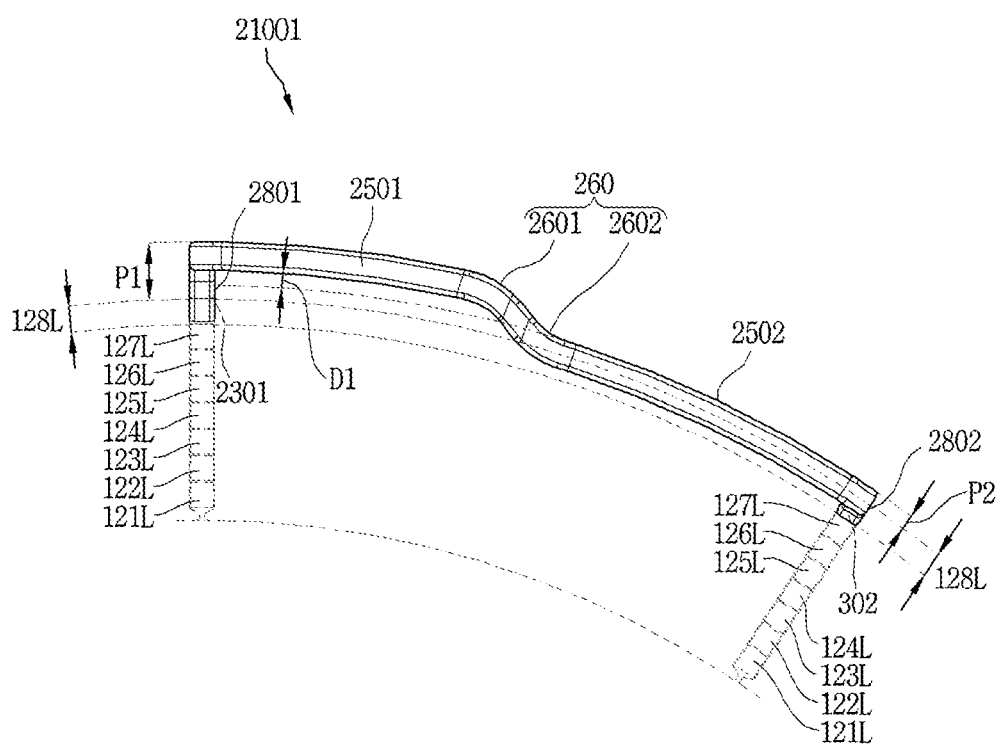
FIG. 14 is a planar view of FIG. 13.

FIG. 13 is a perspective view before coupling the first outermost hairpin of FIG. 12 and FIG. 14 is a planar view of FIG. 13. As illustrated in FIG. 13, the first outermost hairpin 210O1 may include two radially-bent parts 280.

More specifically, the first outermost hairpin 210O1 may include, for example, a first insertion part 230I inserted into one slot 120 at one side along the circumferential direction of the stator core 100, a second insertion part 230II inserted into another slot 120 spaced apart from the first insertion part 230I, a first radially-bent part 280I bent in the radial direction from the first insertion part 230I, and a second radially-bent part 280II bent in the radial direction from the two insertion part 230II.

Here, the first radially-bent part 280I and the second radially-bent part 280II may be configured to have a minimum radius of curvature R1, respectively.

In this implementation, the minimum radius of curvature R1 of the first radially-bent part 280I and the second radially-bent part 280II may be, for example, 2.0 mm or greater.

Accordingly, stress which is caused when manufacturing the first radially-bent part 280I and the second radially-bent part 280II of the first outermost hairpin 210O1 can be suppressed, and the probability of an occurrence of partial discharge due to the stress can be significantly reduced.

In the first outermost hairpin 210O1, for example, the first insertion part 230I and the second insertion part 230II may be spaced apart by a 13-slot pitch.

More specifically, when the first insertion part 230I of the first outermost hairpin 210O1 is inserted into the eighth layer 128L of the first slot, the second insertion part 230II may be inserted into the eighth layer 128L of the fourteenth slot.

The first outermost hairpin 210O1 may include the crown part 250 connecting the two insertion parts 230.

The crown part 250 may include a first crown part 250I connected to the first radially-bent part 280I and a second crown part 250II connected to the second radially-bent part 280II.

The first crown part 250I may be configured to have a minimum interior angle θ1 with respect to a first extension line Le1 which is parallel to the first insertion part 230I.

In addition, the second crown part 250II may be configured to have the minimum interior angle θ1 with respect to a second extension line Le2 which is parallel to the second insertion part 230II.

Here, the minimum interior angle θ1 between the first crown part 2501 and the first extension line Le1 may be 110 degrees or greater.

Accordingly, stress which is caused when manufacturing the first radially-bent part 2801 and the second radially-bent part 2802 of the first outermost hairpin 210O1 can be suppressed, and the probability of an occurrence of partial discharge due to the stress can be significantly reduced.

With the configuration, the first crown part 2501 and the second crown part 2501 may be spaced outwardly apart from the first insertion part 2301 and the second insertion part 2302 along the radial direction of the stator core 100.

The first outermost hairpin 210O1 may protrude from an end portion of the stator core 100 by a first protrusion length Pv1 along an axial direction when coupled to the stator core 100.

The first outermost hairpin 210O1 may include extension parts 270 extending from the insertion parts 230, respectively.

The extension parts 270 may be provided with connection end portions 275, respectively.

As illustrated in FIG. 14, the crown part 250 of the first outermost hairpin 210O1 may include a first crown part 2501 and a second crown part 2502 spaced apart from each other along the radial direction of the stator core 100.

With the configuration, interference between two conductors can be suppressed when different first outermost hairpins 210O1 are coupled to each other.

The first radially-bent part 2801 may protrude outward from the first insertion part 2301 along the radial direction of the stator core 100.

The first radially-bent part 2801 may be connected to the first crown part 2501.

The second radially-bent part 2802 may protrude outward from the second insertion part 2302 along the radial direction of the stator core 100.

In this implementation, the first radially-bent part 2801 and the second radially-bent part 2802 may be configured to have different protrusion lengths from each other.

With the configuration, a spaced distance between the first crown part 2501 and the second crown part 2502 of the different first outermost hairpins 210O1 can be adjusted.

The first crown part 2501 and the second crown part 2502 may be spaced apart from each other by the first partial discharge suppression distance D1.

According to this configuration, a current-carrying capacity of the first outermost hairpin 210O1 can be increased, and the occurrence of partial discharge between the first crown part 2501 and the second crown part 2502 can be suppressed.

The first radially-bent part 2801 may protrude from the first insertion part 2301 by the first protrusion length P1 along the radial direction of the stator core 100.

The second radially-bent part 2802 may protrude from the second insertion part 2302 by the second protrusion length P2 along the radial direction of the stator core 100.

Accordingly, a spaced distance between the second crown part 2502 and the middle hairpin 210M disposed at the inner side of the first outermost hairpin 210O1 can increase.

Here, the first protrusion length P1 may be set to be greater than or equal to a value obtained by adding the first partial discharge suppression distance D1 to the second protrusion length P2 (P1=P2+D1).

With the configuration, an occurrence of partial discharge between the first crown part 2501 and the second crown part 2502 of the different first outermost hairpins 210O1 can be remarkably reduced.

In addition, interference between conductors of the different first outermost hairpins 210O1 can be suppressed, thereby facilitating assembling of the hairpins.

The first outermost hairpin 210O1 may include a connection part 260 connecting the first crown part 2501 and the second crown part 2502.

The connection part 260 of the first outermost hairpin 210O1 may include a first connection part 2601 connected to the first crown part 2501 and a second connection part 2602 connected to the second crown part 2502.

The first connection part 2601 of the first outermost hairpin 210O1 may be bent inward along the radial direction.

The second connection part 2602 of the first outermost hairpin 210O1 may be bent outward along the radial direction to be connected to the first connection part 2601.

Figure 15:
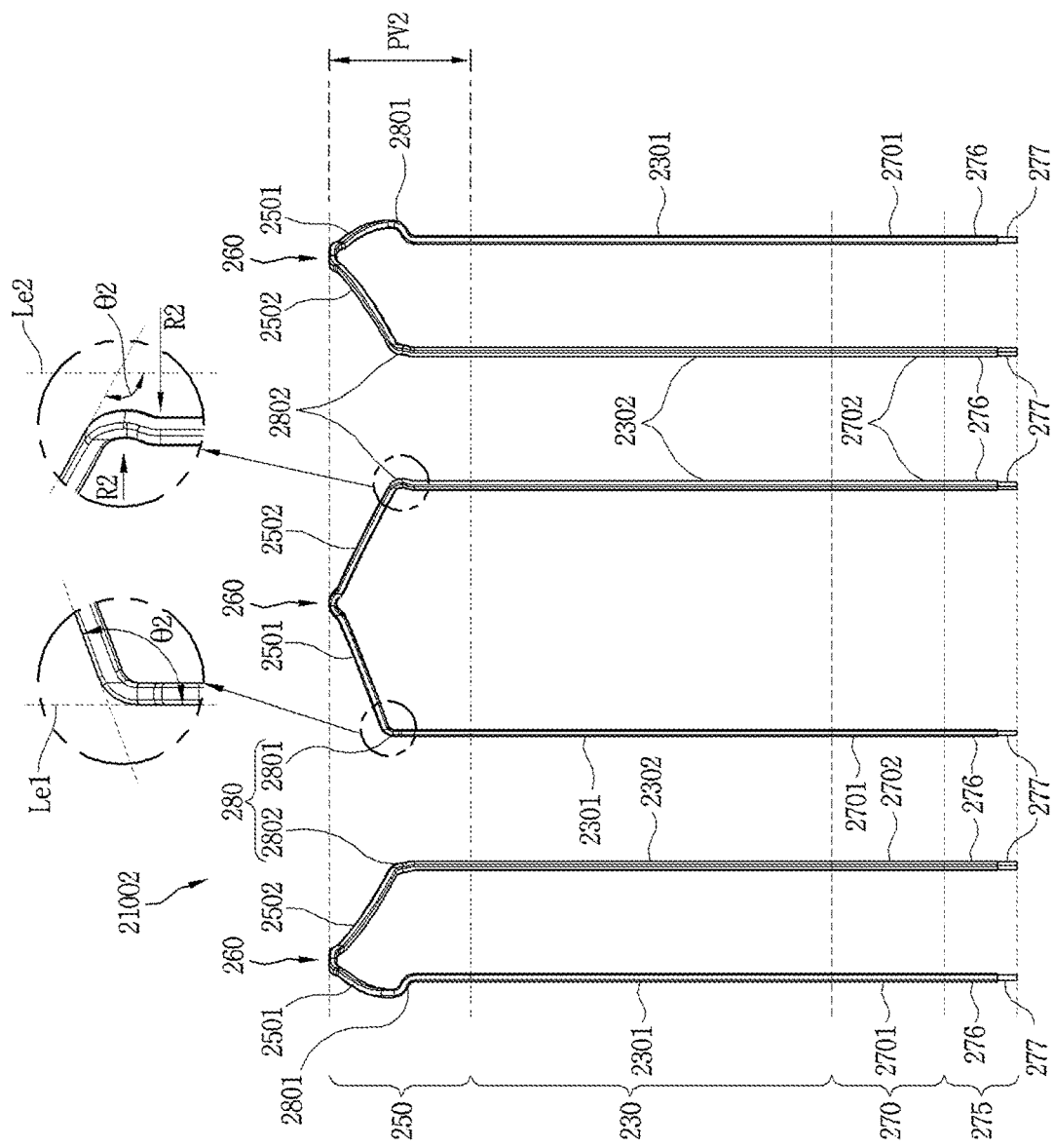
FIG. 15 is a perspective view before coupling a second outermost hairpin of FIG. 12.
Figure 16:
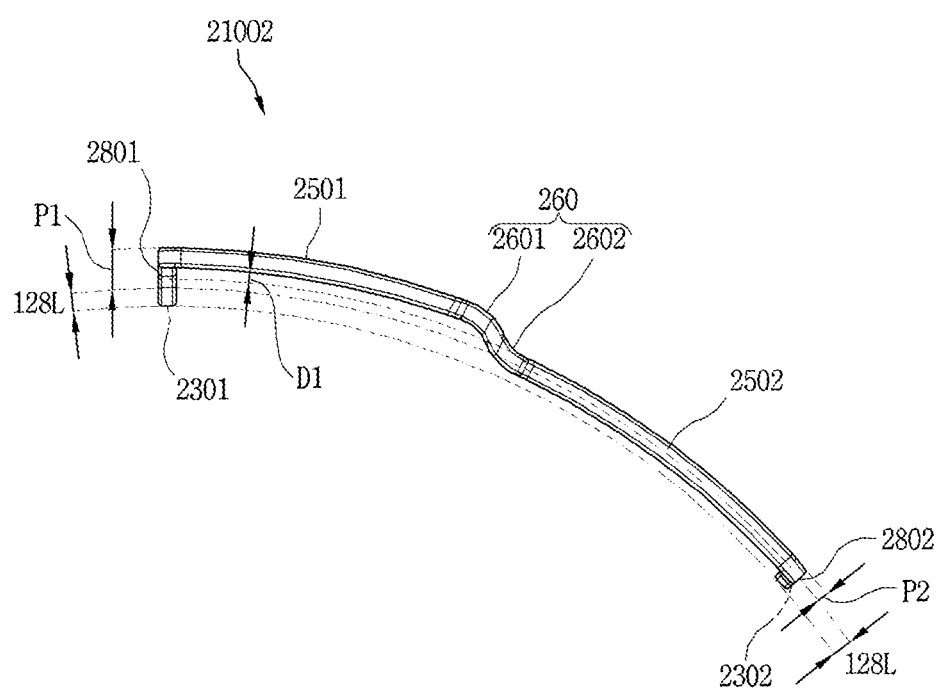
FIG. 16 is a planar view of FIG. 15.

FIG. 15 is a perspective view before coupling the second outermost hairpin of FIG. 12 and FIG. 16 is a planar view of FIG. 15. As illustrated in FIG. 15, the second outermost hairpin 210O2 may include two radially-bent parts 280.

More specifically, the second outermost hairpin 210O2 may include, for example, a first insertion part 2301 inserted into a slot 120 at one side along the circumferential direction of the stator core 100, a second insertion part 2302 inserted into another slot 120 spaced apart from the first insertion part 2301, a first radially-bent part 2801 bent in the radial direction from the first insertion part 2301, and a second radially-bent part 2802 bent in the radial direction from the second insertion part 2302.

Here, the first radially-bent part 2801 and the second radially-bent part 2802 may be configured to have a minimum radius of curvature R1, respectively.

In this implementation, the minimum radius of curvature R1 of the first radially-bent part 2801 and the second radially-bent part 2802 may be, for example, 2.0 mm or greater.

Accordingly, stress which is caused when manufacturing the first radially-bent part 2801 and the second radially-bent part 2802 of the second outermost hairpin 210O2 can be suppressed, and the probability of an occurrence of partial discharge due to the stress can be significantly reduced.

In the second outermost hairpin 210O2, for example, the first insertion part 2301 and the second insertion part 2302 may be spaced apart by a 9-slot pitch.

More specifically, when the first insertion part 2301 of the second outermost hairpin 210O2 is inserted into the eighth layer 128L of the fourth slot, the second insertion part 2302 may be inserted into the eighth layer 128L of the thirteenth slot.

The second outermost hairpin 210O2 may include extension parts 270 extending from the two insertion parts 230, respectively.

The extension parts 270 of the second outermost hairpin 210O2 may be provided with connection end portions 275, respectively.

The second outermost hairpin 210O2 may include the crown part 250 connecting the two insertion parts 230.

The crown part 250 may include a first crown part 2501 connected to the first radially-bent part 2801 and a second crown part 2502 connected to the second radially-bent part 2802.

The first crown part 2501 of the second outermost hairpin 210O2 may be configured to have a minimum interior angle θ2 with respect to the first extension line Le1 which is parallel to the first insertion part 2301.

The first crown part 2501 of the second outermost hairpin 210O2 may be formed in parallel with the first crown part 2501 of the first outermost hairpin 210O1.

In addition, the second crown part 2502 of the second outermost hairpin 210O2 may be configured to have the minimum interior angle θ2 with respect to the second extension line Le2 which is parallel to the second insertion part 2302.

The second crown part 2502 of the second outermost hairpin 210O2 may be formed in parallel with the second crown part 2502 of the first outermost hairpin 210O1.

Here, the minimum interior angle θ2 of the second outermost hairpin 210O2, like the minimum interior angle θ1 of the first outermost hairpin 210O1, may be equal to or greater than 110 degrees.

Accordingly, stress which is caused when manufacturing the first radially-bent part 2801 and the second radially-bent part 2802 of the second outermost hairpin 210O2 can be suppressed, and the probability of an occurrence of partial discharge due to the stress can be significantly reduced.

With the configuration, the first crown part 2501 and the second crown part 2501 may be spaced outwardly apart from the first insertion part 2301 and the second insertion part 2302 along the radial direction of the stator core 100.

The second outermost hairpin 210O2 may protrude from an end portion of the stator core 100 by a second protrusion length Pv2 along the axial direction when coupled to the stator core 100.

The second protrusion length Pv2 may be set to be shorter than the first protrusion length Pv1 of the first outermost hairpin 210O2.

The second outermost hairpin 210O2 may have a length which is long enough for the crown part 250 to be disposed at an inner side (lower side) of the first outermost hairpin 210O1.

As illustrated in FIG. 16, the crown part 250 of the second outermost hairpin 210O2 may include a first crown part 2501 and a second crown part 2502 spaced apart from each other along the radial direction of the stator core 100.

With the configuration, interference between two conductors can be suppressed when different first outermost hairpins 210O1 are coupled to each other.

The first radially-bent part 2801 may protrude outward from the first insertion part 2301 along the radial direction of the stator core 100.

The first radially-bent part 2801 may be connected to the first crown part 2501.

The second radially-bent part 2802 may protrude outward from the second insertion part 2302 along the radial direction of the stator core 100.

In this implementation, the first radially-bent part 2801 and the second radially-bent part 2802 may be configured to have different protrusion lengths from each other.

With the configuration, a spaced distance between the first crown part 2501 and the second crown part 2502 of the different second outermost hairpins 210O2 can be adjusted.

The first crown part 2501 and the second crown part 2502 may be spaced apart from each other by the first partial discharge suppression distance D1.

According to this configuration, an occurrence of partial discharge between the first crown part 2501 and the second crown part 2502 can be suppressed.

In addition, since the first crown part 2501 and the second crown part 2502 are spaced apart from each other by the first partial discharge suppression distance D1, a current-carrying capacity of the second outermost hairpin 210O2 can increase.

The first radially-bent part 2801 may protrude from the first insertion part 2301 by the first protrusion length P1 along the radial direction of the stator core 100.

The second radially-bent part 2802 may protrude from the second insertion part 2302 by the second protrusion length P2 along the radial direction of the stator core 100.

Accordingly, a spaced distance between the second crown part 2502 and the middle hairpin 210M disposed at the inner side of the first outermost hairpin 210O1 can increase.

Here, the first protrusion length P1 may be set to be greater than or equal to a value obtained by adding the first partial discharge suppression distance D1 to the second protrusion length P2 (P1=P2+D1).

This may result in remarkably reducing partial discharge between a cross point between the second outermost hairpin 210O2 and the first outermost hairpin 210O1 and a cross point between the second outermost hairpin 210O2 and another second outermost hairpin 210O2.

In addition, interference between conductors of the second outermost hairpin 210O2 and the first outermost hairpin 210O1 and between conductors of the second outermost hairpin 210O2 and another second outermost hairpin 210O2 can be suppressed, thereby facilitating assembling of the hairpins.

The second outermost hairpin 210O2 may include a connection part 260 connecting the first crown part 2501 and the second crown part 2502.

The connection part 260 of the second outermost hairpin 210O2 may include a first connection part 2601 connected to the first crown part 2501 and a second connection part 2602 connected to the second crown part 2502.

The first connection part 2601 of the second outermost hairpin 210O2 may be bent inward along the radial direction.

The second connection part 2602 of the second outermost hairpin 210O2 may be bent outward in the radial direction to be connected to the first connection part 2601.

Meanwhile, the second outermost hairpin 210O2 may be configured to have a relatively shorter protrusion length than the first outermost hairpin 210O1 along the axial direction.

The second outermost hairpin 210O2 may be disposed at an inner side of the adjacent first outermost hairpin 210O1.

More specifically, referring back to FIG. 12, the first insertion part 2301 and the first crown part 2501 of the second outermost hairpin 210O2 may be disposed at the inner side of the first insertion part 2301 and the first crown part 2501 of the first outermost hairpin 210O1 adjacent to the first insertion part 2301 of the second outermost hairpin 210O2, and the second insertion part 2302 and the second crown part 2502 of the second outermost hairpin 210O2 may be disposed at the inner side of the second insertion part 2302 and the second crown part 2502 of the first outermost hairpin 210O1 disposed adjacent to the second insertion part 2302 of the second outermost hairpin 210O2.

Hereinafter, the coupled state of the outermost hairpins will be described with reference to FIGS. 17 to 23.

Figure 17:
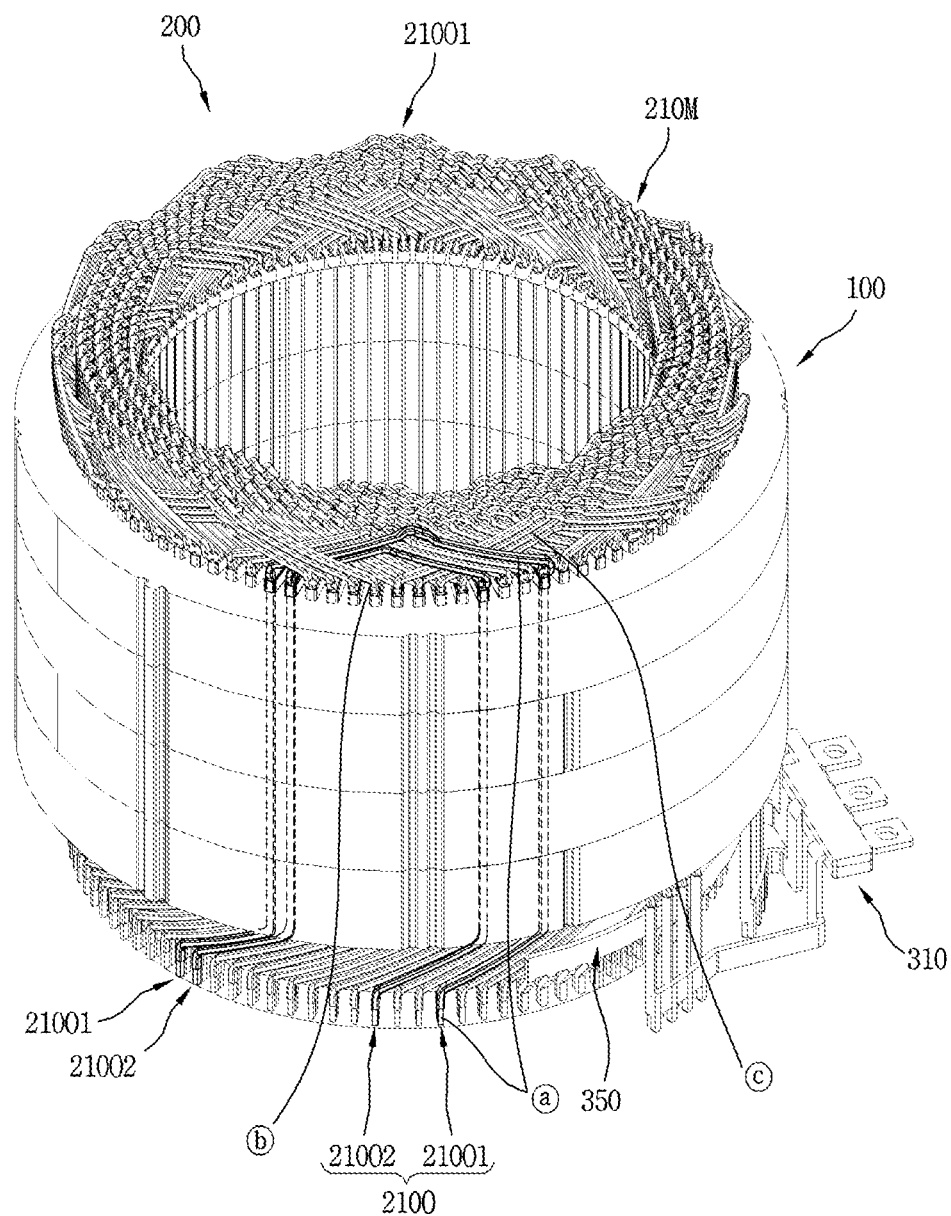
FIG. 17 is a perspective view illustrating a coupled state of the first outermost hairpins of FIG. 13.
Figure 18:
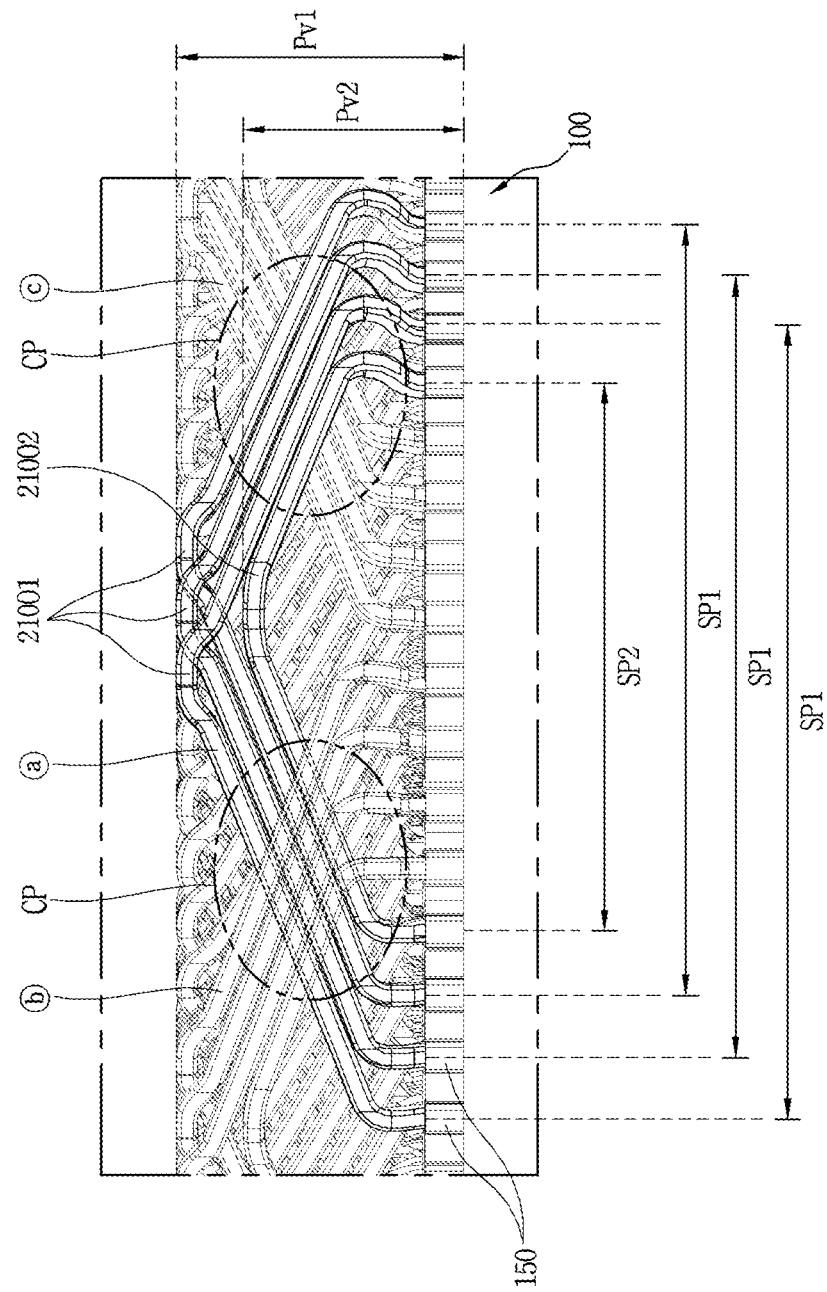
FIG. 18 is an enlarged view illustrating a main part of the first outermost hairpin and the second outermost hairpin of FIG. 2.

FIG. 17 is a perspective view illustrating a coupled state of the first outermost hairpins of FIG. 13 and FIG. 18 is an enlarged view illustrating a main part of the first outermost hairpin and the second outermost hairpin of FIG. 2. As illustrated in FIGS. 17 and 18, the first insertion part 2301 and the second insertion part 2302 of the first outermost hairpin 210O1 may be inserted into the eighth layers 128L of different slots 120 at one side (upper side in the drawing) of the stator core 100 along the axial direction.

In the first outermost hairpin 210O1, the two insertion parts 230 may be spaced apart by a 13-slot pitch, which is a first slot pitch SP1.

The second outermost hairpin 210O1 may be inserted at the inner side of the first outermost hairpin 210O2.

In the second outermost hairpin 210O2, the two insertion parts 230 may be spaced apart by a 9-slot pitch, which is a second slot pitch SP2.

The insertion parts 230 of each of the first outermost hairpin 210O1 and the second outermost hairpin 210O2 may protrude to another side (lower side in the drawing) of the stator core 100 along the axial direction.

The insertion parts 230 of each of the first outermost hairpin 210O1 and the second outermost hairpin 210O2 may be bent in a preset pattern to be disposed in a curved shape along the circumferential direction. More specifically, in this implementation, the extension parts 270 may be formed by bending the insertion parts 230 in a clockwise direction, respectively, and the connection end portions 275 may be formed by bending the end portions of the extension parts 270 in the axial direction, respectively.

On the other hand, the outermost hairpins 210O of each phase coil (U-phase coil, V-phase coil, W-phase coil) may be spaced apart from one another along the circumferential direction, and the crown parts ⓐ, ⓑ, ⓒ of the outermost hairpins 210O connected to different phases may be disposed in an intersecting manner.

Referring to FIG. 18, the first outermost hairpin 210O1 may protrude from the end portion of the stator core 100 by the first protrusion length Pv1 along the axial direction.

The second outermost hairpin 210O2 may protrude from the end portion of the stator core 100 by the second protrusion length Pv2 along the axial direction.

The first crown part 2501 of the first outermost hairpin 210O1 may be disposed at the outer side of the second crown portion 2502 in a spaced manner along the radial direction.

The first crown part 2501 of any one (e.g., ⓑ) of the outermost hairpins 210O connected to a first phase among the plurality of phases may be disposed outward by the first partial discharge suppression distance due to the first radially-bent portion 2801 along the radial direction of the stator core 100. The second crown part 2502 of another one (e.g., ⓐ) of the outermost hairpins 210O connected to a second phase may be disposed to intersect with the first crown part 2501 of the one hairpin (ⓑ) with being spaced inward by the first partial discharge suppression distance.

In addition, the first crown portion 2501 of the another one hairpin (ⓐ) of the outermost hairpins 2101 connected to the second phase may be disposed to intersect with the second crown part 2502 of still another one (e.g., ⓒ) of the outermost hairpins 210O connected to a third phase with being spaced outward by the first partial discharge suppression distance.

Figure 19:
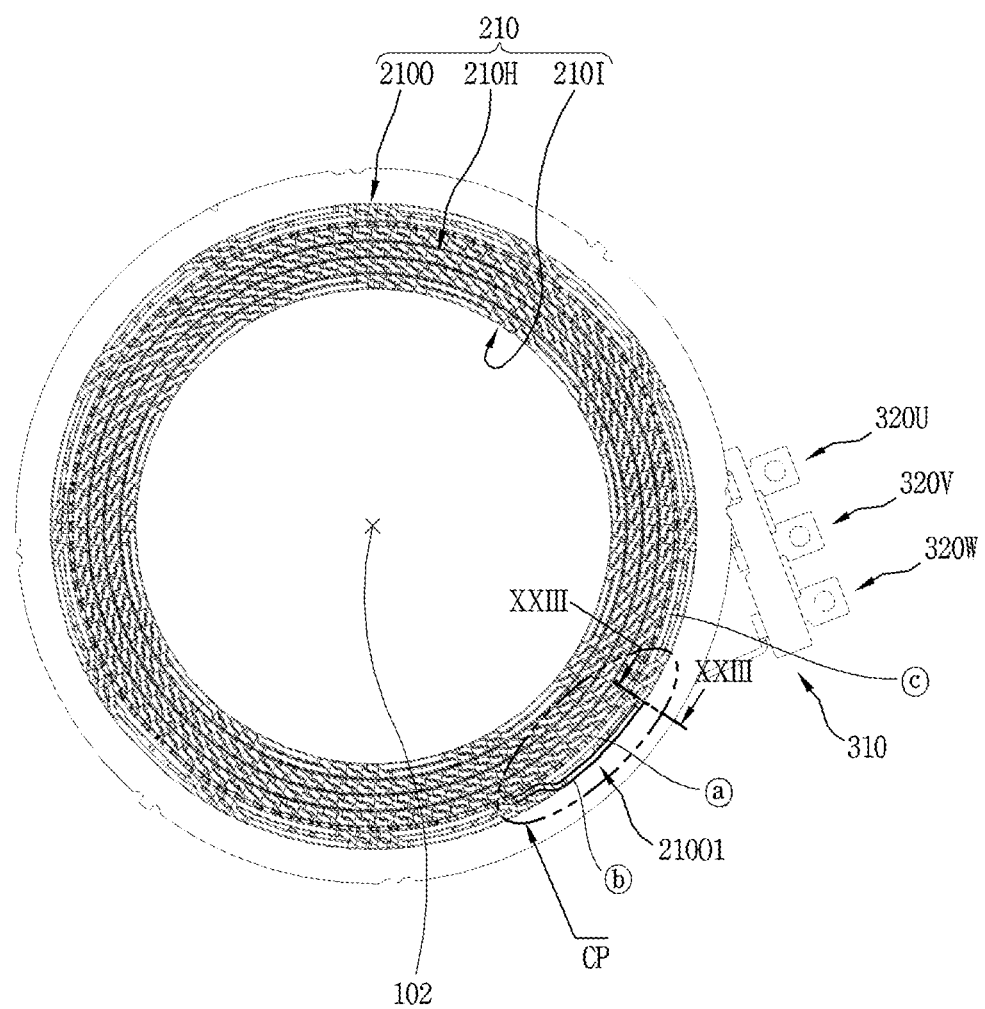
FIG. 19 is a planar view of FIG. 17.
Figure 20:
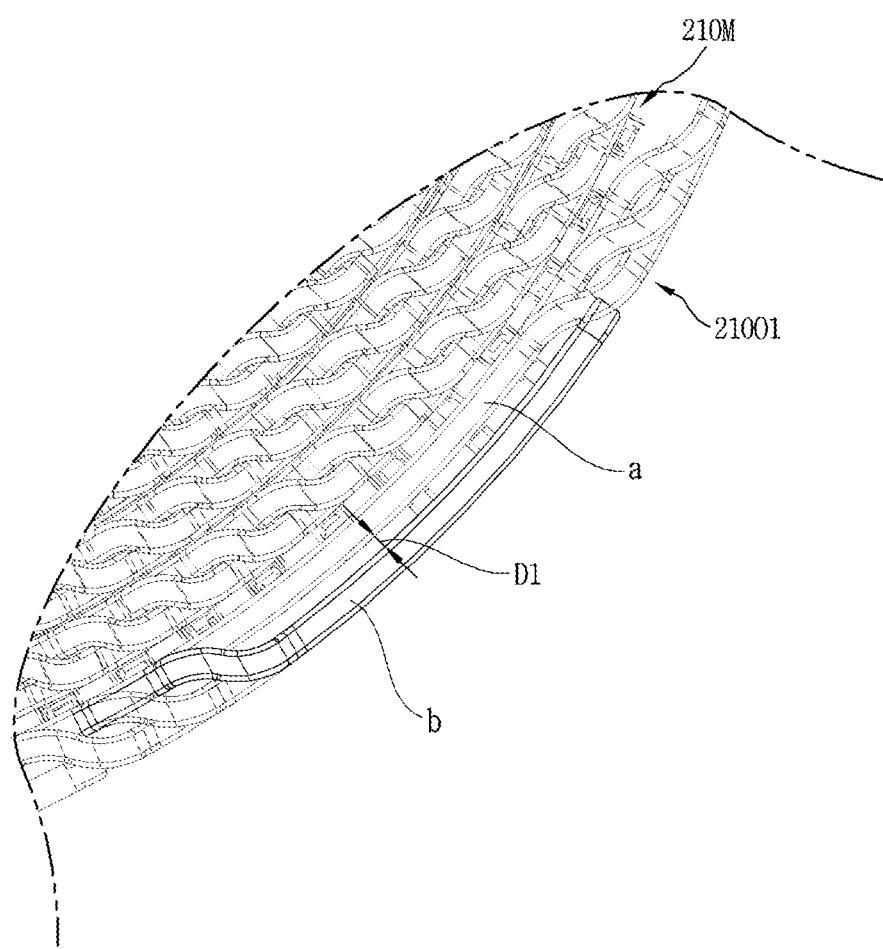
FIG. 20 is an enlarged view of a main part of FIG. 19.

FIG. 19 is a planar view of FIG. 17 and FIG. 20 is an enlarged view of a main part of FIG. 19. As illustrated in FIGS. 19 and 20, the first crown part 2501 of the one (ⓑ) of the outermost hairpins 210O connected to the one phase of the plurality of phases may be spaced apart by the first partial discharge suppression distance D1 from the second crown part 2502 of the another one (ⓐ), which intersects with the first crown part 2501, of the outermost hairpins 210L connected to the another phase.

Accordingly, even when power of a high voltage (800V) is applied to the stator coil 200, an occurrence of partial discharge between the one (ⓑ) of the outermost hairpins connected to the one phase and the another one (ⓐ) of the outermost hairpins 210O connected to the another phase can be suppressed.

In addition, an occurrence of partial discharge between the another one (ⓐ) of the outermost hairpins 210O connected to the another phase and the still another one (ⓒ) of the outermost hairpins 210O connected to the still another phase can be suppressed.

Figure 21:
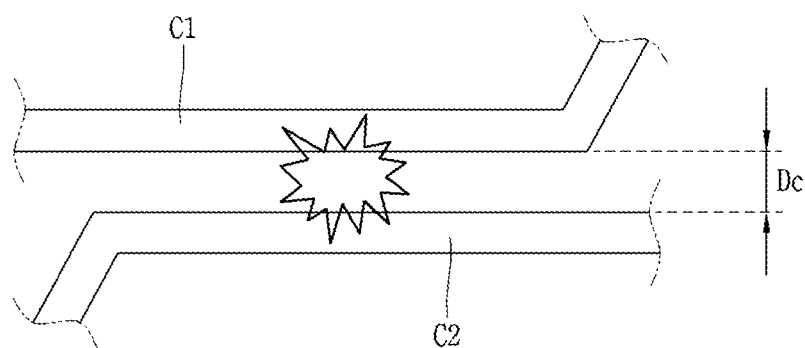
FIG. 21 is a diagram illustrating a spaced distance between the hairpins of FIG. 1.

FIG. 21 is a diagram illustrating one example of a method of checking an occurrence of partial discharge according to a spaced distance between the hairpins of FIG. 1. As illustrated in FIG. 21, an occurrence of partial discharge according to a spaced distance Dc between two adjacent conductors (hairpins) C1 and C2 may be confirmed by a so-called butt-test of varying a voltage difference between the conductors C1 and C2 which are spaced apart by the preset distance Dc.

Figure 22:
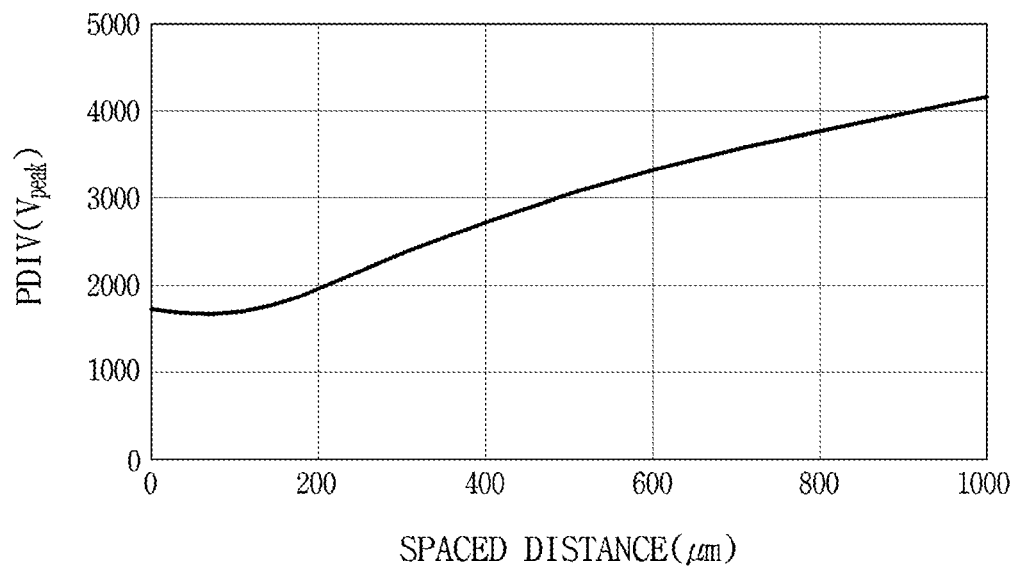
FIG. 22 is a view illustrating relation between the spaced distance of the hairpins of FIG. 21 and an occurrence of partial discharge.

FIG. 22 is a view illustrating the relation between the spaced distance between the hairpins of FIG. 21 and the occurrence of the partial discharge. As illustrated in FIG. 22, in case where a preset voltage is applied to each of the two adjacent conductors C1 and C2 by the butt-test, it can be seen that the partial discharge occurs when the distance between the two conductors C1 and C2 is 200 μm and a voltage peak value is 2000 V. It can be seen that a peak voltage to cause the partial discharge is 3000 V when the spaced distance Dc between the two conductors C1 and C2 is 500 μm. It can also be seen that a peak voltage to cause the partial discharge is 4000 V when the spaced distance Dc between the two conductors C1 and C2 is approximately 950 to 960 μm.

For reference, it can also be seen that a peak voltage to cause the partial discharge is about 4200 V when the spaced distance Dc between the two conductors C1 and C2 is 1000 μm.

In the stator for the electric motor according to the implementation, when a relatively high voltage of 800 V is applied, a peak voltage required to prevent the partial discharge between the two hairpins 210 may be 4160 V. Therefore, the spaced distance Dc between the two conductors (hairpins) may be set to approximately 1000 μm, for example.

The partial discharge suppression distance (the first partial discharge suppression distance D1) of the outermost hairpins 210O of the plurality of hairpins 210 provided in the stator for the electric motor according to the implementation may be set to, for example, 1.0 mm or farther.

Preferably, the first partial discharge suppression distance D1 of the outermost hairpins 210O provided in the stator for the electric motor according to the implementation may be set to 1.2 mm or farther in order to much more reduce (suppress) the probability of the occurrence of the partial discharge.

The first crown part 2501 of the first outermost hairpin 210O1 and the second crown part 2502 of the another first outermost hairpin 210O1, which are closest to each other and have the relatively high probability of the partial discharge at the cross point between them, may be spaced apart from each other by 1.2 mm or farther.

Figure 23:
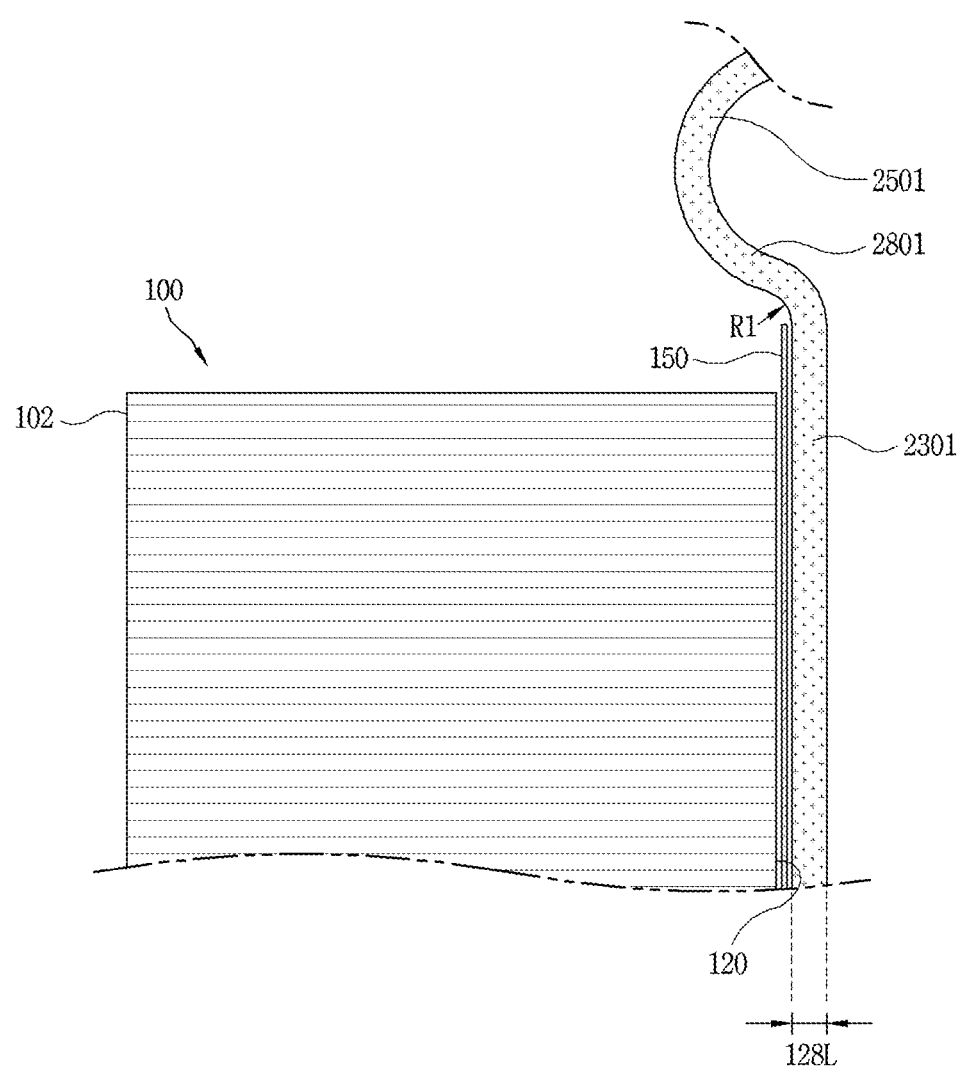
FIG. 23 is a sectional view illustrating a first radially-bent part region of FIG. 18.

FIG. 23 is a sectional view illustrating a first radially-bent part region of FIG. 18. As illustrated in FIG. 23, the insulating member 150 may be inserted into the slot of the stator core 100 to insulate between the plurality of hairpins 210 and the stator core 100. The insulating member 150 may protrude from the end portion of the stator core 100 by a preset length along the axial direction.

The first radially-bent part 2801 may be provided at an end portion of the first insertion part 2301 of the first outermost hairpin 210O1, in a manner of being bent outward in the radial direction. The first crown part 2501 may be connected to the first radially-bent part 2801.

The first radially-bent part 2801 may have a minimum radius of curvature R1.

Here, the minimum radius of curvature R1 may be set to 2 mm or greater.

The first radially-bent part 2801 may be formed by bending the first insertion part 2301 outwardly at a top point of the insulating member 150.

Hereinafter, each of the innermost hairpin and the middle hairpin will be described with reference to FIGS. 24 to 29.

Figure 24:
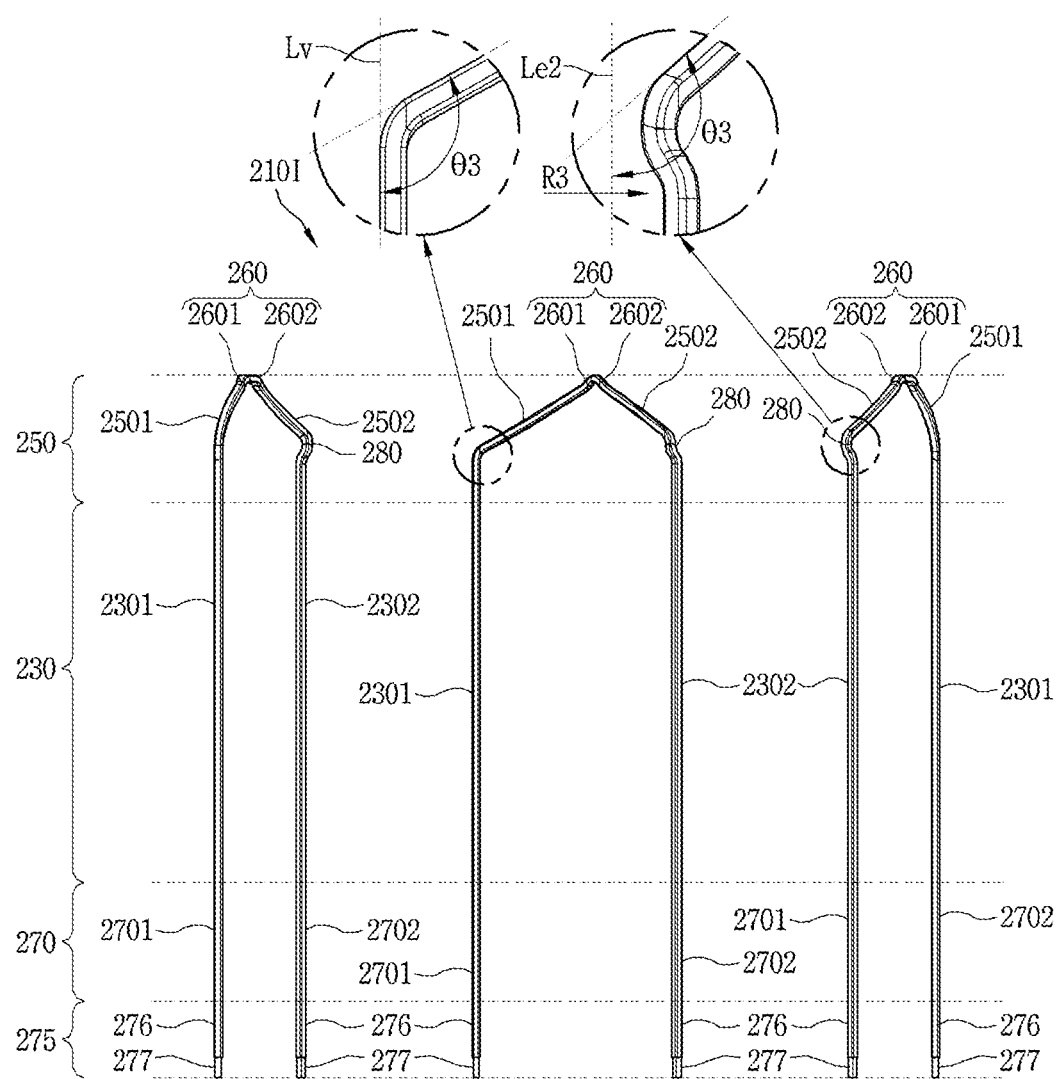
FIG. 24 is a perspective view before coupling an innermost hairpin of FIG. 1.
Figure 25:
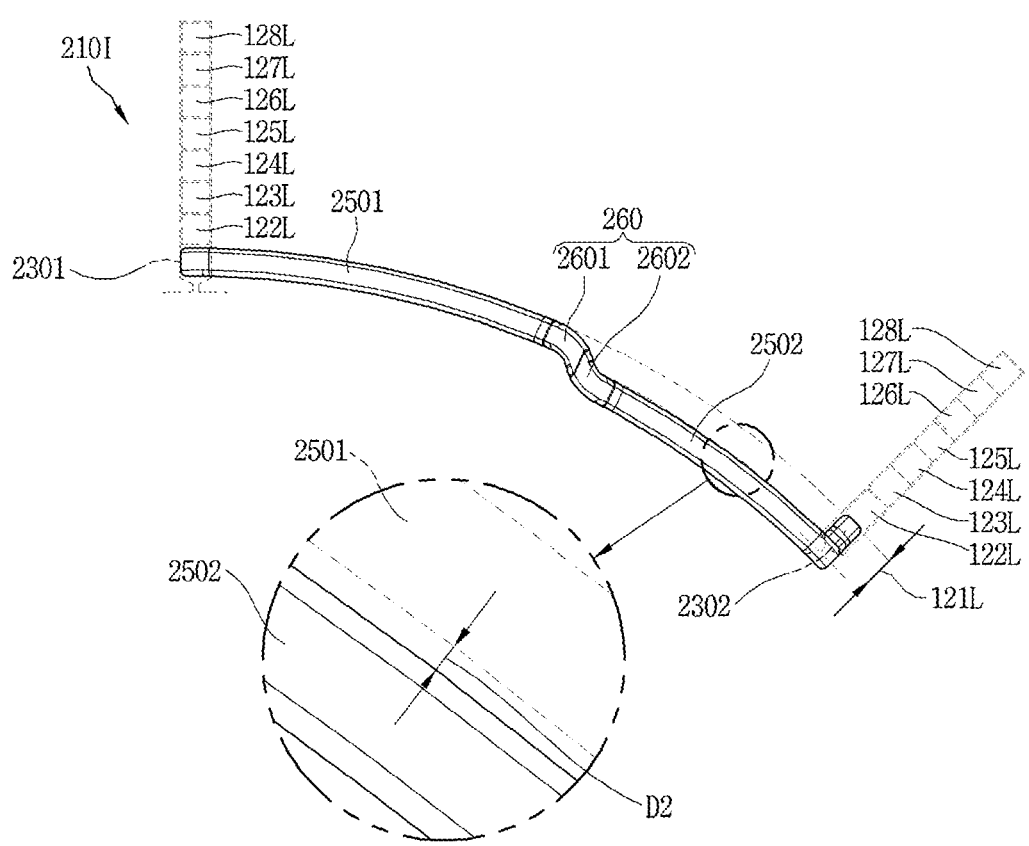
FIG. 25 is a planar view of FIG. 24.

FIG. 24 is a perspective view before coupling the innermost hairpin of FIG. 1 and FIG. 25 is a planar view of FIG. 24. As illustrated in FIG. 24, the innermost hairpin 2101 may include two insertion parts 230, a crown part 250 connecting the two insertion parts 230, and two extension parts 270 extending from the two insertion parts 230.

The innermost hairpin 2101 may be configured such that, for example, the two insertion parts 230 are spaced apart from each other by a 12-slot pitch.

The innermost hairpin 2101 may include a first insertion part 2301 and a second insertion part 2302 inserted into innermost layers (first layers) of slots 120 spaced apart from each other by the 12-slot pitch along the circumferential direction of the stator core 100.

More specifically, when the first insertion part 2301 of the innermost hairpin 2101 is inserted into the first layer 121L of the first slot, the second insertion part 2302 may be inserted into the first layer 121L of the thirteenth slot.

The crown part 250 of the innermost hairpin 2101 may include a first crown part 2501 connected to the first insertion part 2301 and a second crown part 2502 connected to the second insertion part 2302.

Here, the plurality of hairpins 210 may protrude from one end portion of the stator core 100 by the same height (length) along the axial direction.

Since the two insertion parts of the innermost hairpin 2101 are spaced apart by a 12-slot pitch from each other and the two insertion parts of the first outermost hairpin 210O1 are spaced apart by a 13-slot pitch from each other, an interior angle θ3 between the first insertion part 2301 and the first crown part 2501 of the innermost hairpin 2101 may be greater than the interior angle θ1 between the first insertion part and the first crown part of the first outermost hairpin 210O1.

Accordingly, the interior angle θ3 between the first insertion part 2301 and the first crown part 2501 of the innermost hairpin 2101 may be formed to exceed 110 degrees.

A first extension part 2701 may extend from one side of the first insertion part 2301 of the innermost hairpin 2101. The first extension part 2701 may be provided with a connection end portion 275.

A second extension part 2702 may extend from one side of the second insertion part 2302 of the innermost hairpin 2101. The second extension part 2702 may be provided with a connection end portion 275.

Meanwhile, the innermost hairpin 2101 may include a radially-bent part 280 that is bent in the radial direction from the second insertion part 2302.

With the configuration, interference between the first crown part 2501 and the second crown part 2502 of different innermost hairpins 2101 can be suppressed.

The radially-bent part 280 of the innermost hairpin 2101 may be connected to the second crown part 2502.

The interior angle θ3 between the second crown part 2502 of the innermost hairpin 2101 and a second extension line Le2 in parallel to the second insertion part 2302 may be formed to exceed 110 degrees.

As illustrated in FIG. 25, the second crown part 2502 may be disposed at an inner side of the first crown part 2501 along the radial direction of the stator core 100.

With the configuration, interference between the first crown part 2501 and the second crown part 2502 of different innermost hairpins 2101 can be suppressed.

The radially-bent parts 280 of the innermost hairpin 2101 may be formed to be bent toward a central side (inner side) of the stator core 100 along the radial direction of the stator core 100.

One region of the second crown part 2502 may be disposed at an inner side (central side), compared to the second insertion part 2302, in the radial direction of the stator core 100.

The second crown part 2502 of the innermost hairpin 2101 may be spaced apart from the first crown part 2501 of another innermost hairpin 2101 by a second partial discharge suppression distance D2.

Accordingly, an occurrence of partial discharge of the hairpins (the innermost hairpins 2101) each having the two insertion parts 2301 and 2302 disposed in the same layers (innermost layers 121L).

Figure 26:
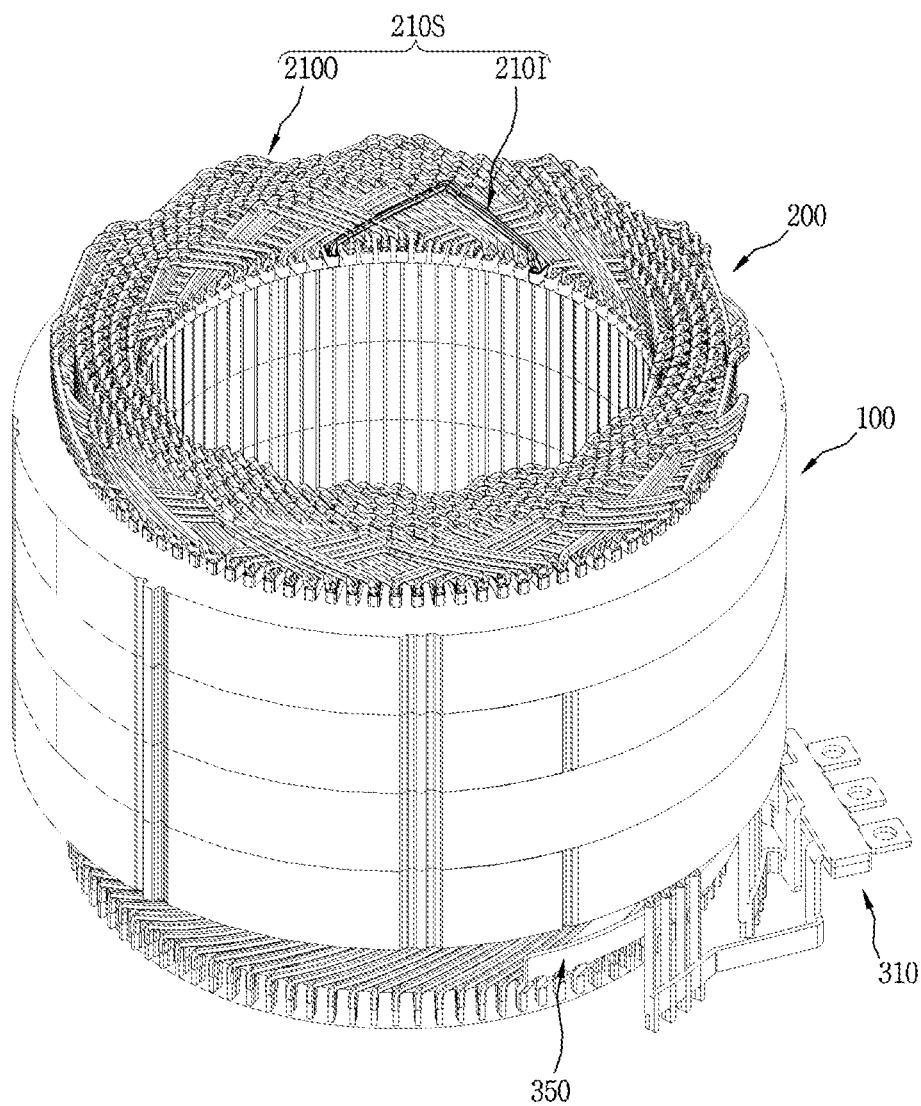
FIG. 26 is a perspective view illustrating a coupled state of the innermost hairpins of FIG. 24.
Figure 27:
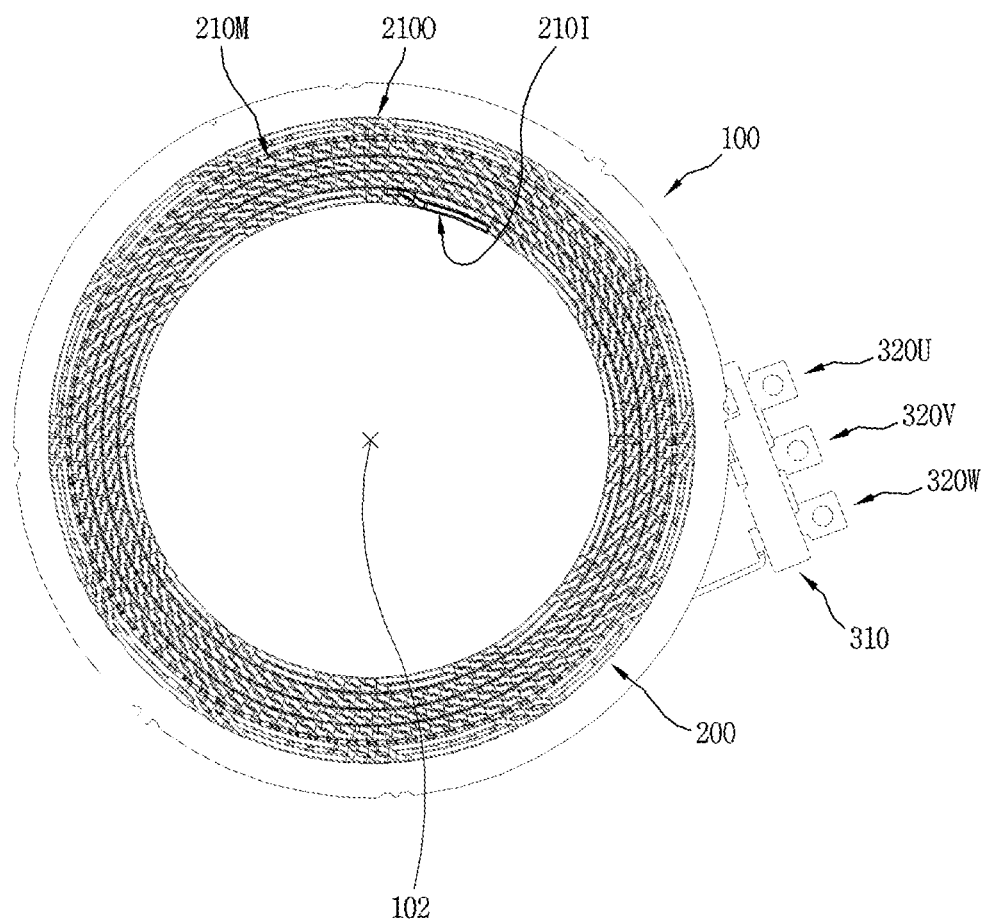
FIG. 27 is a planar view of FIG. 26.

FIG. 26 is a perspective view illustrating a coupled state of the innermost hairpins of FIG. 24 and FIG. 27 is a planar view of FIG. 26. As illustrated in FIG. 26, the first insertion part 2301 and the second insertion part 2302 of the innermost hairpin 2101 may be inserted along the axial direction into first layers 121L of different slots 120, which are spaced apart by a 12-slot pitch, at one side (upper side in the drawing) of the stator core 100.

The first insertion part 2301 and the second insertion part 2302 protruding to another side of the stator core 100 may be bent into a preset shape so as to form the first extension part 2701 and the second extension part 2702.

As illustrated in FIG. 27, the second insertion part 2302 of the innermost hairpin 2101 may be disposed below the crown part 250 of another innermost hairpin 2101, and the first insertion part 2301 of the innermost hairpin 2101 may be disposed below the crown part of another innermost hairpin 2101.

The second crown part 2502 of the innermost hairpin 2101 may be disposed at an inner side, compared to the first crown part 2501 of the another innermost hairpin 2101, in the radial direction of the stator core 100.

The second crown part 2502 of the innermost hairpin 2101 may be disposed at the inner side of the first crown part 2501 of the another innermost hairpin 2101 in the radial direction of the stator core 100 with being spaced apart from the first crown part 2501 by the second partial discharge suppression distance. Accordingly, even if the two insertion parts 2301 and 2302 are disposed in the same layers (innermost layers, first layers 121L), the occurrence of partial discharge between the two crown parts 2501 and 2502 can be suppressed.

Figure 28:
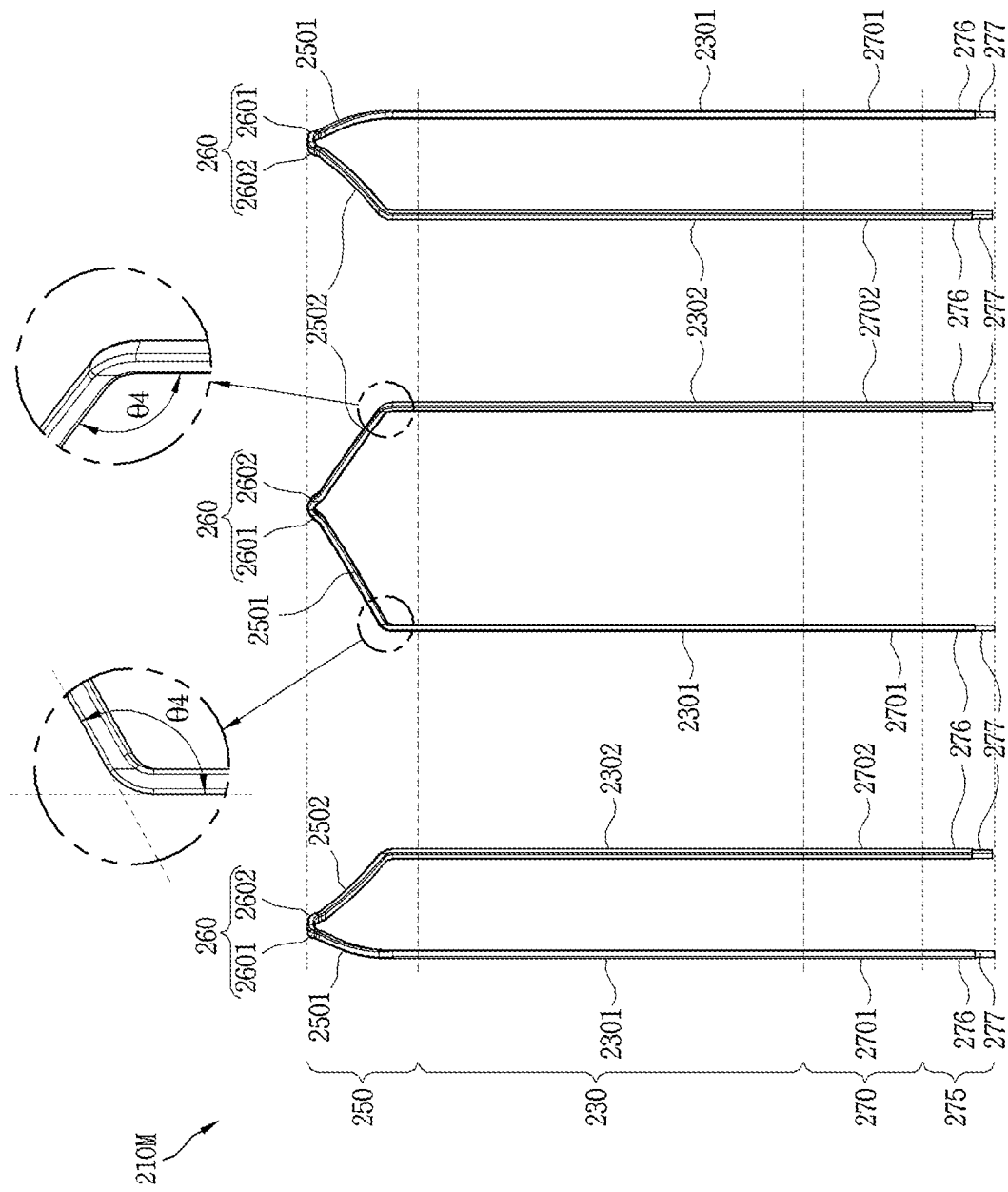
FIG. 28 is a perspective view before coupling a middle hairpin of FIG. 1.
Figure 29:
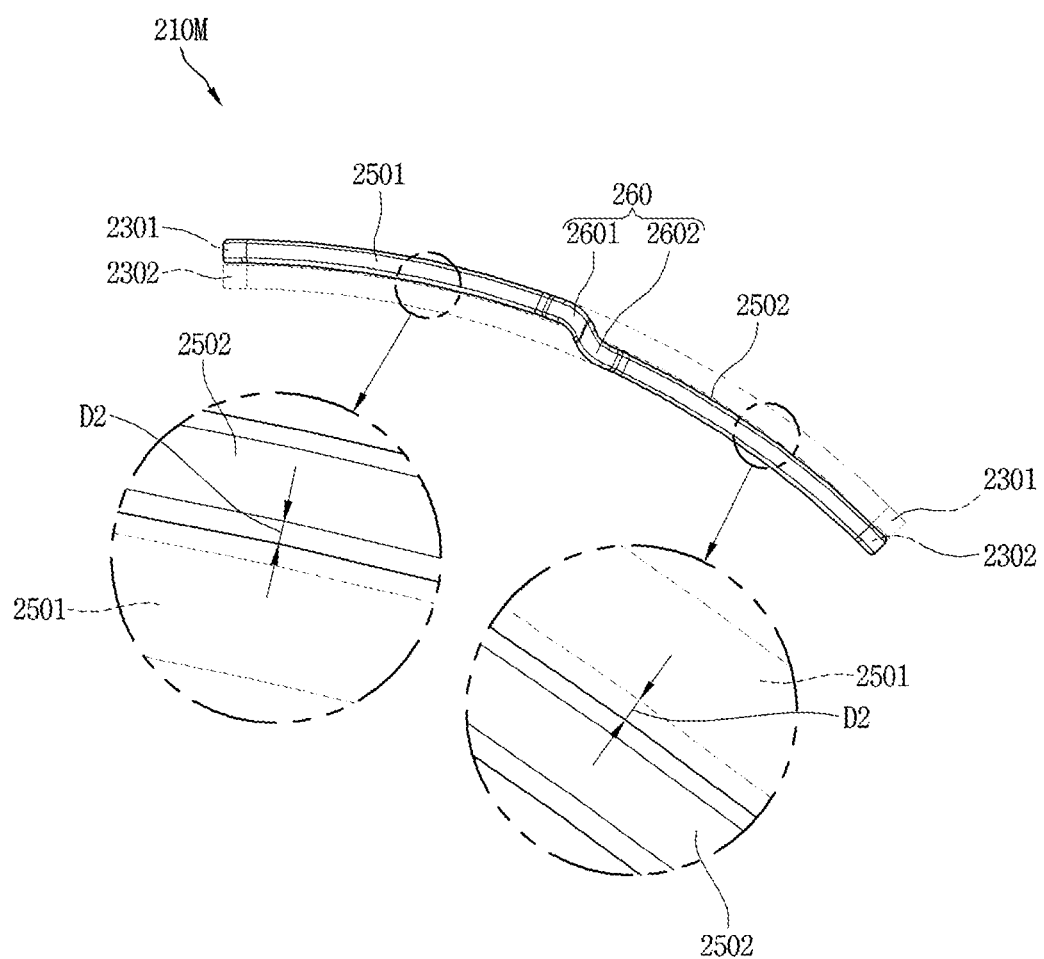
FIG. 29 is a planar view of FIG. 28.

FIG. 28 is a perspective view before coupling the middle hairpin of FIG. 1 and FIG. 29 is a planar view of FIG. 28. As illustrated in FIG. 28, the middle hairpin 210M may include two insertion parts 230, a crown part 250 connecting the two insertion parts 230, and two extension parts 270 extending from the two insertion parts 230.

The middle hairpin 210M may be configured such that the two insertion parts 230 are spaced apart from each other by a 12-slot pitch.

The slot pitch may mean, for example, a gap between the slots 120 consecutive to each other along the circumferential direction of the stator core 100.

More specifically, a second slot may be disposed at one side of a first slot in the circumferential direction of the stator core 100, and the first slot and the second slot may be defined as being spaced apart from each other by a 1-slot pitch.

Since the two insertion parts 230 of the middle hairpin 210M are spaced apart from each other by the 12-slot pitch, when the first insertion part 2301 as one of the two insertion parts 230 is inserted into the first slot, the other second insertion part 2302 may be inserted into a thirteenth slot which is 12 slots apart from the first slot along the circumferential direction.

A first extension part 2701 may extend from one side of the first insertion part 2301. Since the middle hairpin 210M is before being coupled to the slot 120 of the stator core 100, the first extension part 2701 extending from the first insertion part 2301 may be in a linear shape. The first extension part 2701 may be provided with a connection end portion 275.

A second extension part 2702 may extend from one side of the second insertion part 2302. The second extension part 2702 may extend linearly from the second insertion part 2302. The second extension part 2702 may be provided with a connection end portion 275.

The first insertion part 2301 and the second insertion part 2302 may be connected by the crown part 250.

The crown part 250, for example, may include a first crown part 2501 extending from the first insertion part 2301, and a second extension part 2702 extending from the second insertion part 2302.

Here, the first insertion part 2301 and the second insertion part 2302 of the middle hairpin 210M may be disposed in different layers of different slots 120.

More specifically, the first crown part 2501 may extend to be inclined upwardly from the first insertion part 2301 toward the second insertion part 2302.

The first crown part 2501 of the middle hairpin 210M may form a minimum interior angle θ4 with the first insertion part 2301.

The second crown part 2502 may extend to be inclined upwardly from the second insertion part 2302 to the first insertion part 2301.

The second crown part 2502 of the middle hairpin 210M may form the minimum interior angle θ4 with the second insertion part 2302.

Here, the minimum interior angle θ4 of the middle hairpin 210M may be set to exceed 110 degrees.

Accordingly, stress which may be generated when manufacturing the middle hairpin 210M can be suppressed. Further, an occurrence of partial discharge due to the stress can be suppressed.

As illustrated in FIG. 29, the first crown part 2501 may be disposed at an outer side of the second crown part 2502 along the radial direction of the stator core 100.

The second crown part 2502 may be disposed at an inner side of the first crown part 2501 along the radial direction of the stator core 100.

Accordingly, interference between the first crown part 2501 and the second crown part 2502 of different middle hairpins 210M can be suppressed when the middle hairpins 210M are coupled.

The crown part 250 of the middle hairpin 210M may include a connection part 260 connecting the first crown part 2501 and the second crown part 2502.

Accordingly, the first insertion part 2301 may be disposed at an outer side, compared to the second insertion part 2302, in the radial direction of the stator core 100.

The second insertion part 2302 may be disposed at an inner side, compared to the first insertion part 2301, in the radial direction of the stator core 100.

The first insertion part 2301 and the second insertion part 2302 of the middle hairpin 210M may be inserted into different slots 120 with a difference of one layer along the radial direction of the stator core 100.

Here, the first crown part 2501 of the middle hairpin 210M and the second crown part 2502 of another middle hairpin 210M may be spaced apart from each other by the second partial discharge suppression distance D2.

With the configuration, an occurrence of partial discharge between the first crown part 2501 of the middle hairpin 210M connected to one of the phases of the power source and the second crown part 2502 of the middle hairpin 210M connected to another one of the phases of the power source can be suppressed.

More specifically, when the first insertion part 2301 of the middle hairpin 210M is disposed in a seventh layer 127L of one slot 120, the second insertion part 2302 may be disposed in a sixth layer of the slot 120 which is spaced apart from the first insertion part 2301.

The connection part 260 of the middle hairpin 210M may be bent upward from an end portion of the first crown part 2501.

The connecting part 260 of the middle hairpin 210M may be bent upward from an end portion of the second crown part 2502.

The connection part 260 of the middle hairpin 210M may include a first connection part 2601 connected to the first crown part 2501 and a second connection part 2602 connected to the second crown part 2502.

In the middle hairpin 210M, the connection part 260 may protrude highest along the axial direction of the stator core 100.

The middle hairpin 210M may be configured such that, for example, a connection point between the first connection part 2601 and the second connection part 2602 protrudes highest along the axial direction of the stator core 100.

Hereinafter, a connection relationship among the plurality of hairpins of the stator for the electric motor in accordance with the implementation of the present disclosure will be described with reference to FIGS. 30 to 33.

Figure 30:
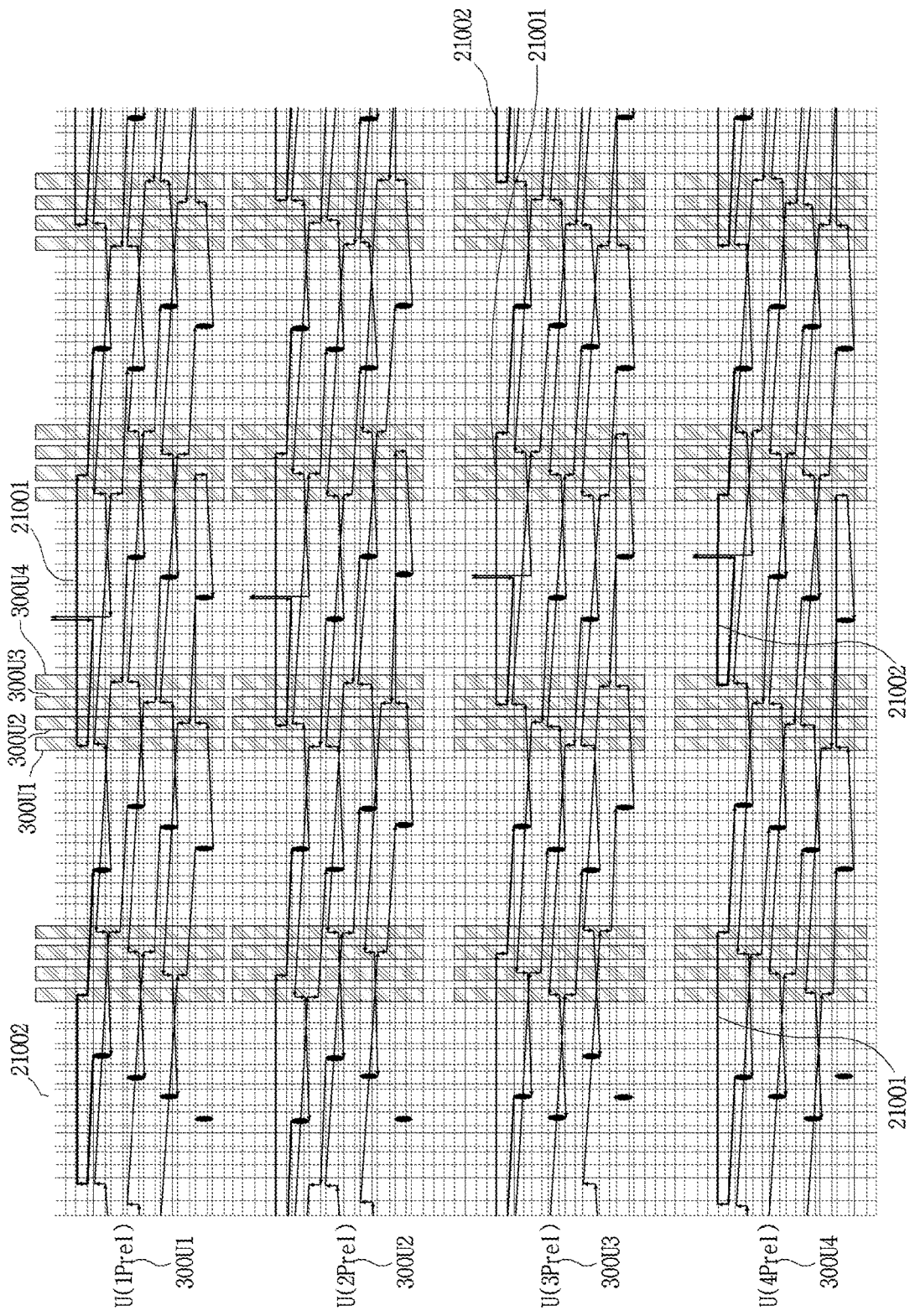
FIGS. 30 and 31 are views each illustrating a part of a pattern of a U-phase of the stator coil of FIG. 1.
Figure 31:
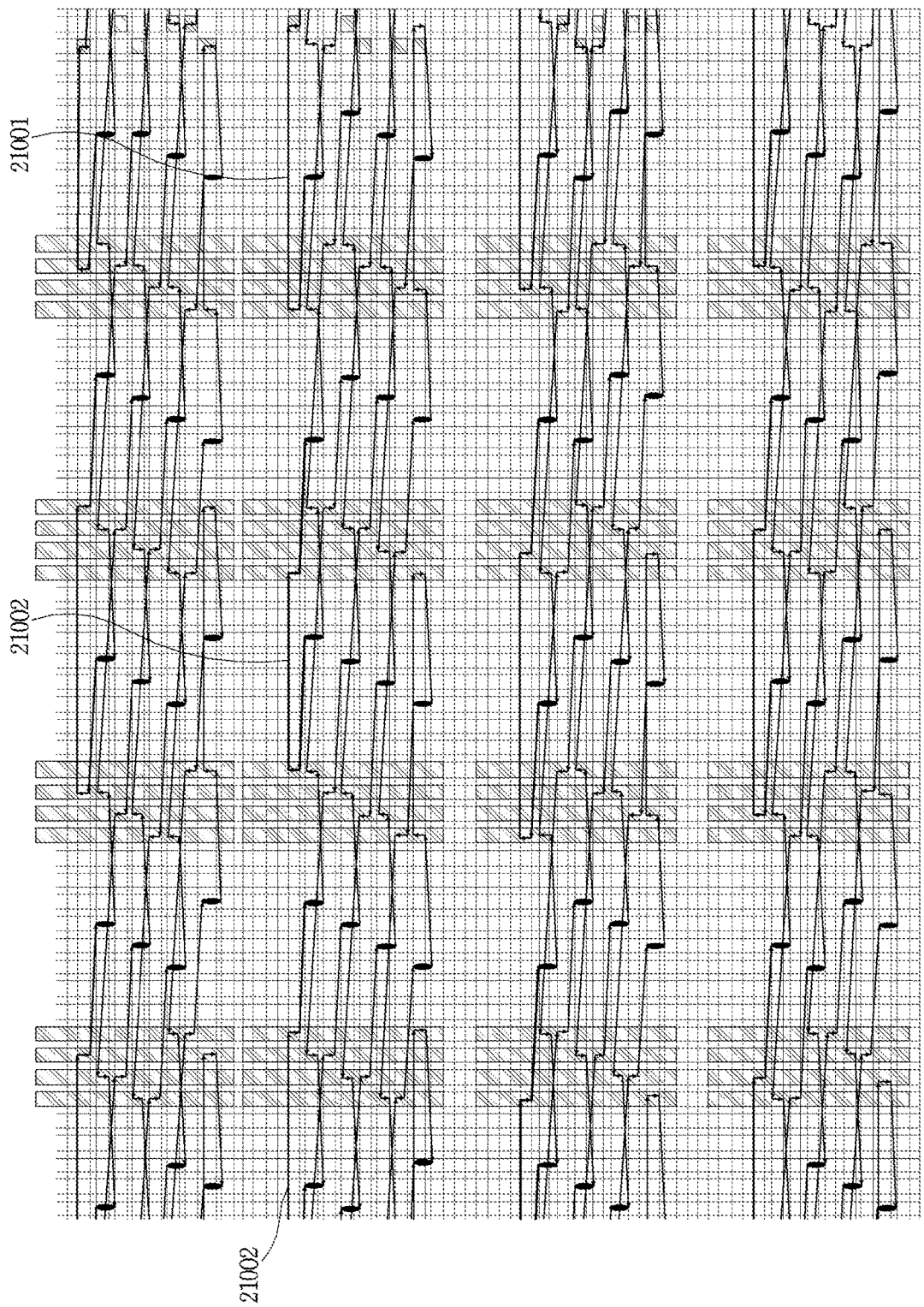
Figure 32:
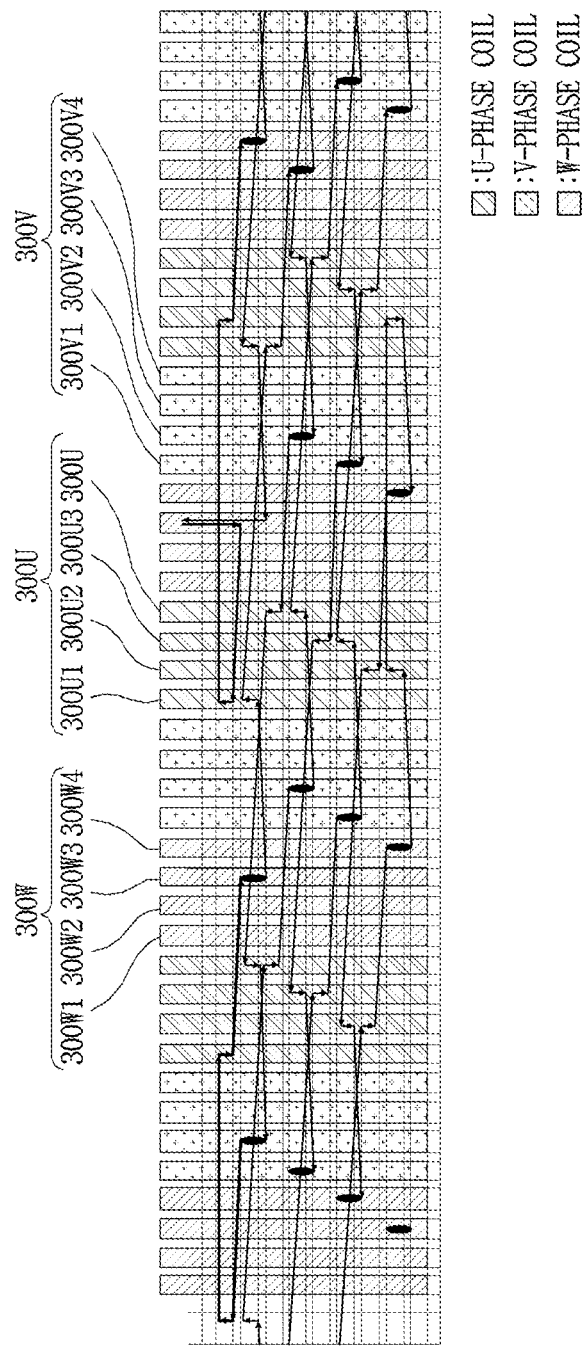
FIG. 32 is a view illustrating arrangement of U-phase, V-phase, and W-phase of the stator coil of FIG. 1.

FIGS. 30 and 31 are views each illustrating a part of a U-phase pattern diagram of the stator coil of FIG. 1, and FIG. 32 is a view illustrating an arrangement of U-phase, V-phase, and W-phase of the stator coil of FIG. 1. As described above, the stator coil 200 may include the plurality of phase coils 300 (U-phase coil 300U, V-phase coil 300V, and W-phase coil 300W) connected to the phases (U-phase, V-phase, W-phase) of the power source, respectively.

The plurality of phase coils 300 may be spaced apart from one another at preset intervals (slot pitches) along the circumferential direction of the stator core 100.

Referring back to FIG. 8, the U-phase coil 300U, the V-phase coil 300V, and the W-phase coil 300W may be disposed to be spaced apart from one another by an 8-slot pitch.

The plurality of phase coils 300, that is, the U-phase coil 300U, the V-phase coil 300V, and the W-phase coil 300W may each include a plurality of phase-parallel coils connected in parallel with one another.

The plurality of phase-parallel coils may include first to fourth phase-parallel coils 300U1, 300U2, 300U3, 300U4, 300V1, 300V2, 300V3, 300V4, 300W1, 300W2, 300W3, 300W4.

The first to fourth phase-parallel coils 300U1, 300U2, 300U3, 300U4, 300V1, 300V2, 300V3, 300V4, 300W1, 300W2, 300W3, 300W4 may be configured such that phase-parallel coils of the same phase are spaced apart by a 1-slot pitch and phase-parallel coils of different phases are spaced apart by an 8-slot pitch.

More specifically, the U-phase-parallel coil may include a first U-phase-parallel coil 300U1, a second U-phase-parallel coil 300U2, a third U-phase-parallel coil 300U3, and a fourth U-phase-parallel coil 300U4.

The V-phase-parallel coil may include a first V-phase-parallel coil 300V1, a second V-phase-parallel coil 300V2, a third V-phase-parallel coil 300V3, and a fourth V-phase-parallel coil 300V4.

The W-phase-parallel coil may include a first W-phase-parallel coil 300W1, a second W-phase-parallel coil 300W2, a third W-phase-parallel coil 300W3, and a fourth W-phase-parallel coil 300W4.

Here, the U-phase coil 300U, V-phase coil 300V, and W-phase coil 300W may be disposed in the respective hairpins 210 in the same manner except for positions of slots spaced apart from one another along the circumferential direction of the stator core 100. Thus, hereinafter, arrangement and connection of hairpins of the U-phase coils 300U will first be described.

As illustrated in FIGS. 30 and 31, the U-phase coil 300U may include four U-phase-parallel coils, namely, a first U-phase-parallel coil 300U1, a second U-phase-parallel coil 300U2, a third U-phase-parallel coil 300U3, and a fourth U-phase-parallel coil 300U4, which are connected in parallel to one another.

The first to fourth U-phase-parallel coils 300U1 to 300U4 may be spaced apart from one another by a 1-slot pitch along the circumferential direction of the stator core 100.

More specifically, the first to fourth U-phase-parallel coils 300U1 to 300U4 may have a plurality of hairpins 210, for example, 32 hairpins 210, respectively.

The plurality of hairpins 210 of each of the first U-phase-parallel coil 300U1 to the fourth U-phase-parallel coil 300U4 may include the first outermost hairpins 210O1, the second outermost hairpins 210O2, the middle hairpins 210M, and the innermost hairpins 210I.

The 32 hairpins 210 of each of the first U-phase-parallel coil 300U1 to the fourth U-phase-parallel coil 300U4 may be connected in series with being spaced apart from one another at preset intervals (slot pitches) along the circumferential direction of the stator core 100.

The plurality of hairpins 210 of each of the first U-phase-parallel coil 300U1 to the fourth U-phase-parallel coil 300U4 may include one second outermost hairpin 210O2.

In the first U-phase-parallel coil 300U1, when a hairpin to which the power source is connected is a first hairpin, a $25^{th}$ hairpin may be the second outermost hairpin 210O2.

In the second U-phase-parallel coil 300U2, when a hairpin to which the power source is connected is a first hairpin, a $17^{th}$ hairpin may be the second outermost hairpin 210O2.

In the third U-phase-parallel coil 300U3, when a hairpin to which the power source is connected is a first hairpin, a ninth hairpin may be the second outermost hairpin 210O2.

In the fourth U-phase-parallel coil 300U4, when a hairpin to which the power source is connected is a first hairpin, the first hairpin may be the second outermost hairpin 210O2.

According to this configuration, since the second outermost hairpins 210O2 of the first U-phase-parallel coil 300U1 to the fourth U-phase-parallel coil 300U4 are disposed respectively in different slots, the first U-phase-parallel coil 300U1 to the fourth U-phase-parallel coil 300U4 may have different phases of currents for each section, thereby suppressing the generation of circulating current.

Among the 32 hairpins 210 of each of the first U-phase-parallel coil 300U1 to the fourth U-phase-parallel coil 300U4, for example, a first hairpin 210 of the outermost hairpins 210O disposed in the outermost layers (the eighth layers 128L) may be connected to the power source.

Among the 32 hairpins 210 of each of the first U-phase-parallel coil 300U1 to the fourth U-phase-parallel coil 300U4, a final hairpin 210 ($64^{th}$ conductor) may be connected to the neutral wire 350 in parallel.

Since the connection pattern of the 32 hairpins 210 of each of the first U-phase-parallel coil 300U1 to the fourth U-phase-parallel coil 300U4 are basically the same, the first U-phase-parallel coil 300U1 will be exemplarily described in detail below.

A hairpin 210 (hereinafter, referred to as "first hairpin") disposed first among the hairpins of the first U-phase-parallel coil 300U1 is the first outermost hairpin 210O1, and thus may be disposed in the outermost layer 128L. A conductor (hereinafter, referred to as "first conductor") disposed first of the conductors of the first hairpin, for example, may be disposed in the eighth layer 128L of the thirteenth slot, and a second conductor may be disposed in the eighth layer 128L of the $26^{th}$ slot spaced apart from the first conductor by a 13-slot pitch. The power connection terminal 310 may be connected to the connection end portion 275 of the first extension part 2701 of the first hairpin (the first outermost hairpin 210O1) of the first U-phase-parallel coil 300U1.

A second hairpin connected to the first hairpin (the connection end portion 275 at the second insertion part side) of the first U-phase-parallel coil 300U1 may be the middle hairpin 210M. The second hairpin may be spaced apart along one direction (clockwise in the drawing) in the circumferential direction of the stator core 100. A third conductor of the second hairpin may be disposed in the seventh layer 127L of the $38^{th}$ slot spaced apart from the second conductor by a 12-slot pitch, and may be connected in series with the second conductor of the first hairpin by welding. A fourth conductor of the second hairpin may be disposed in the $50^{th}$ slot spaced apart by the 12-slot pitch, and may be disposed in the sixth layer having a difference of one layer from the third conductor.

The third and fourth hairpins of the first U-phase-parallel coil 300U1 may be the middle hairpins 210M, and the fifth hairpin may be the innermost hairpin 210I. A ninth conductor of the fifth hairpin may be disposed in the first layer 121L of the fourteenth slot and a tenth conductor of the fifth hairpin may be disposed in the first layer 121L of the $26^{th}$ slot spaced apart by the 12-slot pitch, thereby being connected in series by welding.

The sixth hairpin may be configured as the middle hairpin 210M, and may be spaced apart from the fifth hairpin in a counterclockwise direction in the circumferential direction of the stator core 100. The eleventh conductor of the sixth hairpin may be disposed in the second layer 122L of the fourteenth slot spaced apart by the 12-slot pitch. The eleventh conductor of the sixth hairpin may be disposed at an outer side of the ninth conductor of the fifth hairpin. Since the seventh and eighth hairpins are the middle hairpins 210M, they may be disposed with being spaced apart by the 12-slot pitch in the counterclockwise direction and connected in series by welding. The fifteenth conductor of the eighth hairpin may be disposed in the sixth layer of the 62' slot, and the sixteenth conductor of the eighth hairpin may be disposed in the seventh layer of the $50^{th}$ slot. The ninth hairpin connected to the sixteenth conductor of the eighth hairpin may be configured as the outermost hairpin.

The seventeenth conductor of the ninth hairpin may be disposed in the eighth layer 128L of the $38^{th}$ slot, and the $18^{th}$ conductor may be disposed in the eighth layer 128L of the $51^{st}$ slot spaced apart by a 13-slot pitch. In the aforementioned manner, the $10^{th}$ to $32^{nd}$ hairpins may be connected in series by welding.

However, the $25^{th}$ hairpin of the first U-phase-parallel coil 300U1 may be configured as the second outermost hairpin 210O2. Accordingly, the $49^{th}$ conductor of the $25^{th}$ hairpin may be disposed in the eighth layer 128L of the $88^{th}$ slot, and the $50^{th}$ conductor may be disposed in the eighth layer 128L of the first slot spaced apart by the 9-slot pitch. The $63^{rd}$ conductor of the $32^{nd}$ hairpin of the first U-phase-parallel coil 300U1 may be disposed in the sixth layer of the $37^{th}$ slot, and the $64^{th}$ conductor may be disposed in the seventh layer 127L of the $25^{th}$ slot spaced apart by the 12-slot pitch. The $64^{th}$ conductor may be connected to the neutral wire 350.

Meanwhile, the second U-phase-parallel coil 300U2 of the U-phase coil 300U may be spaced apart from the first U-phase-parallel coil 300U1 by a 1-slot pitch. The first conductor of the first hairpin of the second U-phase-parallel coil 300U2 may be disposed in the eighth layer 128L of the fourteenth slot spaced apart from the first conductor of the first hairpin of the first U-phase-parallel coil 300U1 by the 1-slot pitch. The second conductor of the second U-phase-parallel coil 300U2 may be disposed in the eighth layer 128L of the $27^{th}$ slot spaced apart by the 13-slot pitch. The second hairpin to the $32^{nd}$ hairpins may be disposed in the same manner as the first U-phase-parallel coil 300U1. However, in the second U-phase-parallel coil 300U2, the $17^{th}$ hairpin may be configured as the second outermost hairpin 210O2. That is, the $33^{rd}$ conductor of the $17^{th}$ hairpin may be disposed in the eighth layer 128L of the $64^{th}$ slot, and the $34^{th}$ conductor may be disposed in the eighth layer 128L of the $73^{rd}$ slot spaced apart by the 9-slot pitch. The $63^{rd}$ conductor of the $32^{rd}$ hairpin of the second U-phase-parallel coil 300U2 may be disposed in the sixth layer of the $38^{th}$ slot, and the $64^{th}$ conductor may be disposed in the seventh layer 127L of the $26^{th}$ slot.

Similarly, the third U-phase-parallel coil 300U3 of the U-phase coil 300U may be spaced apart from the second U-phase-parallel coil 300U2 by the 1-slot pitch.

Here, in the third U-phase-parallel coil 300U3, a hairpin (ninth hairpin) which is the ninth from the first hairpin connected to the power source may be configured as the second outermost hairpin 210O2. That is, the $17^{th}$ conductor of the ninth hairpin may be disposed in the eighth layer 128L of the $40^{th}$ slot, and the $18^{th}$ conductor may be disposed in the eighth layer 128L of the $49^{th}$ slot spaced apart by the 9-slot pitch.

On the other hand, the fourth U-phase-parallel coil 300U4 may be arranged to be spaced apart from the third U-phase-parallel coil 300U3 by the 1-slot pitch.

In the fourth U-phase-parallel coil 300U4, the first hairpin connected to the power source may be configured as the second outermost hairpin 210O2. The first conductor of the first hairpin of the fourth U-phase-parallel coil 300U4 may be disposed in the eighth layer 128L of the $16^{th}$ slot and the second conductor may be disposed in the eighth layer 128L of the $25^{th}$ slot spaced apart from the first conductor by the 9-slot pitch. The second hairpin to the $32^{nd}$ hairpins of the fourth U-phase-parallel coil 300U4 may be connected in series in the aforementioned manner.

The first conductors of the first U-phase-parallel coil 300U1, the second U-phase-parallel coil 300U2, the third U-phase-parallel coil 300U3, and the fourth U-phase-parallel coil 300U4 may be connected in parallel to the power connection terminal 310, respectively. The $64^{th}$ conductors of the first U-phase-parallel coil 300U1, the second U-phase-parallel coil 300U2, the 3 U-phase-parallel coil 300U3, and the 4U-phase-parallel coil 300U4 may be connected in parallel to the neutral wire 350, respectively.

Meanwhile, as illustrated in FIG. 32, the V-phase coil 300V may be disposed to be spaced apart from the U-phase coil 300U by an 8-slot pitch in one direction (to right in the drawing).

More specifically, the first V-phase-parallel coil 300V1 of the V-phase coil 300V may be disposed to be spaced apart from the first U-phase-parallel coil 300U1 of the U-phase coil 300U by the 8-slot pitch.

The W-phase coil 300W may be spaced apart from the U-phase coil 300U in another direction (to left in the drawing).

The first W-phase-parallel coil 300W1 of the W-phase coil 300W may be spaced apart from the first U-phase-parallel coil 300U1 of the U-phase coil 300U by the 8-slot pitch.

More specifically, the first conductor of the first hairpin of the first V-phase-parallel coil 300V1 may be, for example, spaced apart to the right from the first conductor of the first hairpin of the first U-phase-parallel coil 300U1 by the 8-slot pitch. The first conductor of the first hairpin of the first V-phase-parallel coil 300V1 may be disposed in the eighth layer 128L of the $21^{st}$ slot and the second conductor may be disposed in the eighth layer 128L of the $34^{th}$ slot spaced apart from the first conductor by the 13-slot pitch. The $64^{th}$ conductor of the $32^{nd}$ hairpin of the first V-phase-parallel coil 300V1 may be disposed in the seventh layer 127L of the $33^{rd}$ slot spaced apart from the $64^{th}$ conductor of the first U-phase-parallel coil 300U1 by the 8-slot pitch.

The first conductor of the first hairpin of the second V-phase-parallel coil 300V2 may be disposed to be spaced apart to right from the first conductor of the first V-phase-parallel coil 300V1 by the 1-slot pitch.

The first conductor of the first hairpin of the third V-phase-parallel coil 300V3 may be disposed to be spaced apart to right from the first conductor of the second V-phase-parallel coil 300V2 by the 1-slot pitch.

The first conductor of the first hairpin of the fourth V-phase-parallel coil 300V4 may be disposed to be spaced apart to right from the first conductor of the third V-phase-parallel coil 300V3 by the 1-slot pitch.

The first conductors of the first to fourth V-phase-parallel coils 300V1 to 300V4 may be connected in parallel to the power connection terminal 310.

The $64^{th}$ conductors of the first to fourth V-phase-parallel coils 300V1 to 300V4 may be connected in parallel to the neutral wire 350.

In the first V-phase-parallel coil 300V1, when a hairpin to which the power source is connected is a first hairpin, a $25^{th}$ hairpin may be the second outermost hairpin 210O2.

In the second V-phase-parallel coil 300V2, when a hairpin to which the power source is connected is a first hairpin, a $17^{th}$ hairpin may be the second outermost hairpin 210O2.

In the third V-phase-parallel coil 300V3, when a hairpin to which the power source is connected is a first hairpin, a ninth hairpin may be the second outermost hairpin 210O2.

In the fourth V-phase-parallel coil 300V4, when a hairpin to which the power source is connected is a first hairpin, the first hairpin may be the second outermost hairpin 210O2.

More specifically, the first conductor of the first hairpin of the first W-phase-parallel coil 300W1 may be, for example, spaced apart to the left from the first conductor of the first hairpin of the first U-phase-parallel coil 300U1 by the 8-slot pitch. The first conductor of the first hairpin of the first W-phase-parallel coil 300W1 may be disposed in the eighth layer 128L of the fifth slot and the second conductor may be disposed in the eighth layer 128L of the $18^{th}$ slot spaced apart from the first conductor by the 13-slot pitch. The $64^{th}$ conductor of the $32^{nd}$ hairpin of the first W-phase-parallel coil 300W1 may be disposed in the seventh layer 127L of the $17^{th}$ slot spaced apart from the $64^{th}$ conductor of the first U-phase-parallel coil 300U1 by the 8-slot pitch.

The first conductor of the first hairpin of the second W-phase-parallel coil 300W2 may be disposed to be spaced apart to right from the first conductor of the first W-phase-parallel coil 300W1 by the 1-slot pitch.

The first conductor of the first hairpin of the third W-phase-parallel coil 300W3 may be disposed to be spaced apart to right from the first conductor of the second W-phase-parallel coil 300W2 by the 1-slot pitch.

The first conductor of the first hairpin of the fourth W-phase-parallel coil 300W4 may be disposed to be spaced apart to right from the first conductor of the third W-phase-parallel coil 300W3 by the 1-slot pitch.

The first conductors of the first to fourth W-phase-parallel coils 300W1 to 300W4 may be connected in parallel to the power connection terminal 310.

The $64^{th}$ conductors of the first to fourth W-phase-parallel coils 300W1 to 300W4 may be connected in parallel to the neutral wire 350.

On the other hand, in the first W-phase-parallel coil 300W1, when a hairpin to which the power source is connected is a first hairpin, a $25^{th}$ hairpin may be the second outermost hairpin 210O2.

In the second W-phase-parallel coil 300W2, when a hairpin to which the power source is connected is a first hairpin, a $17^{th}$ hairpin may be the second outermost hairpin 210O2.

In the third W-phase-parallel coil 300W3, when a hairpin to which the power source is connected is a first hairpin, a ninth hairpin may be the second outermost hairpin 210O2.

In the fourth W-phase-parallel coil 300W4, when a hairpin to which the power source is connected is a first hairpin, the first hairpin may be the second outermost hairpin 210O2.

With this configuration, the plurality of hairpins 210 may be respectively inserted into the plurality of slots 120 of the stator core 100. The innermost hairpins 210I may be inserted into the first layers 121L of the plurality of slots 120, respectively.

The middle hairpins 210M may be respectively inserted into the second to seventh layers 122L to 127L, respectively. The outermost hairpins 210O may be inserted into the eighth layers 128L, respectively.

In this implementation, the second crown part 2502 of the innermost hairpin 210I may be disposed close to the center of the stator core 100, compared to the second insertion part 2302, due to the radially-bent parts 280, which may result in suppressing interference between different innermost hairpins 210I when they are coupled. In addition, a spaced distance between the middle hairpin 210M disposed at the outer side of the innermost hairpin 210I along the radial direction and the conductor can be secured, thereby improving insulation performance.

Figure 33:
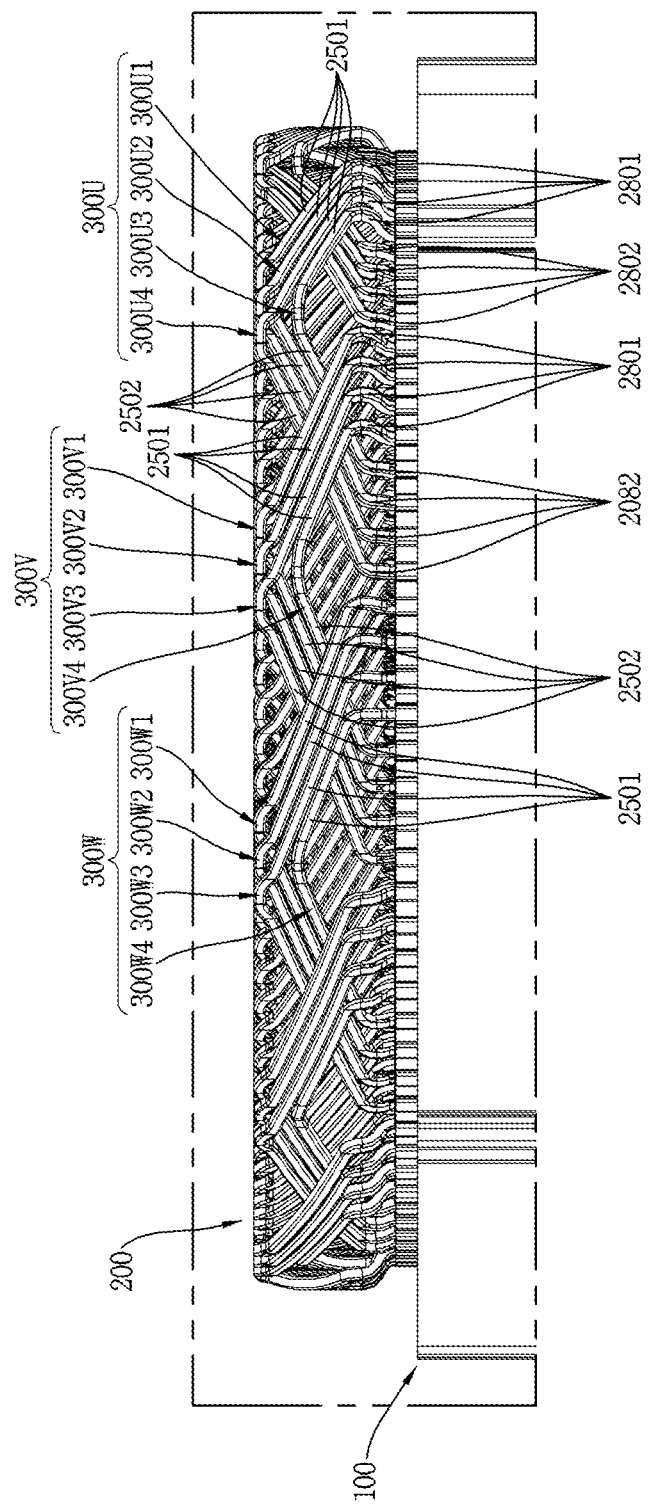
FIG. 33 is an enlarged view illustrating crown parts of outermost hairpins of a U-phase coil, a V-phase coil, and a W-phase coil of the stator coil of FIG. 2.

On the other hand, FIG. 33 is an enlarged view illustrating crown parts of outermost hairpins of a U-phase coil, a V-phase coil, and a W-phase coil of the stator coil of FIG. 2. As illustrated in FIG. 33, the U-phase coil 300U, the V-phase coil 300V, and the W-phase coil 300W may be spaced apart from one another along one side (counterclockwise in the drawing) in the circumferential direction of the stator core 100.

The V-phase coil 300V may be disposed at one side of the U-phase coil 300U, and the W-phase coil 300W may be disposed at one side of the V-phase coil 300V.

The first to fourth phase-parallel coils of each of the phase coils may be spaced apart by a 1-slot pitch along the counterclockwise direction in the drawing.

Regarding the U-phase coil 300U, for example, the second U-phase-parallel coil 300U2 may be disposed at one side of the first U-phase-parallel coil 300U1, the third U-phase-parallel coil 300U3 may be disposed at one side of the second U-phase-parallel coil 300U2, and the fourth U-phase-parallel coil 300U4 may be disposed at one side of the third U-phase-parallel coil 300U3.

Here, three of the first to fourth U-phase-parallel coils 300U1 to 300U4 may be configured as the first outermost hairpins 210O1, and the other may be configured as the second outermost hairpin 210O2.

Accordingly, current phases of the first to fourth U-phase-parallel coils 300U1 to 300U4 may become different from one another, and thus the generation of circulating current can be suppressed.

Between the first insertion part 2301 and the second insertion part 2302 of the outermost hairpin 210O of each phase coil, the first insertion part 2301 and the second insertion part 2302 of the outermost hairpins 210O of different phase coils may be disposed.

The first crown parts 2501 of the first to fourth phase-parallel coils of each phase coil may outwardly protrude by the first protrusion length P1, due to the first radially-bent part 2801, along the radial direction of the stator core 100, and the second crown parts 2502 of the first to fourth phase-parallel coils of each phase coil may protrude by the second protrusion length P2 due to the second radially-bent part 2802.

Accordingly, regarding the V-phase coil 300V, for example, the second insertion parts 2302 of the first to fourth U-phase-parallel coils 300U1, 300U2, 300U3, and 300U4 of the U-phase coil 300U may be disposed at one side of the first insertion parts 2301 of the first to fourth V-phase-parallel coils 300V1, 300V2, 300V3, and 300V4.

The first insertion parts 2301 of the first to fourth W-phase-parallel coils 300W1, 300W2, 300W3, and 300W4 may be disposed at one side of the first to fourth U-phase-parallel coils 300U1, 300U2, 300U3, and 300U4 of the U-phase coil 300U. The second insertion parts 2302 of the first to fourth V-phase-parallel coils 300V1, 300V2, 300V3, and 300V4 of the V-phase coil 300V may be disposed at one side of the first to fourth W-phase-parallel coils 300W1, 300W2, 300W3, and 300W4 of the W-phase coil 300W.

At this time, the second crown parts 2502 of the first to fourth U-phase-parallel coils 300U1, 300U2, 300U3, and 300U4 of the U-phase coil 300U may be disposed at the inner side of the first crown parts 2501 of the first to fourth V-phase-parallel coils 300V1, 300V2, 300V3, and 300V4 of the V-phase coil 300V, in an intersecting manner with being spaced apart by the first partial discharge suppression distance D1.

Accordingly, when power is applied to the stator coil 200, the occurrence of partial discharge between the V-phase coil 300V and the U-phase coil 300U can be suppressed.

In addition, the first crown parts 2501 of the first to fourth W-phase-parallel coils 300W1, 300W2, 300W3, and 300W4 of the W-phase coil 300W may be disposed at the outer side of the second crown parts 2502 of the first to fourth V-phase-parallel coils 300V1, 300V2, 300V3, and 300V4 of the V-phase coil 300V, in an intersecting manner with being spaced apart by the first partial discharge suppression distance D1.

Accordingly, when power is applied to the stator coil 200, the occurrence of partial discharge between the V-phase coil 300V and the W-phase coil 300W can be suppressed.

In addition, the first crown parts 2501 of the first to fourth U-phase-parallel coils 300U1, 300U2, 300U3, and 300U4 of the U-phase coil 300U may be disposed at the outer side of the second crown parts 2502 of the first to fourth W-phase-parallel coils 300W1, 300W1, 300W2, 300V3, and 300W4 of the V-phase coil 300W, in an intersecting manner with being spaced apart by the first partial discharge suppression distance D1.

Accordingly, when power is applied to the stator coil 200, the occurrence of partial discharge between the W-phase coil 300V and the U-phase coil 300U can be suppressed.

In addition, the first crown part 2501 and the second crown part 2502 of the outermost hairpin 210O may be disposed at the outer side by the first radially-bent part 2801 and the second radially-bent part 2802 along the radial direction of the stator core 100, thereby securing a spaced distance between the inner middle hairpin 210M and the conductor and improving insulation performance.

Also, the first crown part 2501 and the second crown part 2502 of the outermost hairpin 210O may be disposed to be spaced apart from each other along the radial direction of the stator core 100, due to the first radially-bent part 2801 and the second radially-bent part 2802, thereby suppressing interference between different outermost hairpins 210O when they are coupled.

This may allow the outermost hairpins 210O to be assembled quickly and easily.

The foregoing description has been given of specific embodiments of the present disclosure. However, the present disclosure may be embodied in various forms without departing from the spirit or essential characteristics thereof, and thus the above-described embodiments should not be limited by the details of the detailed description.

In addition, even if the implementations are not listed in detail in the aforementioned detailed description, they should be broadly construed within the scope of the technical idea defined in the appended claims. It is intended that the present disclosure cover the modifications and variations of this invention provided they come within the scope of the appended claims and their equivalents.

What is claimed is:

1. A stator for an electric motor, the stator comprising:
a stator core defining a rotor receiving hole, the stator core including a plurality of slots and a plurality of teeth that are provided around the rotor receiving hole; and
a stator coil wound around the stator core via the plurality of slots,
wherein the stator coil comprises a plurality of hairpins inserted into the plurality of slots and connected in series with one another, the plurality of hairpins including (i) high voltage distribution hairpins having a high voltage distribution ratio based on receiving power and
(ii) low voltage distribution hairpins having a low voltage distribution ratio based on receiving power,
wherein adjacent ones of the plurality of hairpins are spaced apart from each other by a partial discharge suppression distance that is configured to suppress partial discharge between the adjacent ones of the hairpins, and
wherein the partial discharge suppression distance between adjacent high voltage distribution hairpins among the plurality of hairpins is greater than the partial discharge suppression distance between adjacent low voltage distribution hairpins among the plurality of hairpins.

2. The stator of claim 1, wherein the plurality of hairpins include a plurality of outermost hairpins that are disposed at radially outermost portions of the plurality of slots, at least some of the outermost hairpins being configured to be connected to a power source,
wherein outermost hairpins are separated from an adjacent conductor by a first partial discharge suppression distance, and hairpins disposed at a radially inner side of the outermost hairpins are separated from an adjacent conductor by a second partial discharge suppression distance, and
wherein the first partial discharge suppression distance is greater than the second partial discharge suppression distance.

3. The stator of claim 2, wherein the first partial discharge suppression distance is 1.2 mm or greater.

4. The stator of claim 2, wherein the second partial discharge suppression distance is 0.2 mm or greater.

5. The stator of claim 2, wherein each of the outermost hairpins comprises:
a first insertion part and a second insertion part disposed at an outermost layer of the plurality of slots;
a first crown part having one end connected to the first insertion part; and
a second crown part having one end connected to the first crown part and the other end connected to the second insertion part,
wherein the first crown part of one of the outermost hairpins and the second crown part of an adjacent one of the outermost hairpins are spaced apart from each other by the first partial discharge suppression distance.

6. The stator of claim 5, wherein the first crown part of each of the outermost hairpins is spaced apart outwardly from the first insertion part along a radial direction of the stator core.

7. The stator of claim 6, wherein each of the outermost hairpins comprises a first radially-bent part that is curved outwardly from the first insertion part in the radial direction of the stator core and connected to the first crown part.

8. The stator of claim 7, wherein the second crown part of each the outermost hairpins is spaced apart inwardly from the first crown part along the radial direction of the stator core.

9. The stator of claim 8, wherein the second crown part of each of the outermost hairpins is disposed at an outer position relative to the second insertion part along the radial direction of the stator core.

10. The stator of claim 9, wherein the outermost hairpin comprises a second radially-bent part that is curved outwardly from the second insertion part in the radial direction of the stator core and connected to the second crown part.

11. The stator of claim 10, wherein the first radially-bent part and the second radially-bent part each have a minimum radius of curvature that is 2.0 mm or greater.

12. The stator of claim 10, wherein the first crown part is disposed to form a first minimum interior angle with respect to a first extension line and the second crown part is disposed to form a second minimum interior angle with respect to a second extension line,
  wherein the first extension line and the second extension line are parallel to the first insertion part and the second insertion part, respectively, and
  wherein the minimum interior angle is 110 degrees or greater.

13. The stator of claim 10, wherein the first radially-bent part protrudes from the first insertion part by a first protrusion length and the second radially-bent part protrudes from the second insertion part by a second protrusion length along the radial direction of the stator, and
  wherein the first protrusion length is equal to or greater than a value obtained by adding the first partial discharge suppression distance to the second protrusion length.

14. The stator of claim 5, wherein the stator coil comprises a plurality of phase coils configured to be connected to corresponding phases of the power source, respectively,
  wherein the plurality of phase coils comprises a U-phase coil, a V-phase coil, and a W-phase coil that are spaced apart from one another by an 8-slot pitch along a circumferential direction of the stator core,
  wherein each of the plurality of phase coils includes a plurality of phase-parallel coils connected in parallel to one another, and
  wherein each of the plurality of phase-parallel coils is provided with first to fourth phase-parallel coils spaced apart from one another by a one-slot pitch along the circumferential direction of the stator core.

15. The stator of claim 14, wherein the stator coil comprises:
  a first outermost hairpin having the first insertion part and the second insertion part spaced apart from each other by a 13-slot pitch along the circumferential direction of the stator core, and
  a second outermost hairpin having the first insertion part and the second insertion part spaced apart from each other by a 9-slot pitch along the circumferential direction of the stator core.

16. The stator of claim 15, wherein the U-phase coil comprises a phase-parallel coil of the U-phase coil and the V-phase coil comprises a phase-parallel coil of the V-phase coil,
  wherein the second crown part of the first outermost hairpin of the phase-parallel coil of the U-phase coil and the first crown part of the first outermost hairpin of the phase-parallel coil of the V-phase coil are spaced apart by the first partial discharge suppression distance.

17. The stator of claim 15, wherein the V-phase coil comprises a phase-parallel coil of the V-phase coil and the W-phase coil comprises a phase-parallel coil of the W-phase coil,
  wherein the second crown part of the first outermost hairpin of the phase-parallel coil of the V-phase coil and the first crown part of the first outermost hairpin of the phase-parallel coil of the W-phase coil are spaced apart by the first partial discharge suppression distance.

18. The stator of claim 15, wherein the W-phase coil comprises a phase-parallel coil of the W-phase coil and the U-phase coil comprises a phase-parallel coil of the U-phase coil,
  wherein the second crown part of the first outermost hairpin of the phase-parallel coil of the W-phase coil and the first crown part of the first outermost hairpin of the phase-parallel coil of the U-phase coil are spaced apart by the first partial discharge suppression distance.

19. The stator of claim 15, wherein the plurality of hairpins further comprises:
  a plurality of innermost hairpins disposed at an innermost side in the plurality of slots, and
  a plurality of middle hairpins disposed between the plurality of innermost hairpins and the plurality of outermost hairpins in the plurality of slots,
  wherein an innermost hairpin has the first insertion part and the second insertion part spaced apart from each other by a 12-slot pitch along the circumferential direction of the stator core, and
  wherein a middle hairpin has the first insertion part and the second insertion part spaced apart from each other by a 12-slot pitch along the circumferential direction of the stator core.

20. The stator of claim 19, wherein the innermost hairpin comprises:
  a first insertion part and a second insertion part disposed at an innermost layer of the plurality of slots,
  a first crown part having one end connected to the first insertion part, and
  a second crown part having one end connected to the second insertion part,
  wherein the second crown part is disposed at an inner side of the first crown part along a radial direction of the stator core.

21. The stator of claim 20, wherein the second crown part of the innermost hairpin is disposed at an inner side of the second insertion part along the radial direction of the stator core.

22. The stator of claim 21, wherein the innermost hairpin comprises a radially-bent part that is curved inwardly from the second insertion part in the radial direction of the stator core and connected to the second crown part.

* * * * *